US009567895B2

(12) United States Patent
Leaschauer

(10) Patent No.: US 9,567,895 B2
(45) Date of Patent: Feb. 14, 2017

(54) LEASCHAUER ENGINE

(71) Applicant: Eitan Leaschauer, San Jose, CA (US)

(72) Inventor: Eitan Leaschauer, San Jose, CA (US)

( * ) Notice: Subject to any disclaimer, the term of this patent is extended or adjusted under 35 U.S.C. 154(b) by 0 days.

(21) Appl. No.: 15/018,177

(22) Filed: Feb. 8, 2016

(65) Prior Publication Data

US 2016/0252061 A1    Sep. 1, 2016

Related U.S. Application Data

(63) Continuation-in-part of application No. 14/172,668, filed on Feb. 4, 2014, now Pat. No. 9,371,770.

(51) Int. Cl.

| F02B 19/06 | (2006.01) |
|---|---|
| F02B 19/10 | (2006.01) |
| F02M 53/06 | (2006.01) |
| F02M 51/06 | (2006.01) |
| F02B 33/20 | (2006.01) |
| F02B 75/28 | (2006.01) |

(52) U.S. Cl.
CPC .............. *F02B 19/06* (2013.01); *F02B 19/10* (2013.01); *F02B 33/20* (2013.01); *F02B 75/28* (2013.01); *F02M 51/0603* (2013.01); *F02M 53/06* (2013.01)

(58) Field of Classification Search
CPC .......... F02B 19/06; F02B 19/10; F02B 75/28; F02B 33/20; F02M 51/0603
USPC . 123/51 AA, 51 BA, 51 A, 51 R, 445, 48 D, 123/78 D
See application file for complete search history.

(56) References Cited

U.S. PATENT DOCUMENTS

| 1,238,223 A | * | 8/1917 | Van Riper ................. F02B 1/00 123/1 R |
| 1,504,096 A | * | 8/1924 | Burtnett .................... F01L 5/06 123/188.4 |
| 2,091,411 A | * | 8/1937 | Mallory ................ F02B 75/228 123/143 B |
| 2,091,412 A | * | 8/1937 | Mallory ................ F02B 75/228 123/143 B |
| 2,302,442 A | * | 11/1942 | Hickey ...................... F01L 5/04 123/188.4 |
| 2,442,082 A | * | 5/1948 | French ................. C09D 173/00 123/51 B |
| 2,937,630 A | * | 5/1960 | Norton ...................... F01B 7/14 123/51 AA |
| 2,973,751 A | * | 3/1961 | Blackmer ............... F02B 43/08 123/1 R |
| 3,438,327 A | * | 4/1969 | Thompson .............. F02D 17/00 123/495 |
| 3,446,192 A | * | 5/1969 | Woodward ............. F02B 19/06 123/47 R |
| 3,738,332 A | * | 6/1973 | Eyzat ...................... F02B 19/04 123/275 |

(Continued)

FOREIGN PATENT DOCUMENTS

DE            3541190 A1 *  5/1987  ............. F02B 19/06

*Primary Examiner* — Mahmoud Gimie
(74) *Attorney, Agent, or Firm* — Deborah Wenocur

(57) ABSTRACT

An internal combustion engine designed to provide a Leaschauer Combustion Process including injecting processed pre-mist fuel into extreme air pressure compressed air in the main cylinder. The fuel injection moment is accurately controlled and timed to enable extreme high compression combustion, so that the engine is enabled to utilize low octane fuel without pre-detonation.

15 Claims, 31 Drawing Sheets

(56) References Cited

U.S. PATENT DOCUMENTS

| | | | | | |
|---|---|---|---|---|---|
| 4,104,995 | A | * | 8/1978 | Steinbock | F02D 15/00 123/51 AA |
| 4,159,699 | A | * | 7/1979 | McCrum | F02B 41/06 123/1 R |
| 4,215,657 | A | * | 8/1980 | Burgio | F02B 19/14 123/193.3 |
| 4,300,497 | A | * | 11/1981 | Webber | F02B 19/02 123/254 |
| 4,315,490 | A | * | 2/1982 | Webber | F02B 43/00 123/275 |
| 4,774,919 | A | * | 10/1988 | Matsuo | F02B 25/18 123/257 |
| 4,981,114 | A | * | 1/1991 | Skopil | F02B 17/00 123/51 AA |
| 6,026,778 | A | * | 2/2000 | Mille | G01N 33/2817 123/198 A |
| 2004/0083991 | A1 | * | 5/2004 | Cowans | F02B 25/18 123/65 BA |
| 2004/0099887 | A1 | * | 5/2004 | Hazelton | F02B 41/06 257/232 |

* cited by examiner

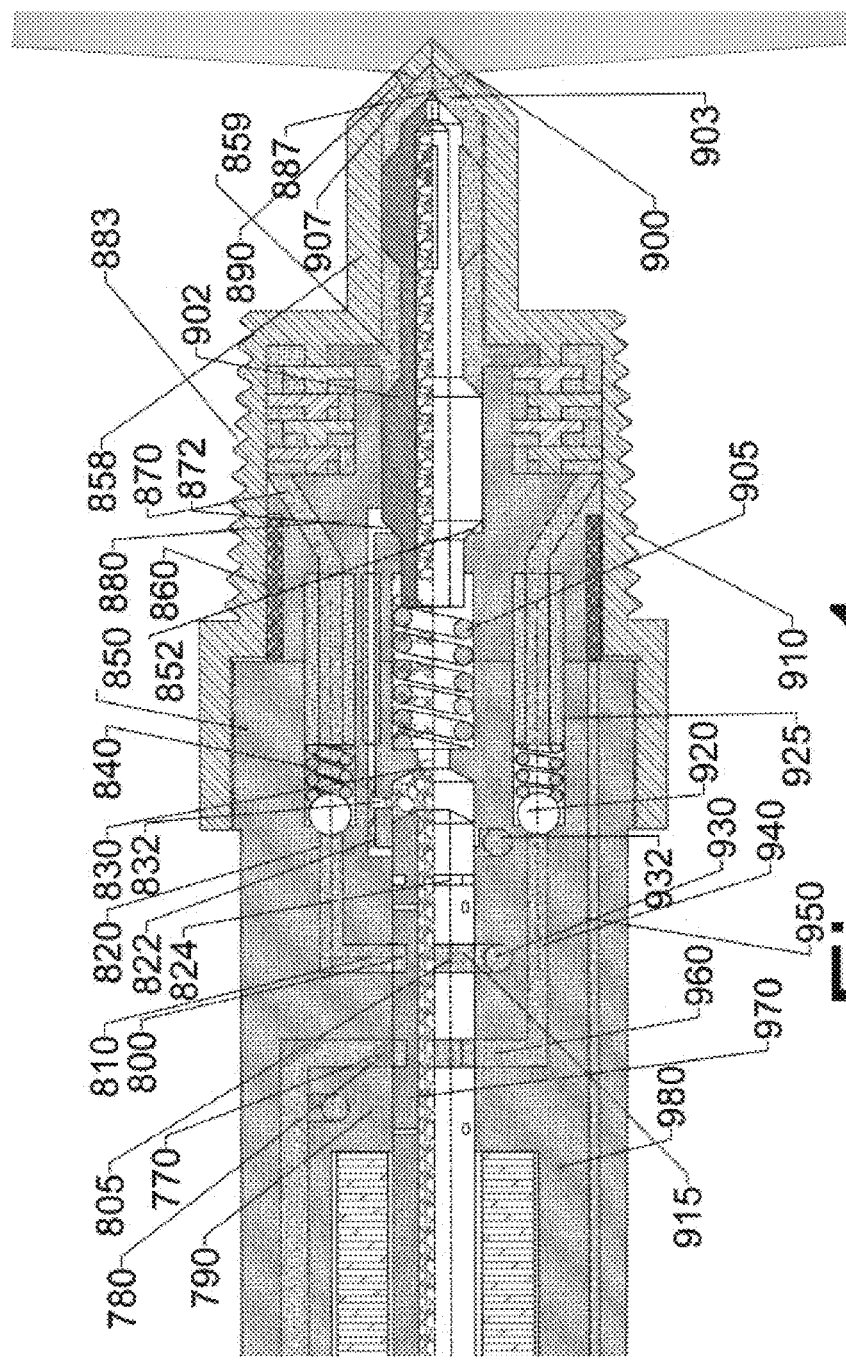

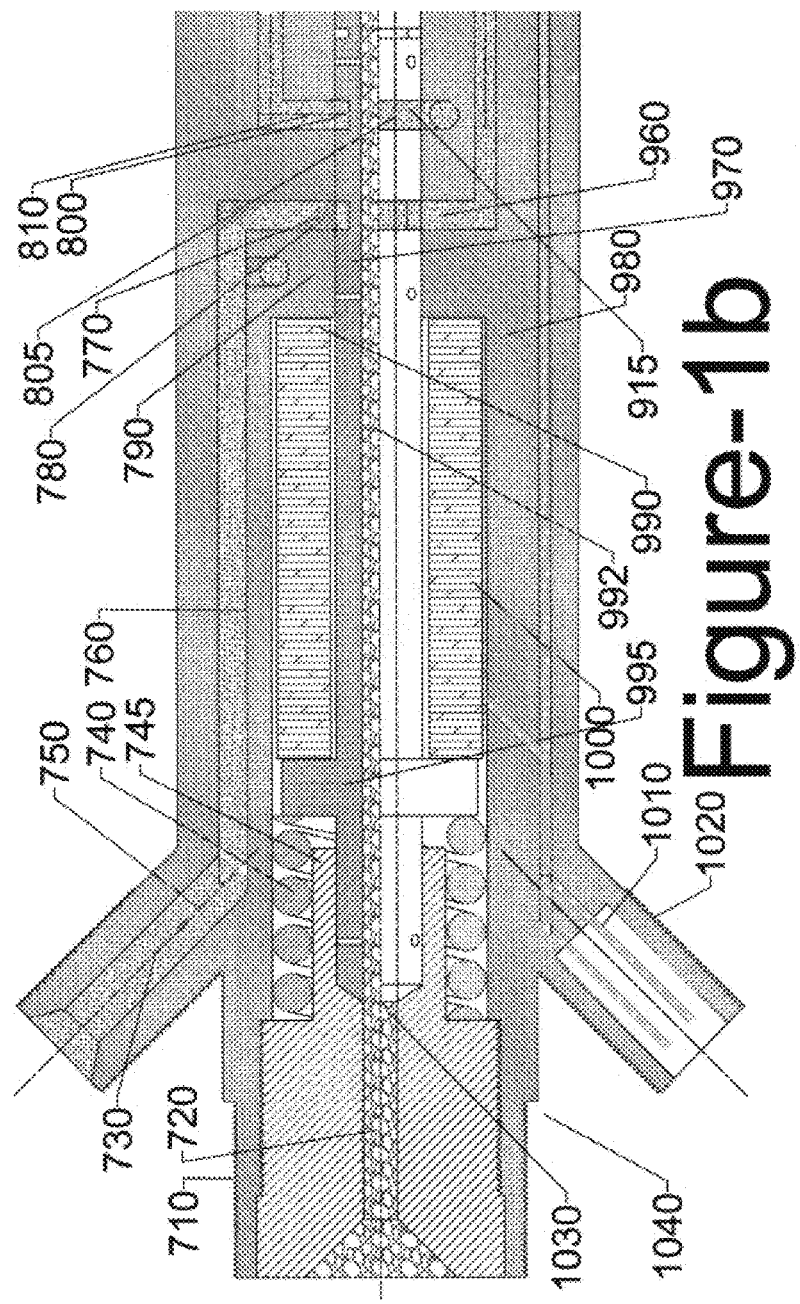

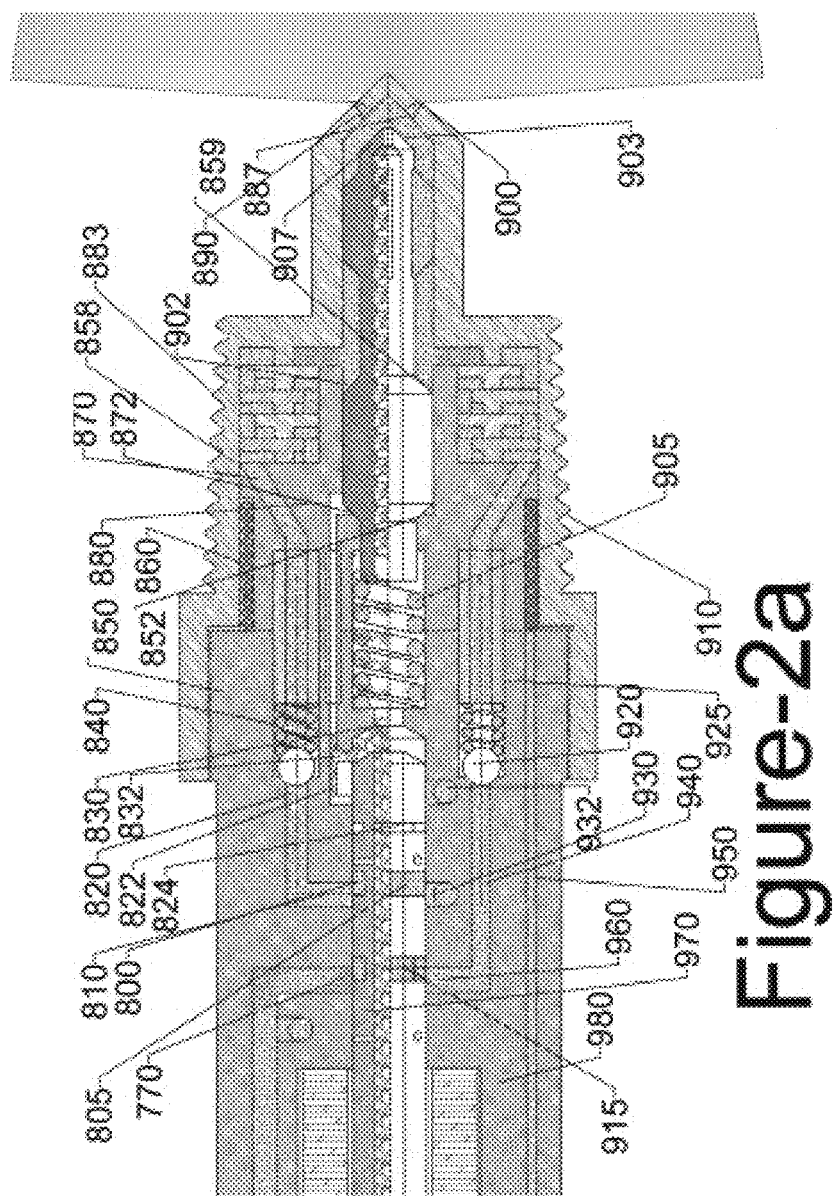

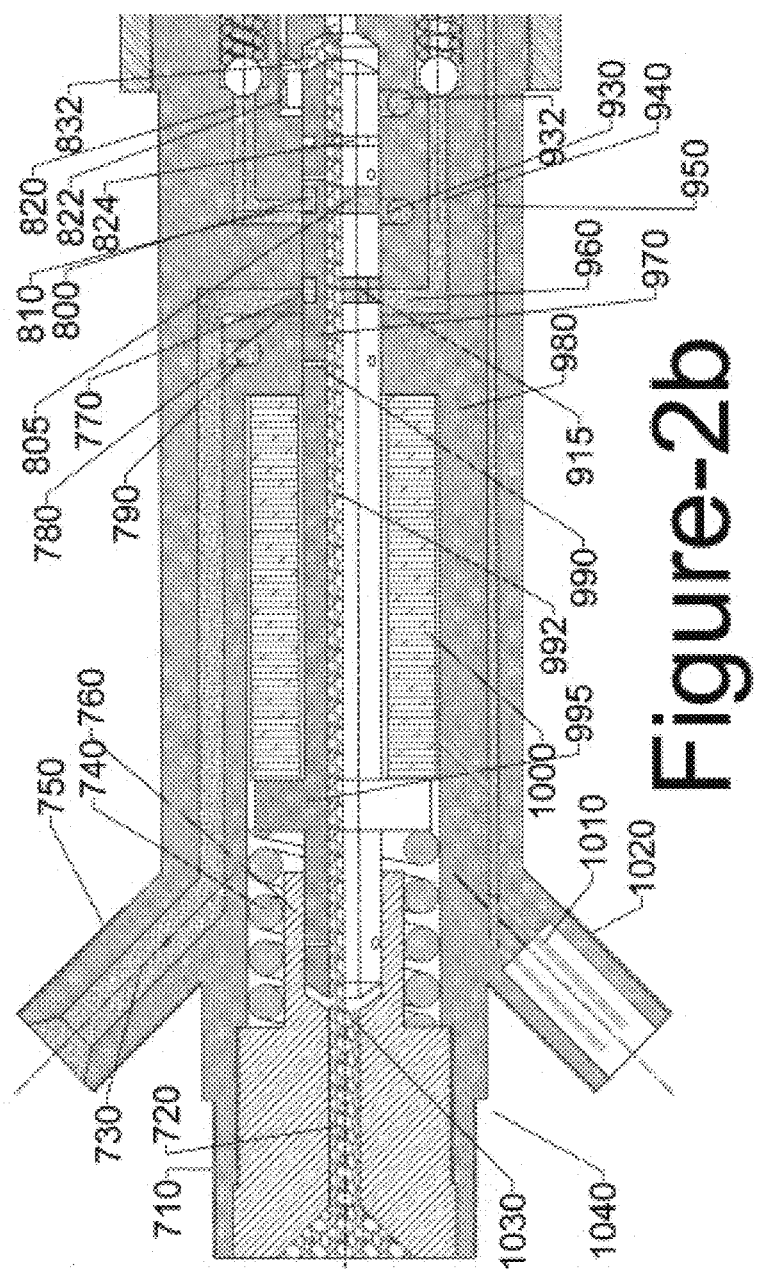

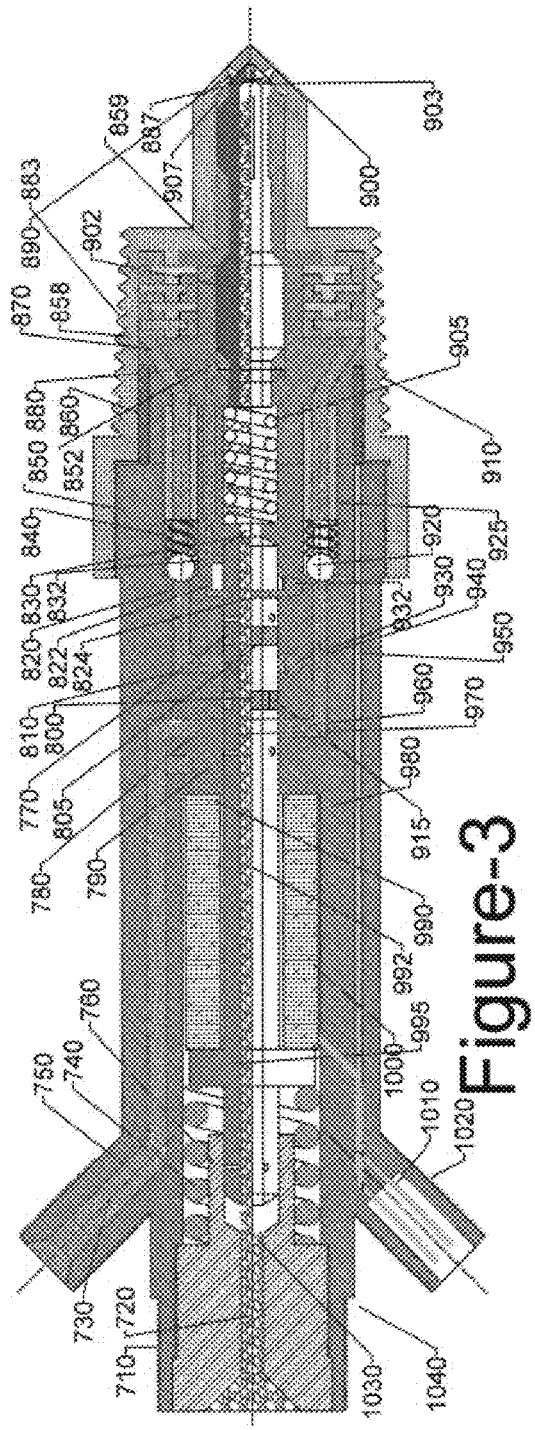

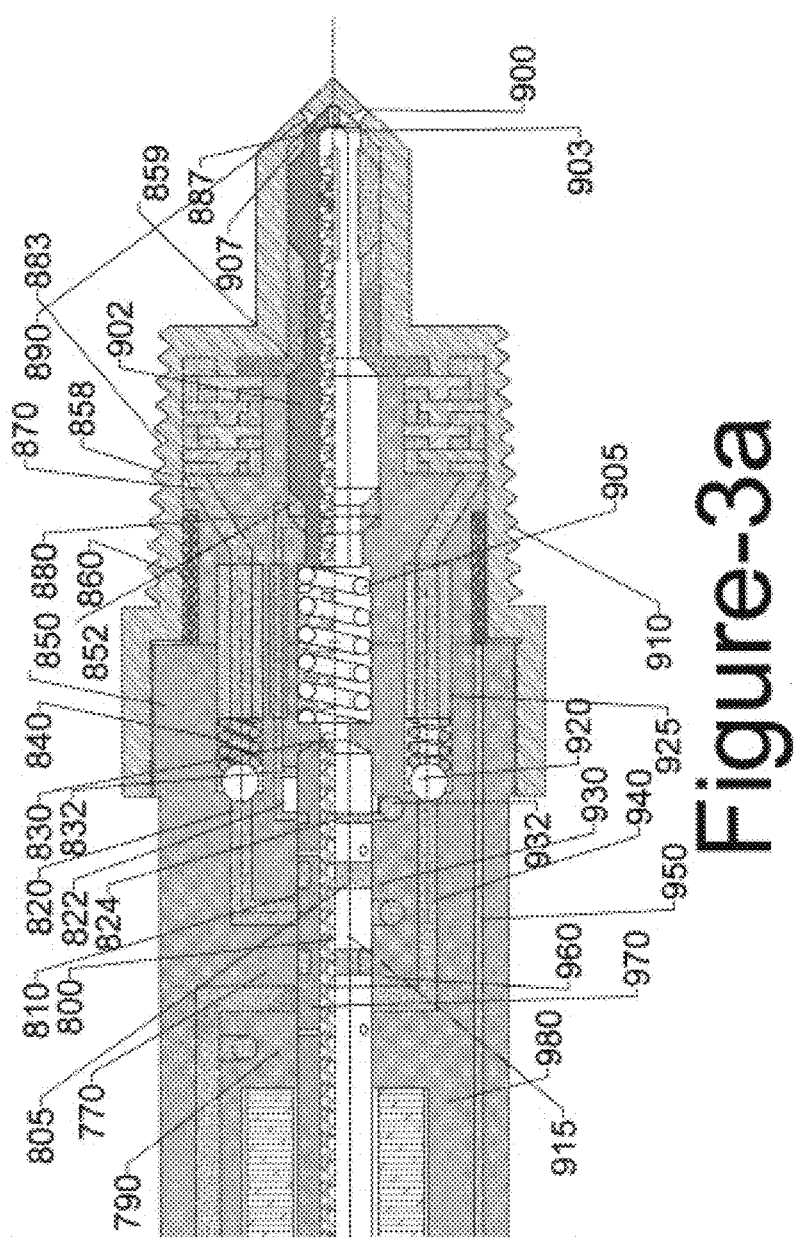

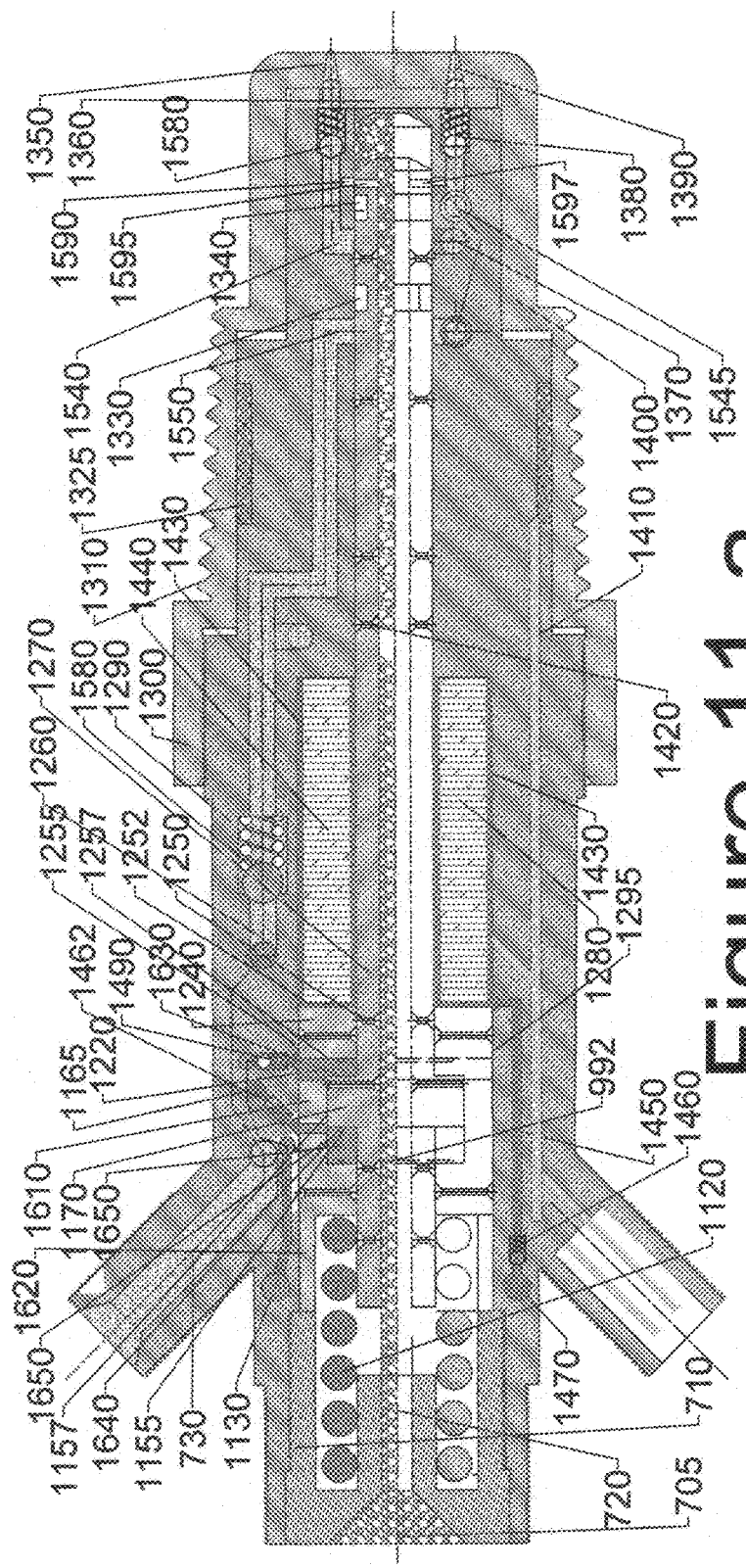

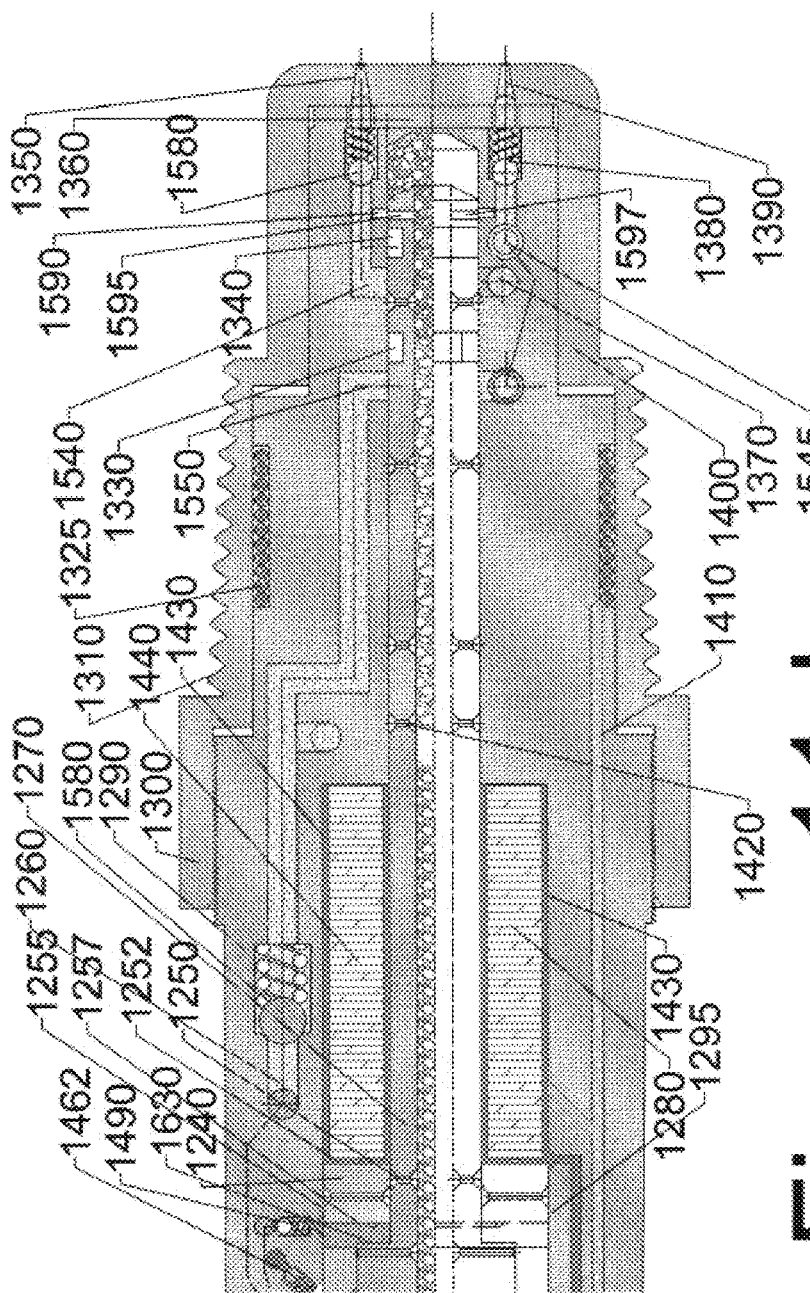

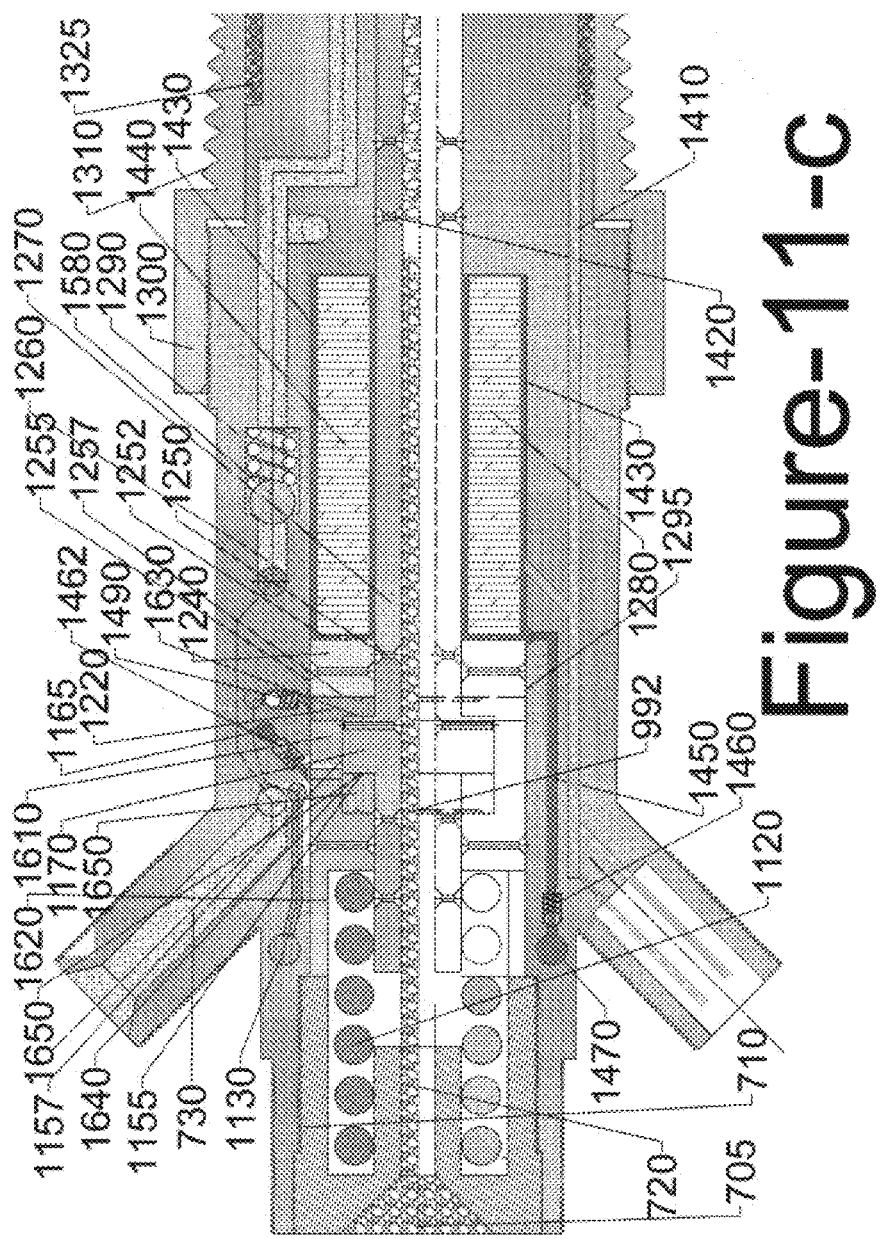

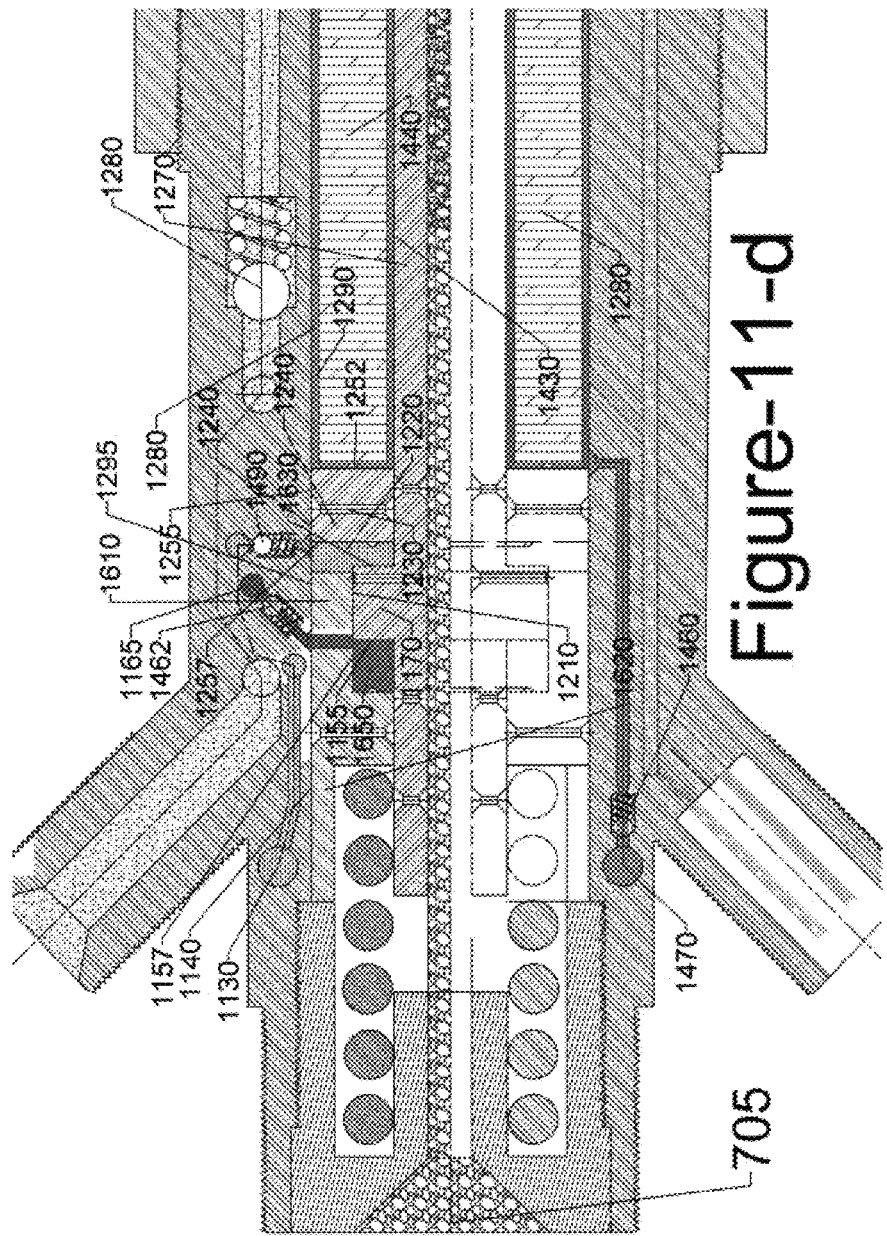
Figure-11-d

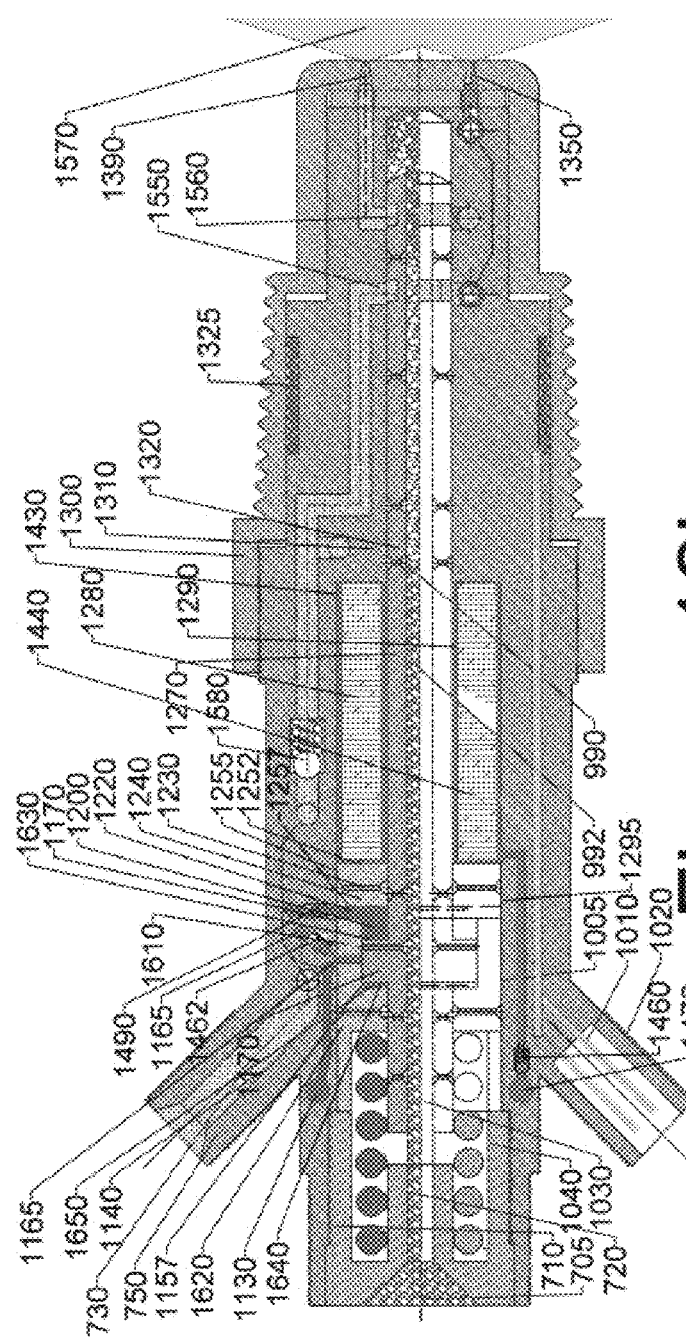

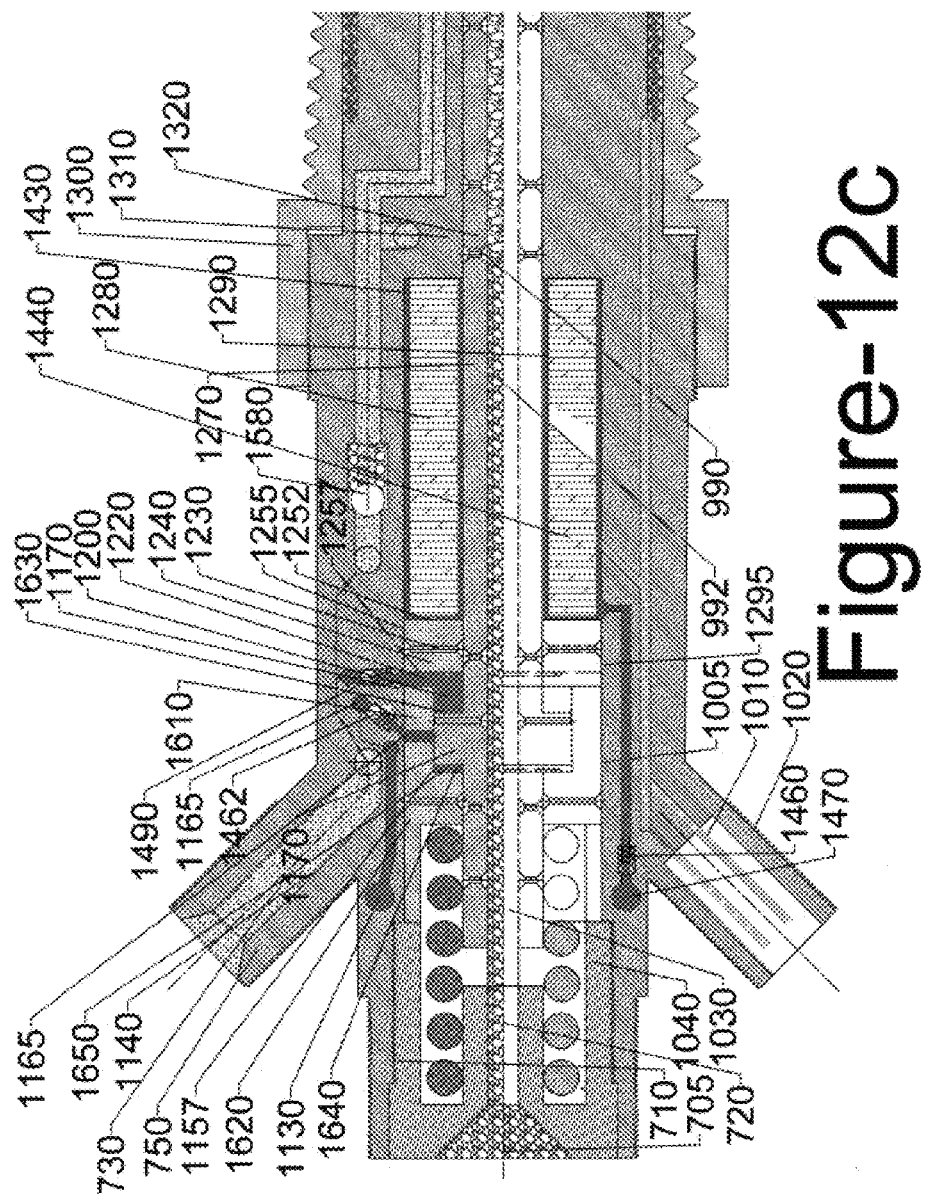

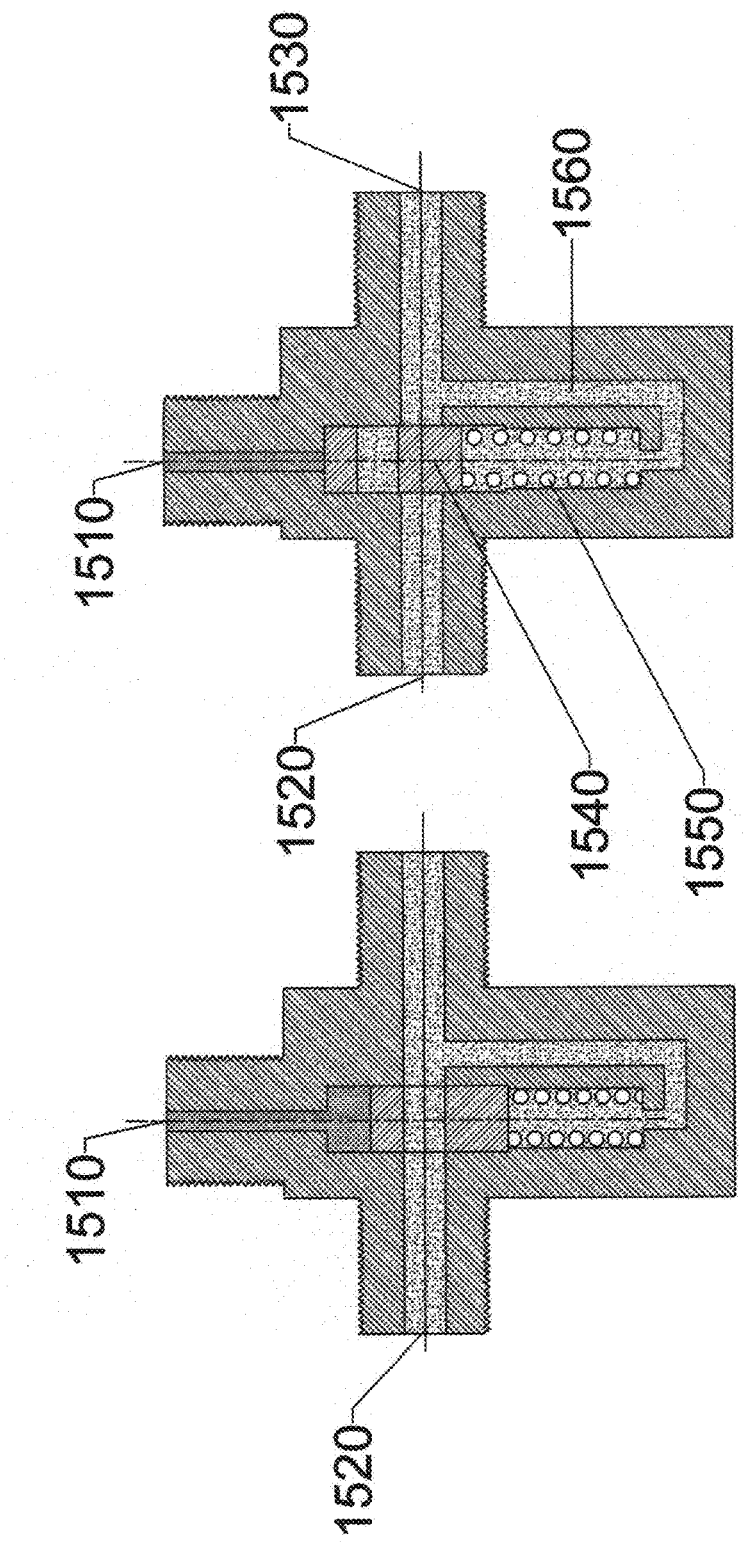

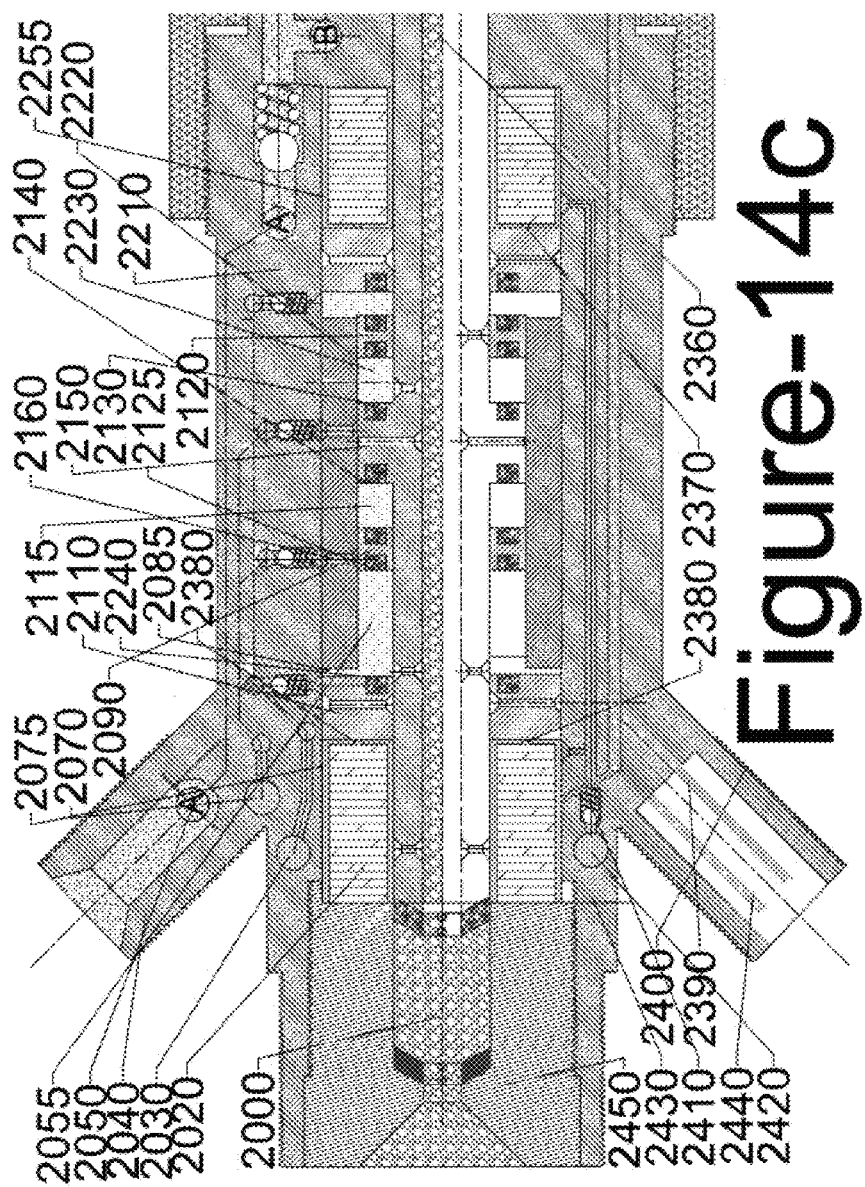

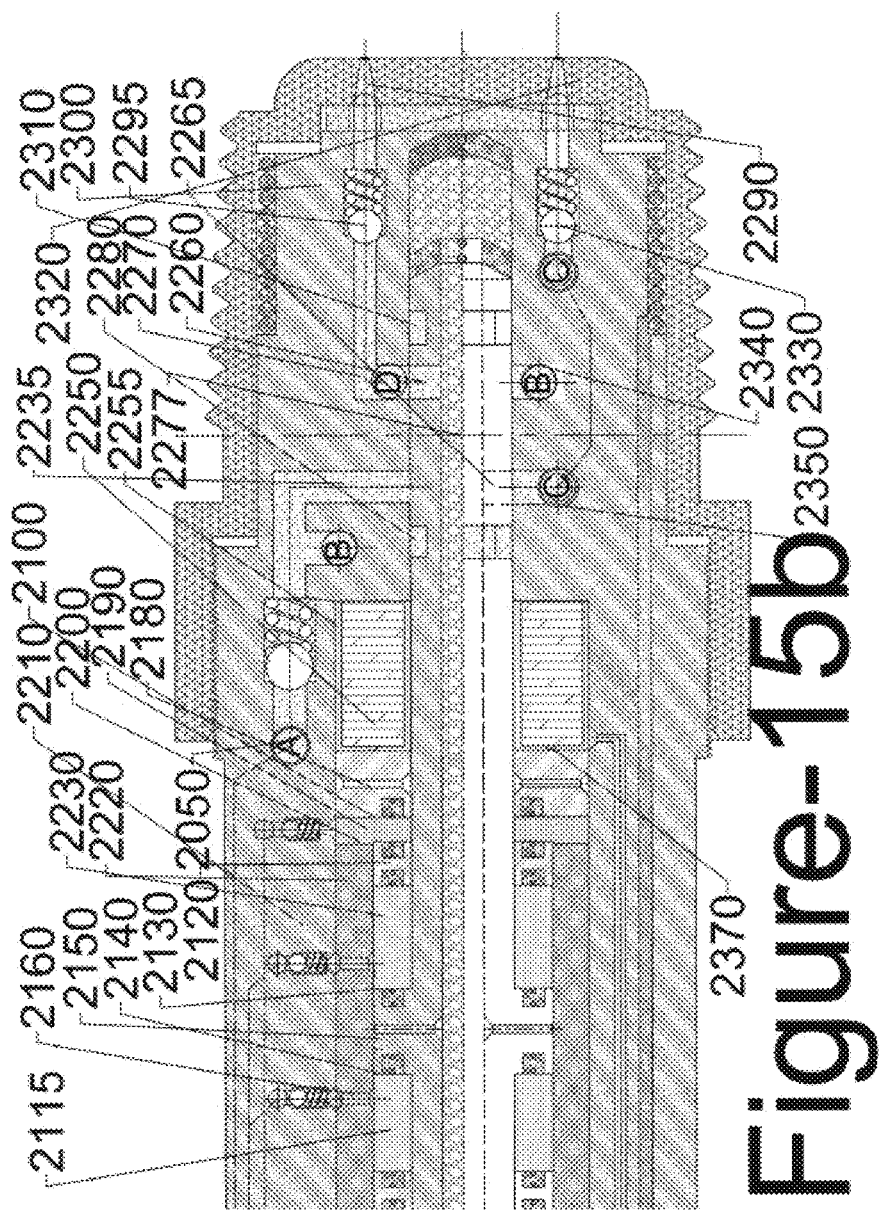

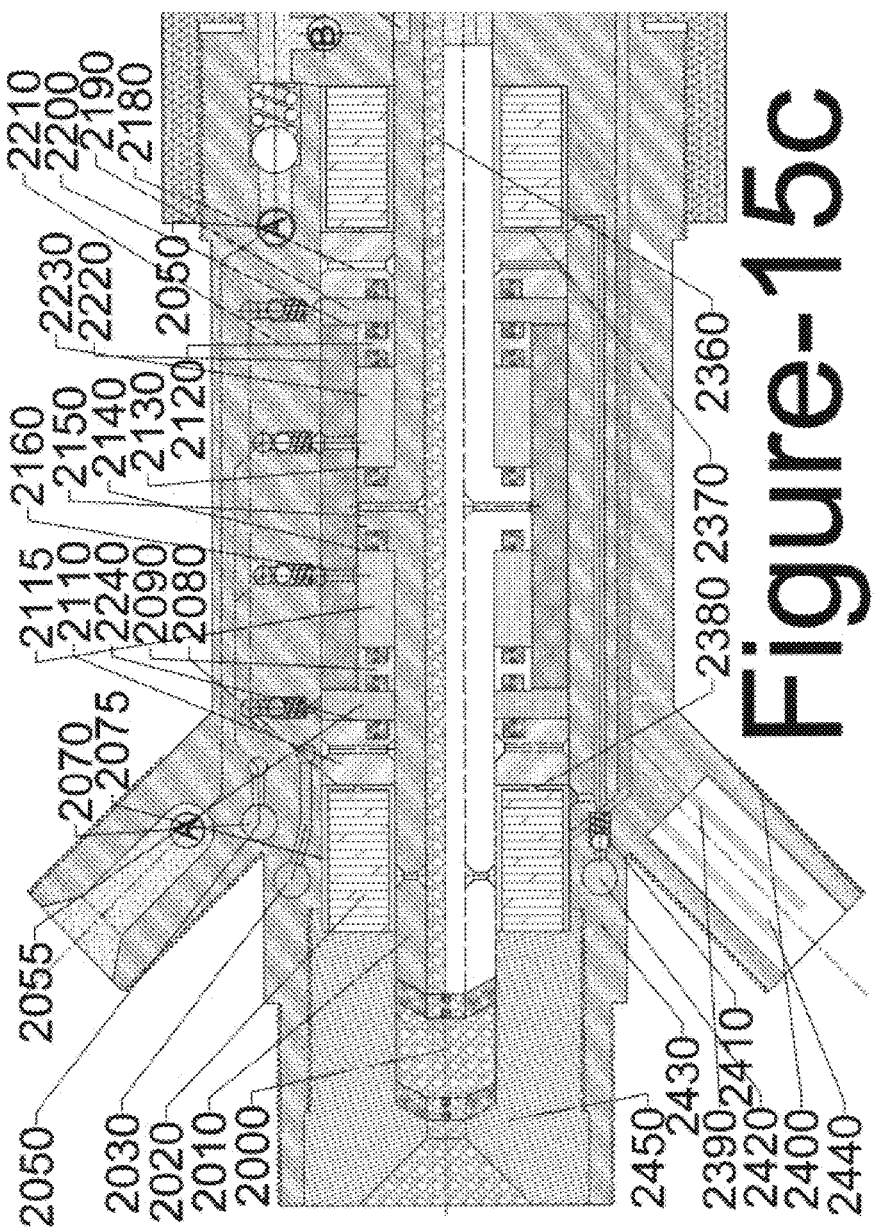

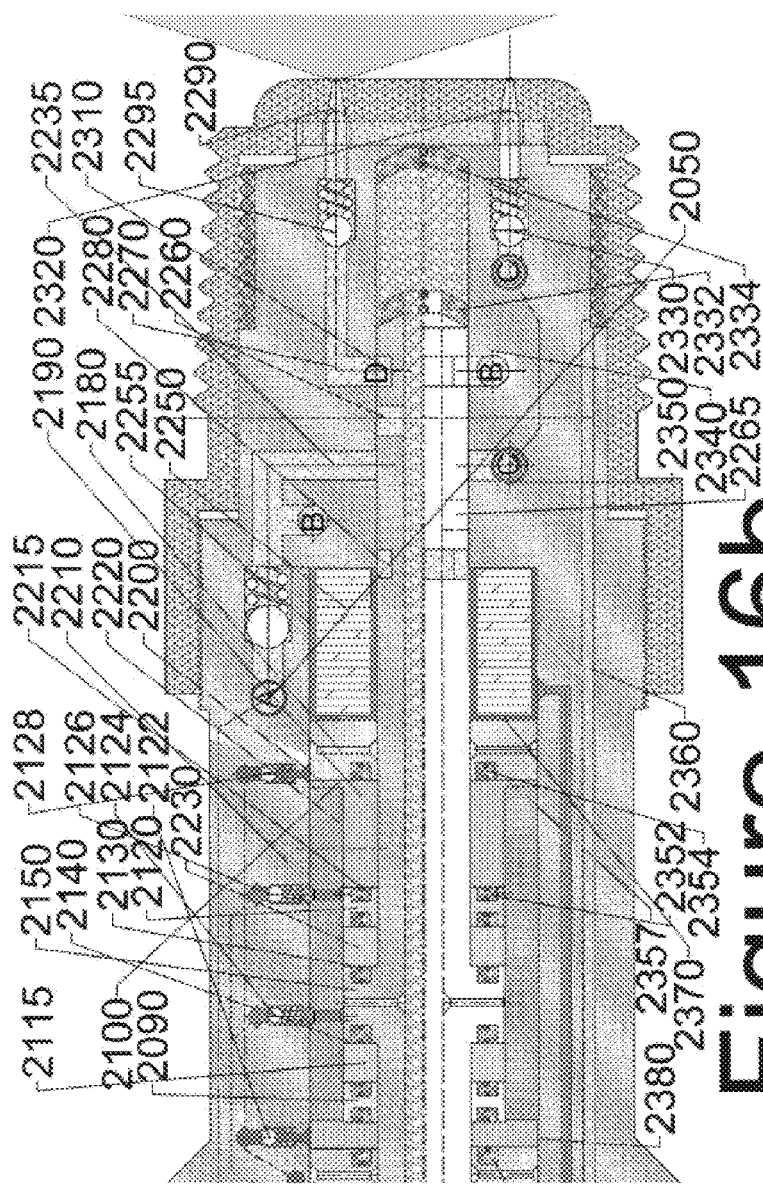

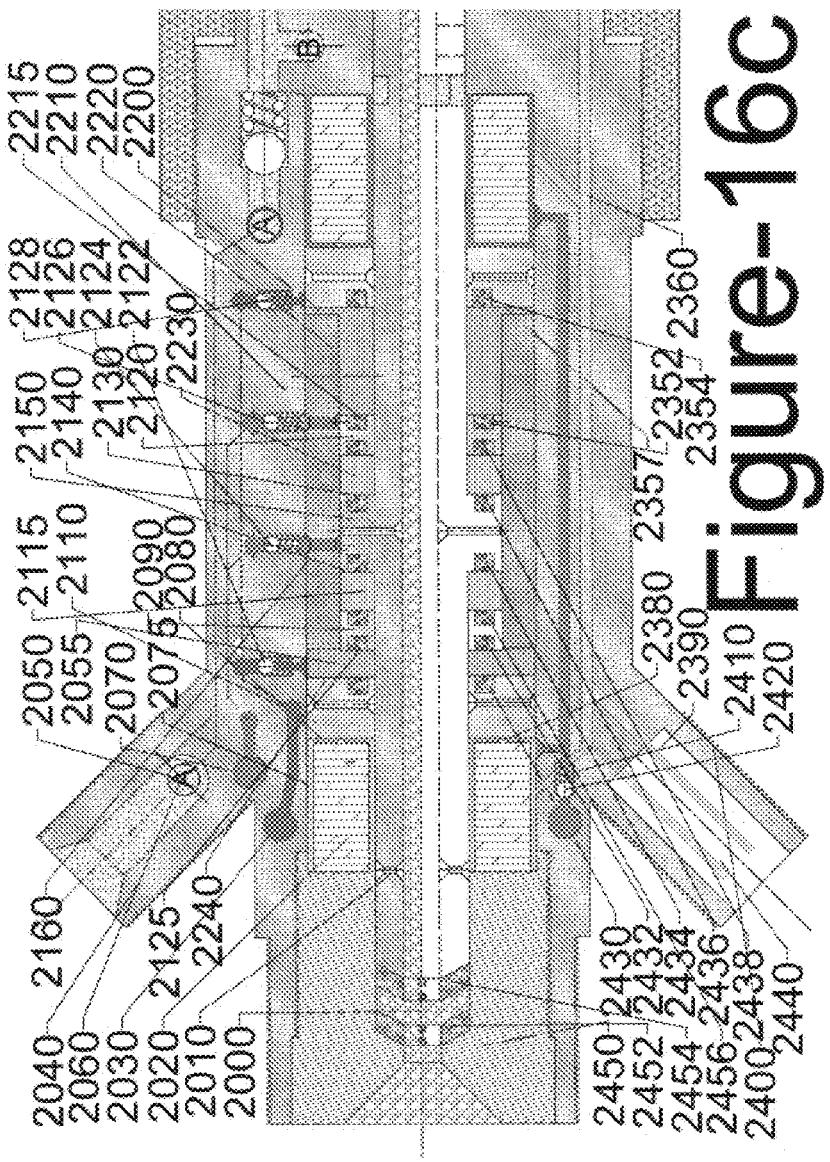

LEASCHAUER ENGINE

CROSS REFERENCE TO RELATED APPLICATION

This application is related to U.S. Provisional Application No. 61/37,270, filed Aug. 26, 2010, and is a Continuation in Part of U.S. application Ser. No. 14/172,668 dated Feb. 4, 2014, and claims priority thereto. Application Ser. No. 14/172,668 is hereby incorporated by reference in its entirety.

FIELD OF THE INVENTION

The featured Leaschauer Engine invention deals with new technology: an Internal Combustion Engine (ICE) where steamed misted fuel is introduced into extremely high pressure pre-compressed air (at its peak heat and pressure) in the cylinder when and where the piston is about to reach the Upper Dead Point (UDP).

This new technology is dramatically different from the existing technology, in that it removes the engine's dependency on the octane rating of the fuel in use and dramatically increases the detonation efficiency.

The new process holds back the misted steamed fuel droplets from entering the cylinder until completion of the critical compression stage is achieved, in contrast to the old technology wherein the atomized fuel was added into the cylinder at the beginning of the compression stage.

Using the old technology, the optimal maximum pressure detonation point could never be achieved since the detonation would have occurred prior to any such desired pressure being achieved, thus preventing the use of combustion pressures which exceeded the detonation point.

The Leaschauer Engine enables extremely high pressure detonation to gain efficiency extremely far beyond that achieved by gas and diesel engines. Furthermore, the Leaschauer Engine is not restricted to any fuel octane-specific detonation point, in contrast to the old technology.

The new Leaschauer (Engine) Combustion process or LCP therefore by increasing dramatically the detonation pressure while avoiding pre-detonation, increases the combustion efficiency as compared to traditional internal combustion gas engines which have been running for the last century at a very low combustion pressures (and therefore low efficiency).

Due to the extreme pressure detonation and the resulting extremely powerful engine strokes, it is anticipated that the Leaschauer Engine will be generally operated at low RPM, which is a desirable benefit in the industry since it further reduces fuel consumption, and increases the lifetime of the engine while reducing maintenance.

Furthermore, low RPM reduces the injection frequency, thereby increasing the lifetime of the implemented SLV injector (described below). As further described below, a low RPM engine such as the Leaschauer Engine can be employed in electrical car applications to dramatically increase their range (see details page 5-6 item d.17-d.19).

FIELD OF INVENTION AND THE LEASCHAUER (ENGINE) COMBUSTION PROCESS (LCP)

Leaschauer Combustion Process (LCP) Definition:

The claimed inventive Leaschauer Combustion Process (LCP) is a predefined method in time, displacement (space) and event (operational situation), to improve the internal Combustion Engine (ICE) detonation efficiency, cleanliness, and stability. It verifies the consumption of all the fuel components and by-products to maximize the main shaft torque with minimal fuel consumption, while not compromising environmentally friendly operation.

The LCP process is enabled/achieved by: dramatically increasing/converting the Specific Detonation Air-fuel (mixture) Pressure item, which was defined and described as item (e.16.7) and which is represented hereby again as follows;

(e.1637) Definition 19: Specific fuel/air (Mixture) Detonation pressure SMD pressure, is defined and referred to as:

The unique pressure (and heat) required for a specific fuel/air mixture at its optimal ratio to detonate as a result of compression and heat developed in the cylinder. The LCP process replaces the old technology refer to as SMD mixture with:

The inventive "specific Extreme Air Pressure (specific EAP) product". Such specific extreme air pressure which otherwise, if pre-mixed with the fuel component (as it practice in the old technology), would cause a premature detonation of the applied mixture in use.

In other words, by holding such fuel PMF product outside the cylinder during/until the completion of the compression stage, it will enable the required/desired Extreme Pressure Detonation EPD to be achieved.

LCP process, method detailed Definition: This method to achieve the Extreme Pressure Detonation defined and outlined above in c.1-c.1.e is accomplished by holding the "Pre-Mist/(Pre-Moss) Fuel product (PMF product)" outside the combustion chamber until the completion of the Specific EAP Air compression.

After that time, displacement (space) and event (operational situation), the Pre-mist fuel is injected at the optimal ratio during the predefined Post SFI Process (defined and included as an integral part of the LCP process), to satisfy the Leaschauer Engine requirements.

NOTE-1: It is important that one should recognize the LCP process as a claimed inventive process, which was specifically designed to overcome the difficulty of the old technology to increase the Specific Pressure (mixture) Detonation. Whereas:

NOTE-2 The Hardware involved with implementation of such an inventive process, e.g., cylinders, pistons, crankshaft, rods, valves, specially designed injectors, and its inventive applied structures, which are defined, described, illustrated and claimed in this disclosure, are designed solely to support the outlined LCP process.

That is, the LCP process does not depend solely on the hardware described herein. The LCP process is the principal invention, and the process could possibly be implemented with different hardware.

NOTE-3 It is therefore important to note that this claimed inventive LCP process is unique and any changes, additions or deletions to its components do not subtract from its inventive originality or genuine rights.

NOTE-4 The inventive hardware illustrated and described herein contain specific electro-mechanical structures along with technical design data, which is part of the entire invention and process.

NOTE-5 The entire invention, along with its claimed inventive process and implemented hardware contains and presents a new technology, which differs significantly from the old technology in its ability to achieve real Extreme Pressure Detonation. Therefore, such new technology as a whole, including its specified injectors, hardware, text and figures, are integral parts of this disclosure:

The Leaschauer Engine (EL Engine) patent is designed to support the process defined and outlined above, and in an embodiment employs a new feature, The SLV Injector, an extremely high frequency, post Synchronized Fuel Injector (post SFI). This disclosure introduces three applied injector implementations: the SFD type injector and two implementations of the SLV injector as follows:

the SLV Pressure Controlled Valve (SLV-PCV) implementation and:

SLV piezoelectric (solenoid) Controlled, self Resonance, fuel/Pneumatic actuator (injector) or SLV-CRP implementation For SFD type injector See also application Ser. No. 14/172,628.

The claimed 'Post SFI Process' (contained as a subpart of the claimed leaschauer Combustion Process' or LCP process) refers to/indicates that the Pre-Mist injection occurred after the "specific Extreme Air Pressure (specific EAP) product" compression was completed.

The new post SFI Leaschauer Engine injector referred to as the "Selector Linear Valve" (SLV) Injector on its two versions) enables the introduction of the processed fuel component to the compressed air component of the Leaschauer Engine process.

BRIEF DESCRIPTION OF THE DRAWINGS

FIG. 1a illustrates a tip view "on" state SLV-PCV Hydro-Return.

FIG. 1b illustrates a tail view "on" state SLV-PCV Hydro-Return.

FIG. 2a illustrates a tip view "Linear Zone" state SLV-PCV Hydro-Return.

FIG. 2b illustrates a tail view "Linear Zone" state SLV-PCV Hydro-Return.

FIG. 3 illustrates a full view "off" state SLV-PCV Hydro-Return

FIG. 3a illustrates a tip view "off" state SLV-PCV Hydro-Return.

FIG. 11a illustrates a full view "OFF" state SLV-CRP Hydro-Air self resonance actuator.

FIG. 11b illustrates a tip view "OFF" state SLV-CRP Hydro-Air self resonance actuator.

FIG. 11c illustrates a tail view "OFF" state SLV-CRP Hydro-Air self resonance actuator.

FIG. 11d illustrates a detail view "OFF" state SLV-CRP Hydro-Air self resonance actuator FIG. 12b illustrates a tip view "Linear" state SLV-CRP Hydro-Air self resonance actuator FIG. 12c illustrates a tail view "Linear" state SLV-CRP Hydro-Air self resonance actuator FIG. 13a illustrates a section of "Pass/ON" state Fuel/Air Equalizer (FAE) device FIG. 13b illustrates a section of "Off" state Fuel/Air Equalizer (FAE) device

FIG. 14c illustrates a tail view "Linear shift up" state SLV-PULSAR dual Hydro-Air self resonance actuator FIG. 15b illustrates a tip view "OFF" state SLV-PULSAR dual Hydro-Air self resonance actuator FIG. 15c illustrates a tail view "OFF" state SLV-PULSAR dual Hydro-Air self resonance actuator FIG. 16b illustrates a tip view "Linear shift down" state SLV-PULSAR dual Hydro-Air self resonance actuator FIG. 16c illustrates a tail view "Linear shift down" state SLV-PULSAR dual Hydro-Air self resonance actuator

DETAILED DESCRIPTION

See Sections d-i Below

Figure 1:
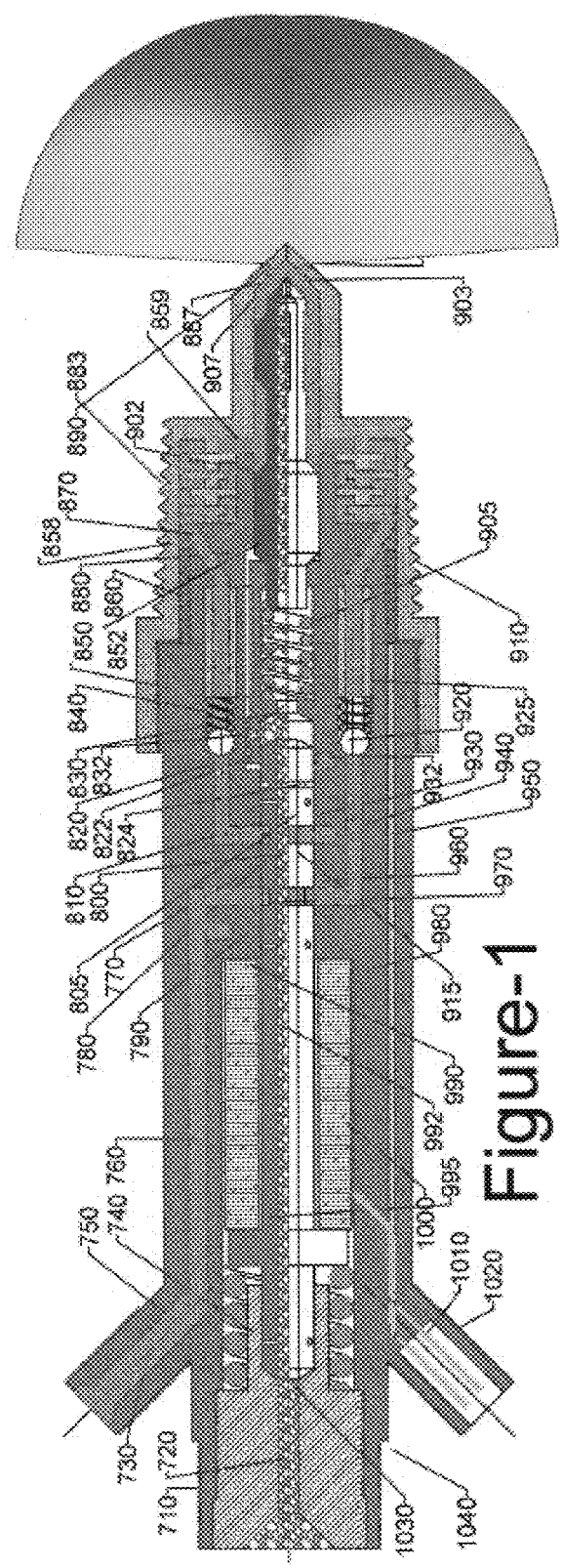
FIG. 1 illustrates a full view "on" state SLV-PCV Hydro-Return.

The SLV Type Injector is Described, Specified, Defined and Characterized as Follows:

High kinetic energy, Steamed Fuel droplets (which exhibit a high air/fuel mixing rate or high diffusion rate) and are referred to as Pre-Mist/(Pre-Moss) Fuel product or "PMF product" are injected into:

The specific Extreme Air Pressure (specific EAP) product (compressed air in the cylinder that already dramatically exceeded the specific pressure required to cause a detonation of the fuel intended to be used).

The PMF product of item d.1 above is injected into the cylinder when and where the piston is close to reaching the Upper Dead point (UDP)

The air to fuel ratio is maintained at an optimal value.

The injector is required to inject its pre-misted fuel into the specific extreme compressed air within a pre-defined window comprising a small portion of the Leaschauer Engine working cycle.

It is also required to define a starting point for injection relative to the UDP, referred to as the "phase", as follows:

"Window" is hereby defined as the active portion of the SLV injector "Injecting Period" (in reference to main shaft full revolution in degrees) where the SLV injector valve is opened and is spraying Pre Mist Fuel.

"Phase" in main shaft revolution degrees is the (SLV) injector spraying start point relative to the UDP. This is hereby defined as: the starting point prior to UDP where the SLV injector valve is set to open to spray the Pre Mist Fuel (relative in degrees to UDP).

It is anticipated that the process can function if injection occurs in a window less than 30 out of 360 degrees engine main shaft rotation of the "Working Cycle", close to the UDP. However, the preferred window, which will yield dramatically higher efficiency, is less than or equal to approximately 3 out of 360 degrees rotation of the "Working Cycle" near UDP.

The 3 degree spraying window should be considered only as a desired figure or target to be achieved. Meanwhile, the reality of the piezoelectric available at this time in the market, and the anticipated weight of the Spntle, in conjunction with realistic mechanical and physical limitations (see example e.14.34) dictates a more realistic spraying window of 5 to 8 degrees. Such figures in view of the available technology are more viable figures to be attained.

Sub definition of 'Working Cycle": In a 4 cycle ICE engine type, two revolutions of the main shaft are required for a complete cycle: one full revolution occurs during the compression/fuel injection/working stages. The 'Working Cycle' is hereby defined as the one full (360 degrees) revolution of the main shaft which includes the compression stage and the fuel injection/working stage. (A second revolution of the shaft is required for the exhausting and the reloading/enforced (of fresh air) stages, defined as "Service Cycle"). Therefore the window restriction requirement is measured in reference to the full 360 degrees of the 'Working Cycle')

The PMF product is injected into the cylinder when and where the compressed air in the cylinder is close to achieving its peak heat and pressure (the pressure at that point is much higher than the Specific Detonation Pressure point (SDP) of the fuel intended to be used).

The Leaschauer (Engine) Combustion Process (LCP) is targeted to achieve Extreme Pressure Detonation (EPD) while maintaining the air to fuel mixture uniform and in its optimal ratio to maximize efficiency.

The Leaschauer (Engine) Combustion Process (LCP) provides sufficient time to complete the detonation, burning and consuming of all the fuel components and by-products prior to or during the start of the working cycle, to ensure stability and cleanliness of the process.

The implemented injectors (SLV type Injectors) are designed to inject high pressure fuel supplied by an external pump into the extreme compressed air pressure in the cylinder with enough force to propel the mist into the highly pressurized compressed air in the cylinder.

The pressure for the inlet fuel should preferably be 10K-50K PSI to block return gases from the cylinder, although it is anticipated that inlet fuel pressures in the range of 2K-400K PSI can be used.

The injector must be able to switch on-off at a rate in the range between $1/1000$ second and $1/100,000$ second, although it is anticipated that a switching rate of 1:10000 of a second will be sufficiently fast for the fuel pressure range described.

These numbers are applicable for a shaft rotation speed between 700 to 6000 RPM, although a preferred rotation speed is approximately 2000 RPM.

The Leaschauer Engine is designed also to support the development of electric cars which employ a redundant fuel power source to dramatically increase (and ensure) their long range capacity.

For electric cars, the car's main driving power (as well as its speed/performance function) is generally provided by the main electrical motor coupled with a battery pack. A low RPM Leaschauer Engine could function as a support during long trips when the battery pack might become exhausted and requires recharging.

The recharging could occur in a calculated fashion that would typically avoid the need for a high RPM supporting engine.

DEFINITION OF TERMS USED IN THE ARTICLE AND INVENTION BASIS OF OPERATION

Definitions

Described hereinafter are definitions of some frequently used terms in the application to assist the reader in understanding the technology.

Definition 1

Multi Compression Steps (MCS) ICE Engine

An engine configured to dramatically increase the atmospheric pressure by using sequenced multiple compression stages to increase its combustion efficiency (when mixed with atomized fuel at the optimal ratio), to assist with radiated parasitic heat, and to reduce the mechanical load on the pistons, rods and crankshaft at the final stage.

Definition 2

Pre (Compression) Sequenced Fuel Injection (or Pre SFI)

A method to inject fuel droplets into lower than/mid-pressure of atmospheric pressure air (by injection or other way) prior/during to the beginning of the compression stage.

Definition 3

The Inventive Post (Compression) Sequenced Fuel Injection (or Post SFI)

A method to inject atomized (steamed/evaporated) fuel foam into compressed air at its peak high pressure and heat stage for high efficiency combustion.

In other words, to time and manipulate the detonation timing by accurately controlling and timing the fuel injection moment. This inventive process provides the benefit of enabling extreme high compression combustion without risking pre-detonation.

This benefit is gained by holding the fuel droplets out of the cylinder until seeking detonation to occur. This method dramatically reduces any dependency on the Fuel type/octane in use.

Definition 4

Sequenced Fuel Injector (SFI)

A high pressure fuel source that can overcome the peak pressure and heat existing in the cylinder in proximity to the Upper Dead Point UDP, and that can deliver the calculated fuel mass required at that moment, by injecting atomized steamed/evaporated fuel droplets when detonation heat and pressure conditions in the cylinder are met.

Definition 5

Extreme Frequency Fuel Injector

An extreme frequency on/off fuel valve (which may be mechanical, electrical or other type such as piezoelectric), capable of delivering a series of small quantities of synchronized atomized (steamed) fuel droplets (Pre-Moss/or Pre-Mist) by switching on-off at a rate in the range of milliseconds to micro seconds.

Definition 6

Optimal Detonation Conditions (of ICE Machine)

The conditions (pressure and heat) developed in the cylinder, that cause a specific fuel (defined by its type, e.g., light vs. heavy, and octane number) to detonate (when it is in its optimized air to fuel ratio, and the fuel air mixture is uniform)

Definition 7

Pre-Detonation

The undesired condition where the pressure of air/fuel mixture in the cylinder exceeded the specific detonation pressure point and ignition (detonation) occurs prior to achieving the desired Extreme Detonation Pressure (EDP).

Definition 8

Leaschauer Engine (LE) Machine Employing Post (Compression) Sequenced Fuel Injection (Post SFI) Process An engine utilizing a single or multiple step extreme compression process designed such that the detonation is timed and manipulated, by controlling the fuel injection moment to occur post-compression, at substantially the final (highest pressure) point, maintaining fuel-Air ratio in its optimal conditions and Air fuel mixture is uniform.

Definition 9

Specific Extreme Air Pressure (Specific EAP) (in Conjunction with the SLV Type Injector and LE Machine) is Hereby Defined as Compressed Air in its final compression (heat) stage, when and where the piston in the cylinder is close to reaching its Upper Dead Point (UDP). The pressure has already dramatically exceeded the specific pressure (and heat) required to detonate the fuel intended to be used (SMD mixture see definition below).

Definition 9 is dramatically different than Definition 19 see item e.16.7 below which is redefine hereby as follows:
  (e.16.7) Definition 19: Specific fuel/air (Mixture) Detonation pressure (SMD) pressure:
  Specific fuel/air (Mixture) Detonation pressure SMD pressure is define and refer as: The unique pressure (and heat) required for Specific fuel/air Mixture in its optimal ratio to detonate as a result of compressing (for fuel/diesel configuration) in the cylinder.
  The main different between definition 9 and 19 is that: Definition 9 does not include the fuel component in the compressing stage and therefore it is entirely controlled by the fuel component being injected for detonation to occurred.

Such Specific Extreme Air Pressure (Specific EAP) pressures are in the range of: for a gas engine between 170-2400 PSI and for a diesel engine 330-3000 PSI, while maintaining a predefined detonation point in time, place (displacement) and event of the process which permits sufficient time for consuming and completion of the burning of all fuel/(by-product) components, at the power stroke, for the most efficient, clean and stable process.

Definition 10

Pre-Mist/(Pre-Moss) (Processed) Fuel or PMF (in Conjunction with the SLV Injector and EL Machine)

Referred to as the processed fuel component (Pre-Mist), which converts high pressure fuel into atomized, steamed/evaporated, high kinetic energy, fuel droplets (which exhibit an extremely high diffusion capability).

When and where such Pre-Mist processed fuel is introduced with the Specific Extreme Air Pressure (Specific EAP) in the cylinder (maintaining optimal Air to Fuel Ratio), it avoids the formation of non-uniform air fuel packets (during the very short window available to conduct such a diffusion).

Thereby avoiding a dramatic reduction of the efficiency, cleanliness and stability of the detonation, while maintaining (as mentioned) an optimal air to fuel ratio during the process.

The PMF is injected to the EAP at a point in time and space where the pressure and heat in the cylinder already dramatically exceeded the detonation pressure of the fuel intended to be used.

Definition 11

"Extreme Pressure Detonation" (EPD) is Hereby Defined (in Conjunction with the "SLV Injector" and EL Machine) as Preconditioned detonation, which occurs as a result of the introducing of the; (previously defined) "Pre-Mist" processed Fuel component, into the (previously defined); "Specific Extreme Air Pressure" (Specific EAP) components.

This occurs while air to fuel ratio is at an optimal value, air fuel mixture is uniform, the pressure has already dramatically exceeded the pressure required to detonate the fuel intended to be used, and sufficient time has been allowed to complete the burning and consuming of all the fuel component/by-product at the power stroke for most efficient, clean and stable process.

Definition 12

Pre-Mist Mixture (PMNI) is Defined (in Conjunction with the "SLV Injector" and EL Machine) as Extremely non stable, final "Air-fuel" uniform product, resulting from the diffusion of Pre-Mist Fuel (PMF), with the specific Extreme Air pressure (EAP) (heat). Under these conditions the Pre-Mist Mixture (PMM) is in an extremely unstable condition, and detonation occurs in an extremely short period (typically in the milliseconds/microseconds range)

Thereby causing detonation in a very short time from its formation (in the range between milliseconds and microseconds, depending on the pre-compressed pressure/heat in the cylinder and the quality (fuel type: diesel/gas, octane number) of the pre-mist fuel injected).

In an embodiment of the SLV type injector, its previous implementation (SFD type) mechanical gearing and complex shaft systems are replaced by an Electrical Control Signal (ECS) unit FIG. 10 (1170/1180) (which will be further defined in definition e.16 below). The ECS final signals in this embodiment are generated by the "Electrical Control Signal generator" or (ECS generator FIG. 10 1180) which generates the entire final control signals to all cylinders required for proper operation of the EL Engine and SLV type Injectors.

Figure 10:
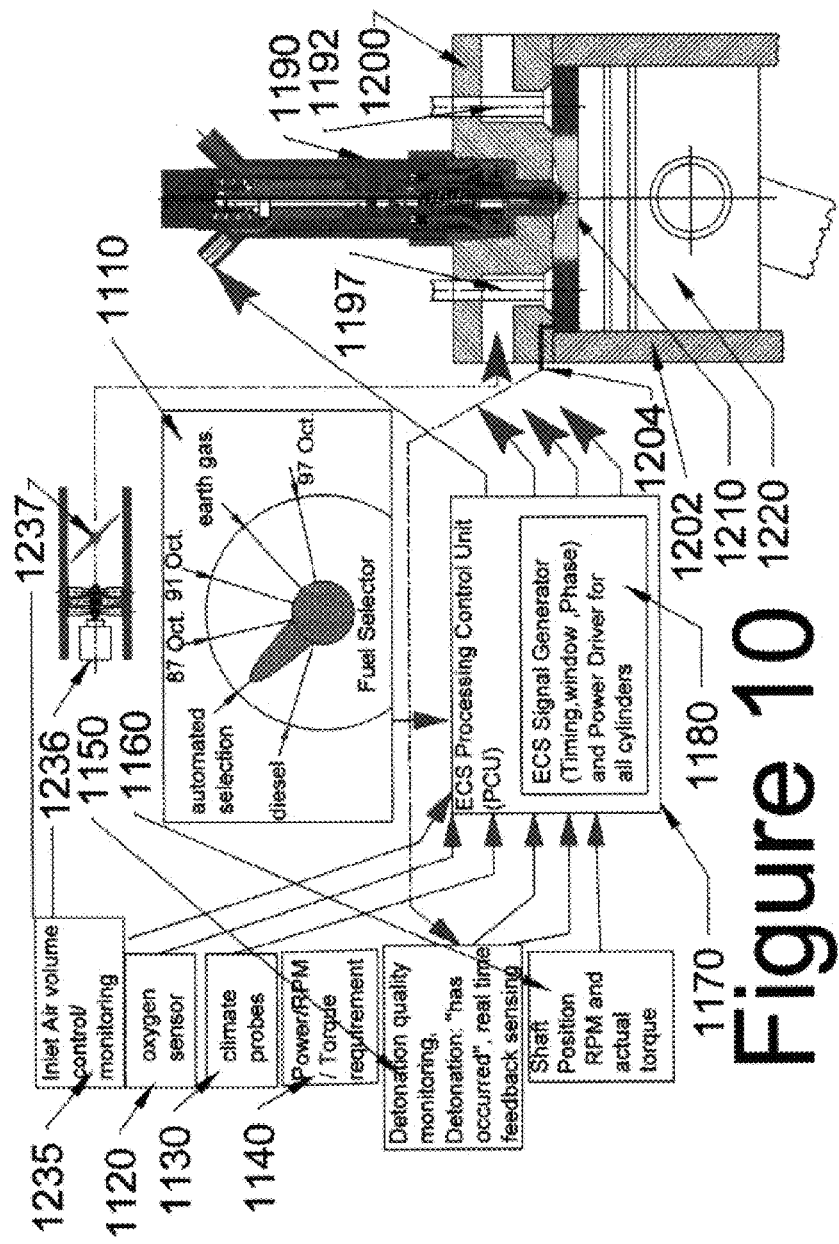
FIG. 10 illustrates a system schematic diagram of main signals flow, including input signals entering into the ECS unit to produce the required timing, window, phase, monitoring and power drive of the SLV Injector.

The ECS generator FIG. 10 (1180) along with the processing unit FIG. 10 (1170) receives continuous, real-time, accurate, electronic main shaft position data, defined as "Shaft Position Indication signal" (SPI signal) FIG. 10 (1160) used by the ECS generator FIG. 10 (1180) to determine the phase and the window required for the specific fuel (fuel mix) in use.

The ECS generator also receives a Fuel Mass (torque) Requirement signal (FMR signal operator/user defined) FIG. 10 (1140) to determine the linear voltage activation level required to drive the injector actuator so as to achieve the desired RPM under a specified torque requirement.

More signals may be involved with controlling of the ECS generator. Examples of additional signals are:

fuel type: Diesel/Gas and octane # in use or Automatic selection to be defines by the processing unit (see e.12.6. a,b,c below). (may operator/user defined by flipping a remote selector switch FIG. 10 (1110).

Or by placing a Detonation Sensing Probe (DSP 1204) device (and DSP driving unit 1150), FIG. 10, to acquired feedback report in real time (the actual time, place) that the event: "detonation has occurred" (relevent to the corresponded cylinder).

Such device enable the Processing Control Unit (PCU) to calculate the actual fuel mix in the tank by mean of comparing the detonation delay in reference to the injection moment (applying ECS signal) which may typically equivalent/associate to a item in table stored in the PCU memory and:

Accordingly reconfigure and correct the window and phase to optimized the controlling ESC signal to achieve detonation as desire in approximate to UDP Air (environment) temperature/air pressure signals (sent by temperature/pressure sensor) or Climate Sensor FIG. 10 (1130)

Burning (detonation) quality signals or Detonation Quality Monitoring FIG. 10 (1150).

Oxygen Sensor FIG. 10 (1120) used also to determine proper detonation of the EL Engine.

Those signals are usually generated by sensors/probes mounted in the exhaust system (cylinder tip) and are critical indications for proper operation of the EL Engine, (in order to monitor and correct the consumption of by-product burning and detonation efficiency). These additional indication signals are outside the scope of this application.

The purpose of using ECS generator is to avoid the need/replace the use of any mechanical gearing or complex shaft system which may used in the SFD type (injection). It simplifies the system, makes it flexible in terms of fuel type and octane #, so as to enable the use of any desired fuel out of the variety of fuels available on the pump or fuel mix.

The Fuel selector is an optional "User Interact Device" to select the fuel intended to be used. It provides input data to the processing Unit used to adjust for the fuel being used. This data along with all the other indications and probes described above are used by the processing unit to adjust the timing phase and window in accordance to the Specific Fuel Mix (SFM) (see Note e.12.14.1) (and other variables) required by the EL Engine.

The design of the ECS and its detailed specifics are not within the scope of this application, and are mentioned here primarily as main functional components involved with the operation of the EL Engine.

Note-1: This article provides a general description of the ECS Generator unit, including a description of some of its control components (e.g., Fuel type/Octane/mix # Selector switch which is operator defined), main shaft position, and some sensing/indication/input signals.

Note: Specific Fuel Mix (SFM) defines as the actual fuel resided in the tank which may consist of several different types of fuels which may had added to the tank during normal refueling in accordance to the fuel availability at the pump.

Note-2: This article also provides a general description of the ECS output signals generated by the ECS Generator Unit to drive the SLV Injector in accordance with the Leaschauer Engine requirements.

Such a Fuel Selector (1110) is Operator/User defined and may be contained and assembled remotely on the ECS Generator to adjust the Leaschauer Engine to the fuel "type" (Diesel 1, 2/Gas) and "octane number" such as (#87 to #100) in use for best economy and availability on the pump or as mentioned in e.12.6a PCU automated adjust to fuel mix.

Note regarding e.12.16: yet another big benefit of the Leaschauer Engine is to enable the flexibility of selecting the desired fuel during operation. This is in contrast to conventional ICE machines, for which one has to establish right from initial design stage the ultimate, fixed, pre-defined, specific fuel.

This quality of e.12.17 stands in contradiction to the old technology due to mechanical optimization requirements needed in the old technology to maintain the cylinder compression pressure safely below (and close to) the specific detonation point. Such restriction is not affecting the EL Machine as mentioned, due to the flexibility to adjust the Engine to the desired fuel type and octane (as a dependent benefit resulting from introducing the processed fuel at the end of the compressing stage (post SFI)).

Sections e.12.16-e.12.18 therefore describe another important quality of the Leaschauer Engine in conjunction with the SLV injector: flexibility to use any desired fuel, just by conveniently switching the fuel mode selector to adjust for adequate timing of the Electronic Control Signal generator (ECS generator).

It is anticipated that the functionality of the Fuel Switch could have been provided automatically instead of with a manual adjustment, by an appropriate detonation/fuel sensing probes (DSP 1204) driven by automatic system 1150 or detonation best quality automatic adjustment to the fuel mix in the tank.

SLV_PCV Injector

A First Embodiment of the SLV Injector is Described as the SLV-PCV Injector.

(see FIGS. 1(*a,b*), 2(*a,b*), and 3(*a,b*) unless specifically indicated otherwise). The featured linear fuel switch referred to as:

"Selector Linear Valve-Pressure Control Valve" (SLV-PCV)\

Note: the terminology "SLV" is a general term which refers to all the various SLV embodiments described herein. is hereby defined as follows:

Definition 13

SLV-PCV refers to an Extreme pressure high frequency linear fuel switch valve and is constructed mainly of a plunger referred to as: Selector Pin Needle (SPN) and/or (Spntle) (800, 970, 995). For the purposes of this disclosure, Selector Pin Needle and Spntle will be used interchangeably and be defined as the plunger (800, 970, 995) illustrated. (See also FIGS. (1, 2, and 3)(*a,b*) which illustrate an enlarged view of the SLV-PCV valve in its main states.

The Spntle is fitted and assembled into Miniature Cylinder Housing (MCH) (980). The MCH, along with the entire injector assembly, is anchored/threaded into the cylinder head 1200, See FIG. 10 SLV injector (1190), Leaschauer Engine: Cylinder Head (1200), Combustion Chamber (1210) and Piston (1220) while the injector tip part resides in the Combustion chamber to deliver the Pre-Mist fuel.

The Nozzles Assembly Tip (NAT) (890) or injector Pre-Misting Evaporating Head (Injector's PME Head) contains the entire assembly head. Since the PME Head Assembly resides within the top combustion chamber of the cylinder. It is therefore fixed with respect to the engine. The Spntle moves with respect to the MCH during the fuel injection process.

The Spntle is structured with one or more circular grooves around its circumference (780, 915). These are referred to as Circumferential Circular Grooves (CCG's)

Figure 3B:
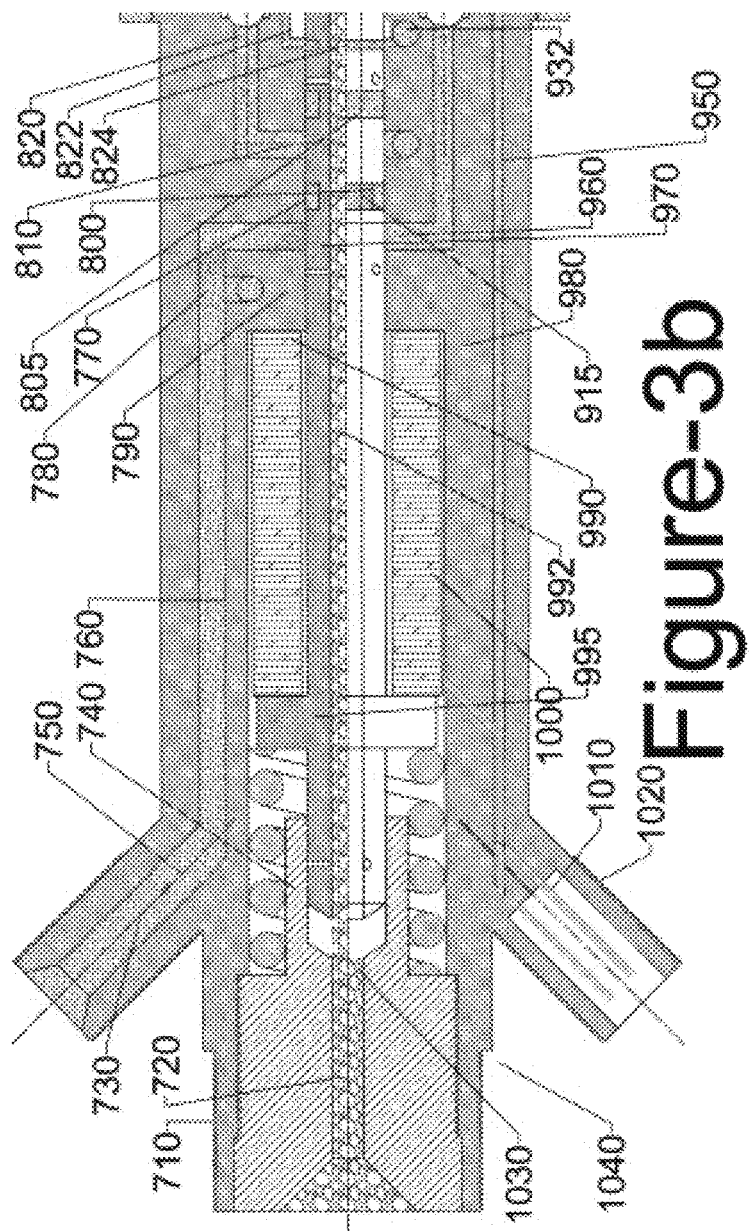
FIG. 3b illustrates a tail view "off" state SLV-PCV Hydro-Return.

The Spntle is also enabled to have miniature shifting up and down in its axial direction. (FIG. 4 (30) defines and illustrates the "UP" orientation in the axial direction). FIG. 3(*a,b*) describes the "OFF" states.

Figure 2:
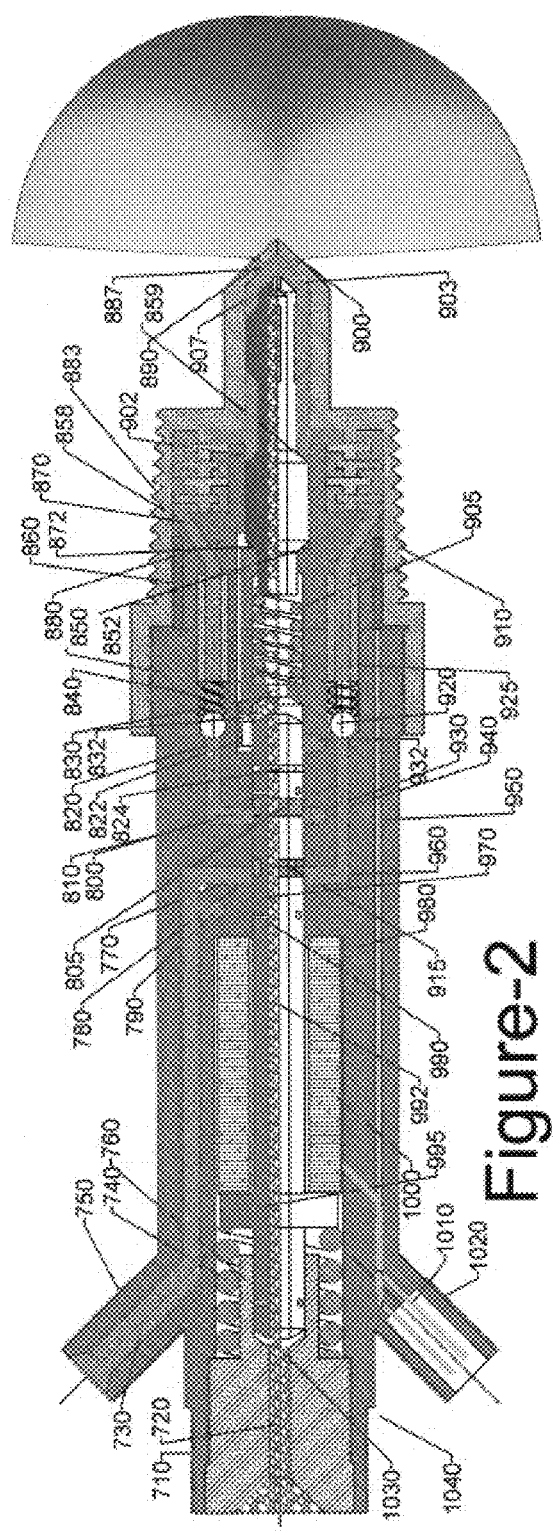
FIG. 2 illustrates a full view "Linear Zone" state SLV-PCV Hydro-Return.

Shifting the Spntle in the "UP" direction aligns and exposes inlet FIG. 1-3 (*a,b*) (780, 930) and outlet FIG. 1-3 (*a,b*) (810, 960) openings (IOPs) in the Miniature Cylinder Housing (MCH) (980) to the circular grooves (see FIG. 1-3(*a,b*) (770, 805,800,915). This alignment permits fuel to flow to the outlets (960, 810). Thus it is shifting of the Spntle in its up direction which enables the SLV Fuel switch to change the mode from its "OFF" state to the "Minimal"/"Linear"/"On" ones.

The state zones are defined in the next section. Fuel flow is enabled through the SLV switch.

Figure 7:
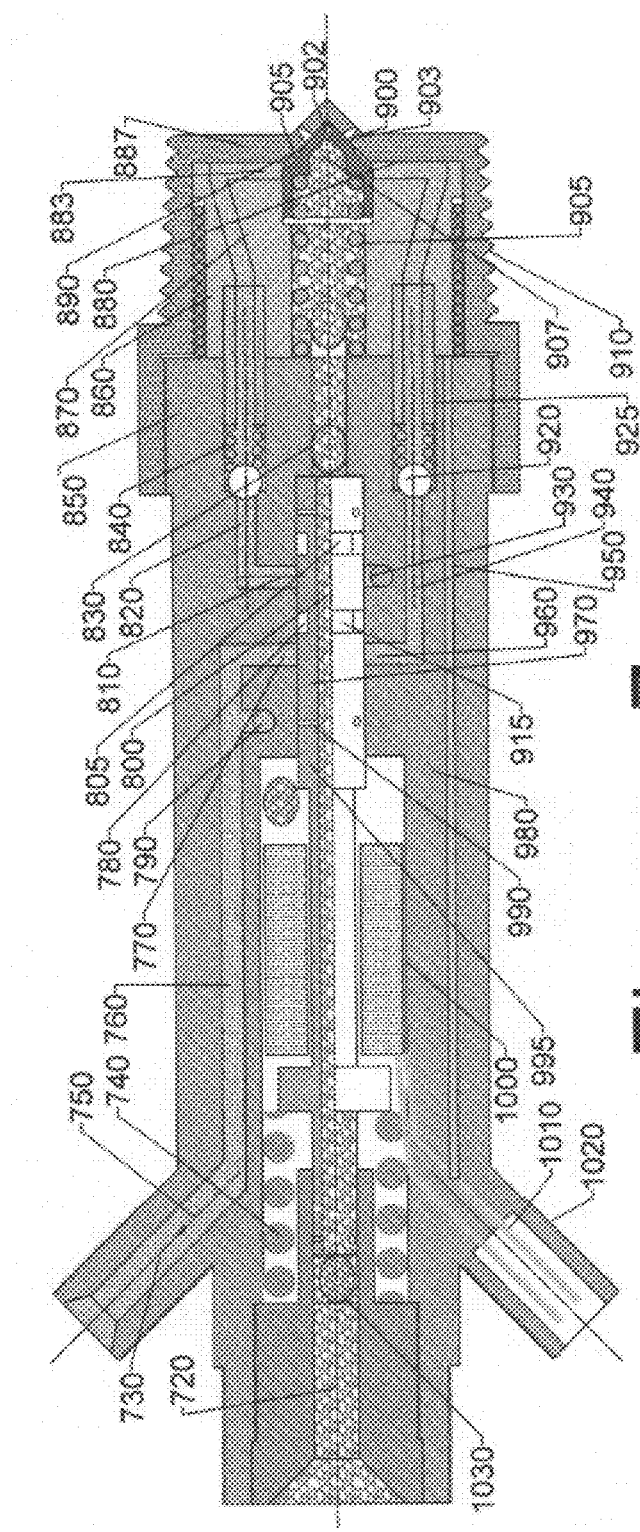
FIG. 7 illustrates a simplified SLV injector "off" state.
Figure 8:
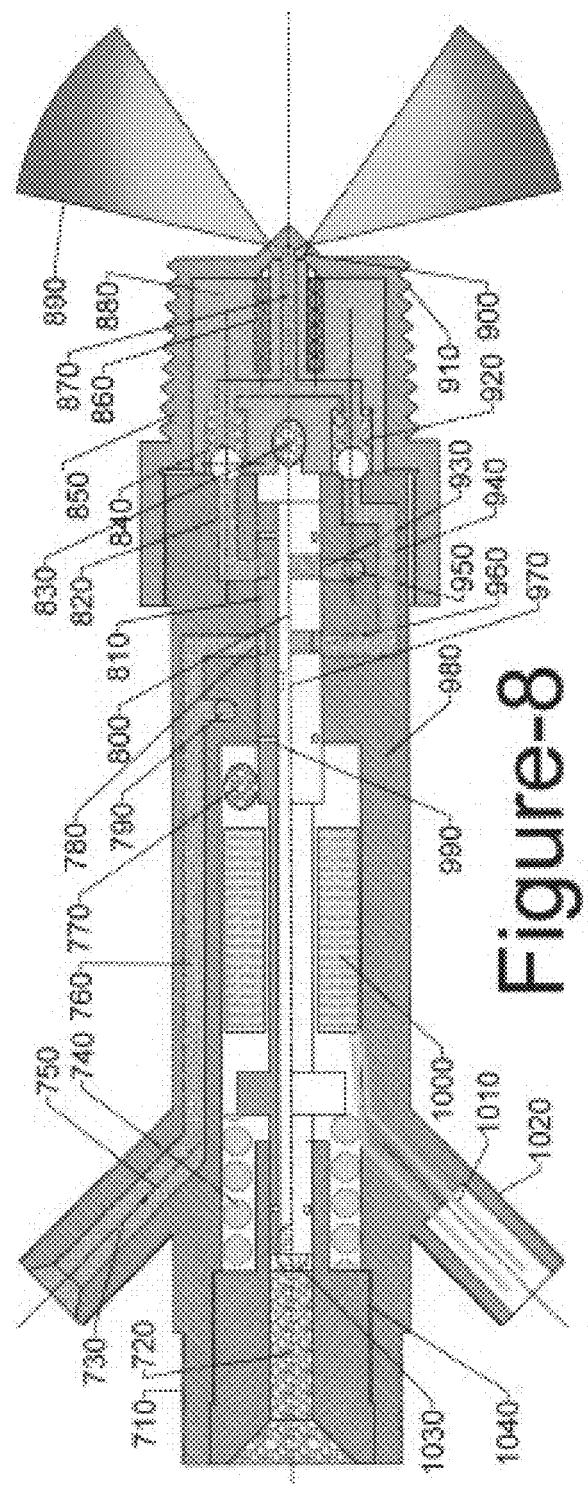
FIG. 8 illustrates a simplified SLV injector "linear zone" state.

Note: FIG. 7 and FIG. 8 describe a simplified SLV Injector embodiment which includes neither a heat exchanger nor a Pressure Controlled Valve (PCV) as will be described. Such a simplified application may be suitable for applications which do not require dramatically clean and accurate injection, and due to its simplified structure it may be easier to be configured.

FIGS. 1-3 (*a,b*), in contrast, illustrate and embodiment which contains the entire featured applications, including the heat exchanger and PCV. See mainly sections e.13.b.10 to e.14.26. The SLV switch and the actuator remain the same on both embodiments.

FIGS. 1-3(*a,b*) include the assembled Pressure Controlled Masking valve (PCV valve) (902, 852, 859, 872, and 903), which provides rapid hydraulic enforcement to the SLV Injector to rapidly achieve completion of the Spray Nozzles Masked State (SNM State) or the Spray Nozzles Unmasked State (SNU State).

The purpose of adding the valves is to apply/ensure a rapid sharp edged transition between states (as a function of the time), and to avoid confused states (or toggling) between states due to fluctuations in pressures which may occur in a high frequency transition period when and where the damping factor component (i.e. friction) is very low.

The SLV linear switch (illustrated in FIGS. 1-3 (*a,b*)) has mainly 13 distinguishing qualities in comparison to the Arrowhead Needle Valve (ANV) (widely in use since the end of the last century, illustrated in FIG. 5, and described and shown as an example in sections e.14.53-e.14.57) as follows:

Distinguishing Qualities and States of Operation which Define the SLV Linear Switch in Comparison to the Arrowhead Needle Valve (ANV) Currently in Use:

No Flow State/Off state: (see FIGS. 3(*a,b*) which describe the SLV switch in its "OFF state") When and where the circular grooves (770, 915,) do not align with the inlet (780, 930) and outlet (960, 810) openings (IOPs), no fuel can flow from the inlet to the outlet openings.

In Conjunction with the Lack of Flow of the Fuel from the Inlet to Outlet Openings, the Pressure Control Valve (PCV) is Configured to Assist in Preventing Fuel from Reaching the Spray Nozzles when the SLV-PCV Switch is in the No Flow/Off State. Sections e.13.b.10-e.13.b.11 Above First Introduced the PCV Valve which, Including its Special Nozzle Masking States, Will be Detailed in the Upcoming sections.

The Return Spring (FIG. 2 (905)) Applies Axial "Down" Force on the SLV-PCV Spntle in Order to Ensure the Nozzle Masking State (NMS) (Described for the PCV in Sec.'s e.14.3 and e.14.21, and which Further Prevents Fuel from Reaching the Spray Nozzles), in Addition a Hydraulic (Hydro) Control Actuator HCA (FIGS. 1-3 (*a,b*) (850, 852, 859, 872) is Applied to Enable the Mask/Unmask States.

The Hydro Control Actuator HCA Uses Another Groove in the Spntle, Referred to as Fuel Masking Groove (FMG) (824). The FMG is Configured to Align with Mask Inlet Pressure (MIP) Line (932) and Outlet Masking Control Line (MCL) (822) when the SLV-PCV is in the OFF State.

Under this Circumstance Fuel from MIP Pressure Inlet Line Flows into MCL (822), Thereby MCL is Under Pressure. This Pressure is Transmitted to PCV Masking Piston (PMP) Face (852) and Yields a Force Component in the Down Direction. This Additional Force Adds to the Spring Force to Insure that No Fuel Leaks Through the Spray Nozzles when the SLV-PCV is in the OFF State.

Consequently the above arrangement ensures that no fuel flow is enabled from the high pressure pump inlet connector in the "Off" state FIG. 3 (*a,b*) (750) to the spray nozzles (900).

Minimal Fuel Flow State

FIG. 2(*a,b*): (since "minimal flow state" is included as the lower range of the "linear Zone state" it therefore is used to illustrate the current state). When and where the Spntle (995) is shifted in the axial "up" direction (away from the spray nozzles (900) or in the predefined "UP" direction (see FIG. 4 (30)) just enough that the circular grooves FIG. 2(*a,b*) (780, 805, 915) have just started to expose the inlet (780, 930) and the outlet (960, 810) openings (IOPs). As a result pressure builds up in the Fuel Controlled Tunnels FCT (820, 940).

The movement of the Spntle in the UP direction, in addition to starting to expose inlet (780, 930), has simultaneously shifted the Fuel Masking Groove FMG (824) out of the masking state of the PCV Mask Inlet Pressure MW line (932), thus cutting off pressure to the PCV Masking Piston PMP face (852).

As a result, the spray nozzles are enabled to open. Furthermore, the MCL (822) is exposed to the Main Drain System (MDS) (720, 1030) via drain line (832) via Hollow Center Core (HCC) (970), to prevent hydraulic lock of the PCV. The HCC is described in more detail in Sec.'s f.9 and f.10.

As a result of the pressure building up in the FCT when the Spntle is shifted in the UP direction, a pulse of high pressure fuel applies force on the PCV Unmask Piston PUP face (859) and forces the Pressure Control Valve PCV (907) to open against the spring load (905) and to unmask the Spray Nozzles (900).

Minimal flow of fuel is enabled through those openings and consequently through the SLV valve into the Fuel Spray Nozzles FSNs (900).

It is important to mention that, since once the Spntle moves out of its OFF state, even if it is in the Minimal active fuel flow state, the pressure on the PCV Unmask Piston PUP (902) is maintained at a high value, therefore the Pressure Control Valve PCV (902, 852, 859) is in its unmasked ON state.

It is also important to mention that, in order to enable any fuel flow through the SLV-PCV injector, both the Spntle and the PCV valve must be in their ON/enable states, in order to be able to deliver fuel to the Spray Nozzles (900).

'Fuel Mass Control State' or the 'Linear Zone':

See FIG. 2(*a, b*) When and where the Spntle is shifted further (from the "minimal flow state") in its predefined UP direction it will expose a larger area of the inlet (780, 930) and outlet (960, 810) openings (IOPs) to the circular grooves (805, 915) thus enabling a bigger mass of fuel to flow through the openings (IOPs). In this state the SLV valve is in a predefined Linear Control Zone (LCZ). Since in the LCZ the Spntle is outside the OFF zone, the PCV is in its unmasked state and permits fuel flow.

In the LCZ zone, the valve demonstrates a direct linear tie between the fuel flow enabled through the valve and the Spntle displacement. This provides for accurate control of fuel mass flow via the valve as a function of Spntle displacement. This remains effective even though the incoming high pressure fuel and associated high pressure fuel pump are preset to a constant pressure (see note below).

Note: The SLV's ability to control the fuel mass when used in the Linear Control Zone (LCZ) indicates another benefit of the SLV injector: the capability to control the fuel mass directly just by applying an appropriate linear control signal.

The Control signal is generated by the Electronic Control Signal generator (ECS generator) (1180) along with the ECS Processing Unit. See FIG. 10 (1170, 1180). The general function of the ECS generator will be described below, but its details are outside the scope of this disclosure.

The SLV is enabled to control the fuel mass, whereas the inlet high pressure fuel state remains constant (predefined). Such a benefit dramatically simplifies the structure of the High Pressure Pump coupled to the SLV Injector.

In other words regarding e.14.19, the high pressure pump used in the old/existing technology constructed to vary its high pressure output in order to be able to control the fuel mass delivered, therefore requires enabling continuous varying of the high pressure/fuel mass of the supplying pump.

Such a continuous pressure variation function requires the addition of a complicated mechanism to be accounted for in the supplying high pressure pump.

This disadvantage of the old technology necessitates the use of a complex high pressure fuel pump feature with varying/controlled/switching of its high pressure function, to achieve the full mass control function.

It is therefore a simplifying quality of the featured technology to enable a fixed, stabilized, high pressure pump with the SLV injector, which is fully capable of controlling the incoming fuel mass just by applying an appropriate ECS signal to properly shift the Spntle displacement.

The LCZ range limits of the SLV are defined in reference to the Minimal Flow State and the fully open ON State (described below).

Fully Open State/ON State:

(see FIG. 1 (*a,b*) when and where the IOP openings are fully aligned with the circular grooves (780, 800, 915), maximal fuel flow is enabled.

The fuel switch as described in e.14 to e.14.16 is referred to as the Selector Linear Valve switch (SLV Linear Switch)

A unique and crucial quality of the SLV linear switch for use as a linear fuel valve is that the Spntle does not experience, and is free of, any force component derived from the high pressure fuel acting in the Spntle's axial direction. This has a great impact on the ease of using the Spntle to control the fuel flow to the spray nozzles, as will be described below.

Figure 4:
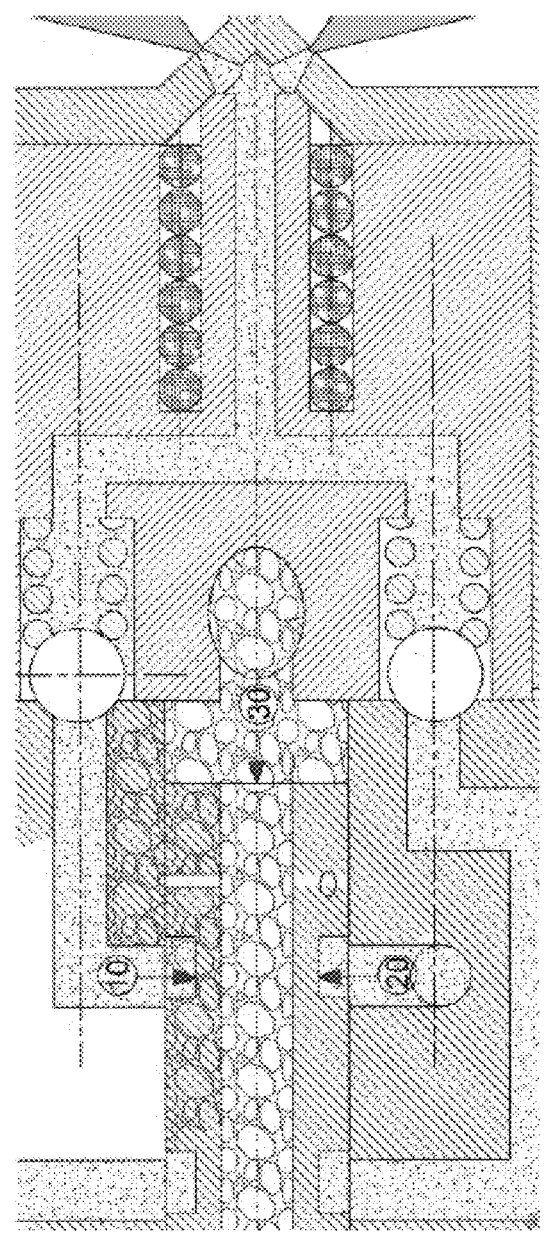
FIG. 4 illustrates a simplified SLV switch, including description of radial forces. Arrow defines the "UP" direction.

For better understanding of the described application refer to FIG. 4 arrows 10 and 20. When the high pressure fuel from inlet 770, 930 flows into grooves 780, 915 once the valve is in an open or partially open state, the fuel exerts a radially symmetric pressure force, represented by arrows 10 and 20 (and which tend to cancel each other out).

As the valve opens, fuel flow is enabled between inlets 780, 930 and outlets 810, 960. But all of the forces resulting from the fuel flow into the grooves and to the outlets are transverse relative to the axial direction 30 of Spntle motion, i.e. are perpendicular to Spntle travel.

The radially symmetric forces described in e.14.15 essentially cancel each other out and therefore can be largely neglected in terms of creating frictional force opposing Spntle motion. The Spntle frictional area which includes the miniature housing (MCH) sliding area (lubricated by the surrounding fuel) is very small and can be neglected as well.

None of the remaining axial forces on the Spntle (i.e., forces parallel to Spntle motion) are derived from the high pressure fuel. Additional axial forces include:

a) The applied force of electromechanical actuator (1000) (which will be described in paragraphs e.16.4, e.16.6, and which provides the Spntle motion);

b) The force of Spntle Return Spring 740, which keeps the Spntle in normally closed position when injection is not occurring, and:

c) Spntle self mass forces.

The axial force exerted by the Spntle Return Spring (SPS) FIG. 1 (740) is relatively small (e.g., a few kilograms), and can be neglected with respect to the actuator mighty force (which if the actuator is a Piezoelectric stack, could exert a force over 200 Kg. This is the case unless a "Pneumatic Return Actuator" (PRA) is used (see section f.2 and FIG. 9*b* (995)) to increase the return force to about 50-100 kg in order to improve the injector (Spntle Return) time response. See also sec. e.14.18.1

The main axial force which acts against the actuator is the Spntle self mass. Applying a force to oppose acceleration of the Spntle, especially at very high frequencies (in the range of 3600-10,000 Hz), is a large factor which cannot be neglected, unlike the spring load (see remark sec. e.14.32) and the frictional forces.

A Realistic Illustrative Numerical Example of Forces on the Spntle Follows.

Assume that the Miniature Cylinder Housing (MCH) FIG. 1, 3 (*a,b*) (980) may be constructed out of steel alloy, and the Spntle (995) could be made of light aluminum alloy (or any suitable light material). (This configuration could extend the injector's life cycle by coupling soft and hard metals like aluminum and steel (as is coupled in many car engines' cylinder and piston).

Such a configuration also helps to reduce the self mass of the

Spntle and to improve its time response (also it is usually easier, more practical and cost effective to replace the Spntle alone, rather than the entire housing or both).

A piezoelectric stack is used as an actuator with an approximate

D[displacement]=0.5 cm ($5 \times 10^{-3}$ m), to apply a force of: F=200 kg;

The Spntle for a midrange passenger car may weigh in the range of 15-200 grams. In our example we use 25 g ($25 \times 10^{-3}$ kg) which should be close to real life weight using Hollow Core Center HCC FIG. 1, 3(*a,b*) (970) which extends through the entire length of the Spntle to reduce some of its parasitic weight Using the above figures, the frequency response is calculated as follows:

Using Newton's $2^{nd}$ law: (force) F[(kg)×(m)/(s$^2$)]=(Spntle self mass[kg]) m×a (acceleration in m/s$^2$)

Displacement D[m]=(initial velocity [m/s])(time [s])+½ (acceleration m/s$^2$])(time)$^2$ In this case, initial velocity=0, therefore D=½ at$^2$ Substituting for a and solving for t:

t=√(2Dm/F); t [s]=√((2)×(5×10$^{-3}$ [m])×(25×10$^{-3}$ [kg])/ 200 kg=√75×10$^{-8}$=8.6×10$^{-4}$ [s]

This results in an expected frequency response of app. 8.6×10$^{-4}$ [s]

For example, in comparison, the frequency response by the EL engine running at 2000 RPM required to enable the desired/target injection window of 3 degrees main axle rotation is:

(1/Frequency) (1/f) [1/Hz]=t[s]

t[s]=1/{(2000 [rpm]/(60[min./s]))×360°/3°}=¼×10$^{-3}$= 2.5×10$^{-4}$[s], which is smaller than the calculated expected frequency response for the example shown above.

The above calculations point out that there are technological limitations to achieving a 3° response window at 2000 rpm, due to the piezoelectric stacks available in the market to provide higher physical force, and the mass values required to construct the Spntle.

Possible solutions are to use a response window in the 8° range (which is not bad at all), to reduce the rpm, or to advance the start point (phase) of the ECS signal to account for the time delay caused by the coupled piezoelectric Spntle slower response.

If technological advances permit more powerful piezoelectric stacks, or reduced mass of the Spntle, these factors could also contribute to utilizing a smaller injection window.

The ECS provides a linear analog signal to the actuator (in its linear state). This causes the actuator to exert a force upon the Spntle which acts against the spring load (and/or the (Pneumatic Return Actuator PRA). The final displacement of the Spntle at that time will be determined by the equilibrium point of the opposing forces of the actuator and the return spring (and/or the PRA).

(see also sections e.14.32): A modification has been presented in FIG. 9*b*. In addition to return spring (740), Spntle Spring Grip (SSG) (995) has been modified to form a piston at the location where spring Return Chamber (SRC) (740) forms a cylinder. Additionally, Inlet Air Pressure (IAP) (1037) has been added to turn the tail part of the Spntle into a Pneumatic Return Actuator (PRA) acting on the piston face (1035)

In the design of the ECS, the momentum of the Spntle (especially relevant to solenoid actuator) must be taken into consideration when providing the required fuel mass as a function of the applied signal, to avoid overshooting (undershooting) and over/under fueling of the Leaschauer Engine In its OFF state no signal is applied by the ECS. The spring load/PRA, without opposition by the actuator, pushes/forces the Spntle Down into its normal closed position to cut off any fuel to the cylinder.

Pressure Control Valves (PCV'S) (FIGS. 1-3 (*a,b*), (903) are constructed to mask/unmask the Fuel Spray Nozzles (FSN'S) (900) so as to prevent leaks of fuel into the cylinder when fuel injection is not occurring. See Sec.'s e.14.3 for PCV description.

Figure 5:
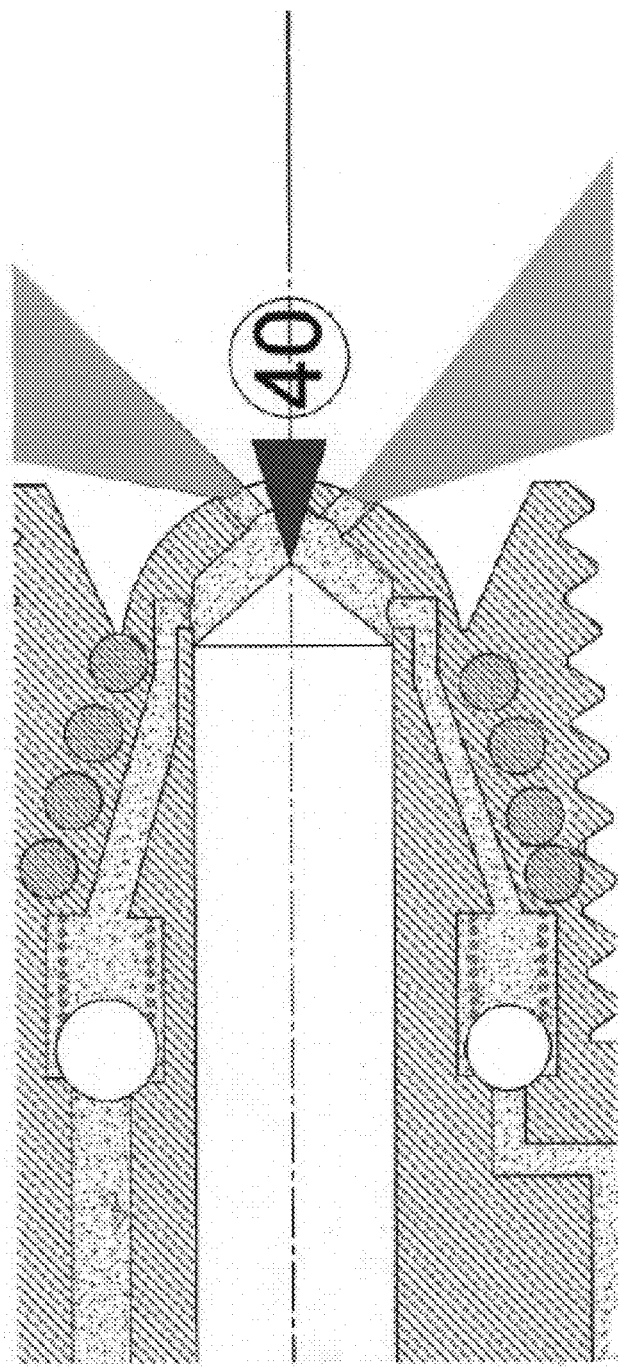
FIG. 5 illustrates a simplified "cone-head" Spindle injector.

Thus under the OFF state conditions, the PCV's spring FIG. 3 (*a,b*) (905) forces the Pressure Control Valve, along with its PMP face (852) into its closed state, thereby masking the Fuel Spray Nozzles FSN FIG. 5 (900), to prevent any leaks of fuel into the Cylinder.

The quality of the effortless shifting force described in section e.14.27-e.14.28 makes this valve extremely suitable for use in the Leaschauer Engine, since it enables the use of the extreme fuel pressure required for the Leaschauer Engine, while being able to fully control the fuel mass just by effortless linear shifting of the Spntle.

Employing the effortless shifting force as described above, the appropriate ECS signal is provided to the actuator to drive the Spntle to be shifted into its linear/analog zone. The ECS signal provides the voltage (current) level to the actuator so as to force the Spntle into its desired displacement which delivers the required Fuel Mass in accordance with the Leaschauer engine's requirements.

The new featured technology presented in items e.14.1 to e.14.50 presents a great advantage over the existing technology which uses the "Arrowhead Needle Valve" (ANV) or Pintle (see FIG. 4, and which will be defined, described, and compared to the new featured technology hereinafter).

The "Arrowhead Needle Valve" (ANV) or Pintle currently in use in all the direct injectors world wide (i.e., Bosch, Siemens) since the end of the last century, experiences an axial force (see FIG. 4 (40)) acting on the Arrowhead Valve due to the fuel pressure, which is calculated and exemplified as follows:

Note: in this example and in the entire disclosure, the terms "Pintle" and "Arrowhead Needle Valve" (ANV) have been used to point out the devices which refer to the old technology, as opposed to using the terms "SLV", and "Spntle" to point out the devices referring to the new featured technology.

(Axial Force in kg.) f=a (area of Pintle's Arrowhead in cm.$^2$)×p (pressure of fuel in kg/cm.$^2$, atmospheres (Atm.) or Bars). To visualize and to demonstrate the fuel pressure component force in the axial direction acting on the Pintle, see FIG. 4 (40) and the following realistic example:

Diameter of arrowhead 4 mm (0.4 cm) yielding an area of 0.2×0.2×π; a~0.12 cm$^2$; f=2000 Atm. X 0.12 cm$^2$=240 kg. This is a sufficiently large force on a 4 mm arrow head in its axial direction to likely cause limitations and complications.

Such a mighty parasitic force applied on the old technology Pintle would necessitate engineering solutions to balance and to provide an injector capable of performing under very high fuel pressure while still delivering fast (high frequency) On-Off fuel transitions under such a mighty force load.

This example clearly demonstrates the advantage of the effortless quality of the SLV valve (in comparison to the Pintle Arrowhead in use) which is free of any force component in the axial direction due to the fuel pressure (as mentioned earlier, the remaining axial forces derive from minor friction, Spntle self mass and the action of its spring load).

Another important quality of the SLV valve in comparison to the existing Arrowhead Needle Valve ANV technology is the ability of the SLV valve to simultaneously switch multiple redundant fuel lines for enabling higher fuel mass capacity, stability and higher reliability. The SLV is also used as a selector valve to drive the pressure controlled valve into its "OFF" state.

FIGS. (1, 2, 3)(*a,b*) and 6 (820, 950) show an example of a system which uses two redundant switching lines. If applicable/required, one could use 4, 6 or any number of redundant switching lines which can be fit into such injector without effect on the effortless force needed to shift such Spntle.

The unique benefit described in e.14.27 i.e., the effortless force required to move the Spntle when used in an SLV linear switch (due to lack of fuel pressure component in the axial direction) contributes to another important benefit of the Leaschauer Engine: enabling switching the valve at a high frequency.

This featured Leaschauer advantage results from the important beneficial aspect of the inventive valve, that the actuator does not get slowed down in an effort to overcome mighty fuel forces to switch, in contrast to the Arrowhead Valve case. This high frequency switching ability as mentioned is an excellent solution and is a direct requirement of the new Leaschauer Engine technology.

Additionally, the ability to move the Spntle effortlessly using the SLV Switch, and the special structure of the Selector Linear Valve Injector (SLV Injector) tremendously simplifies the injector features and dramatically increases its reliability.

Definition 14

Needle-selector linear (fuel) switch injector is referred to as (needle) Selector Linear Valve Injector (SLV Injector). It is hereby defined as follows:

Selector Linear Valve (fuel) Injector, (SLV (fuel) Injector), is a high pressure, high frequency fuel linear switch injector which employs the following components: see FIG. 1(*a,b*), FIG. 2(*a,b*), FIG. 3(*a,b*), unless otherwise indicated:

The previously predefined SLV Fuel Switch items (780, 915, 810, 930);

Miniature Cylinder Housing (MCH) item 980,

High pressure fuel inlet connector items 730, 750, and

Electrical and fuel return line connectors items 1020, 720.

The injector also employs an electromechanical actuator (item 1000) which may be constructed of a piezoelectric stack or electro-magnetic coil (solenoid)

Fuel Spray openings (Nozzles) FSNs item (900).

The pre-defined Spntle (plunger item 995), of the SLV fuel switch which is spring loaded (740) in order to keep the injector in a Normal Closed State (wherein failure/malfunction of the Electrical Control Signal (ECS) will automatically shut off the injector/engine).

Note: Example e.14.34 above describes the force applied by the actuator to drive the Spntle out of its Off state, against its self mass, to achieve the Leaschauer Engine requirements.

The Pressure Controlled Valve (PCV) (FIG. 1, FIG. 2, FIG. 3)(*a,b*), (852,902,905). (is unique to the SLV-PCV embodiment.) This is a pressure activated valve which serves to mask/unmask the Fuel Spray nozzles FSN (item 900) when and where the SLV switch is in its predefined OFF/Linear/On states.

The Pressure Control Valve employs PCV Unmask Piston (PUP) face (859, 902) and PCV Mask Piston (PMP) face (852, 872) and spring loading (905) so as to maintain a normally closed state.

When the SLV injector valve is activated by the ECS signal and it is driven into one of its spraying states, it delivers a pulse of fuel pressure into the Fuel Controlled Tunnels (FCT) (940, 820). The pressure applied on the PCV Unmask Piston PUP face (859. 902) forces the PCV to open and to unmask the Fuel Spray Nozzles FSN (item 900).

When the SLV injector valve is de-activated by the ECS signal, it is driven into its Off spraying state by the spring load, along with applied pressure derived from Fuel Masking Grooves FMG (824) acting on the PCV Mask Piston PMP face (852, 872). see FIGS. 3 and 3(*a,b*)

Then after the fuel flows via the heat exchanger, also referred to as the Heat Exchange Disks HED (see definition below) (FIG. 1,2,3) (*a,b*) and FIG. 6 items 853, 854, 856, 857 cross sections A-A, B-B, C-C, D-D, E-E and F-F) through the heat exchange Nozzles Assembly Tip housing (NAT) (item 858 section F-F), the fuel pressure causes the PCV to open, thereby unmasking the Fuel Spray Nozzles FSN 900 in order to enable normal fuel injection.

Note: The thread (910,883) is part of the NAT housing, and is used to fasten the entire injector to the Leaschauer Engine assembly See FIG. 10 injector (1190) and cylinder head 1200.

Definition #15

The assembly which is employed as a pre-Heat/fuel steamer is referred to as the injector's Pre-Misting Evaporating Head (Injector's PME Head), and it includes all the parts which are contained in the NAT (858) housing.

The injector's PME Head is constructed of the following subassemblies:

Heat Exchange Disks array HED may be constructed as in the following example: (see FIG. 1,2,3 (*a,b*) and FIG. 6 items 853, 854, 856, 857 cross-sections A-A, B-B, C-C D-D E-E). The HED is constructed of an array of disks. Each disk in the assembly includes engraved tunnels on the one face of the disk pointing in the up direction.

General Description of the HED.

Figure 6:
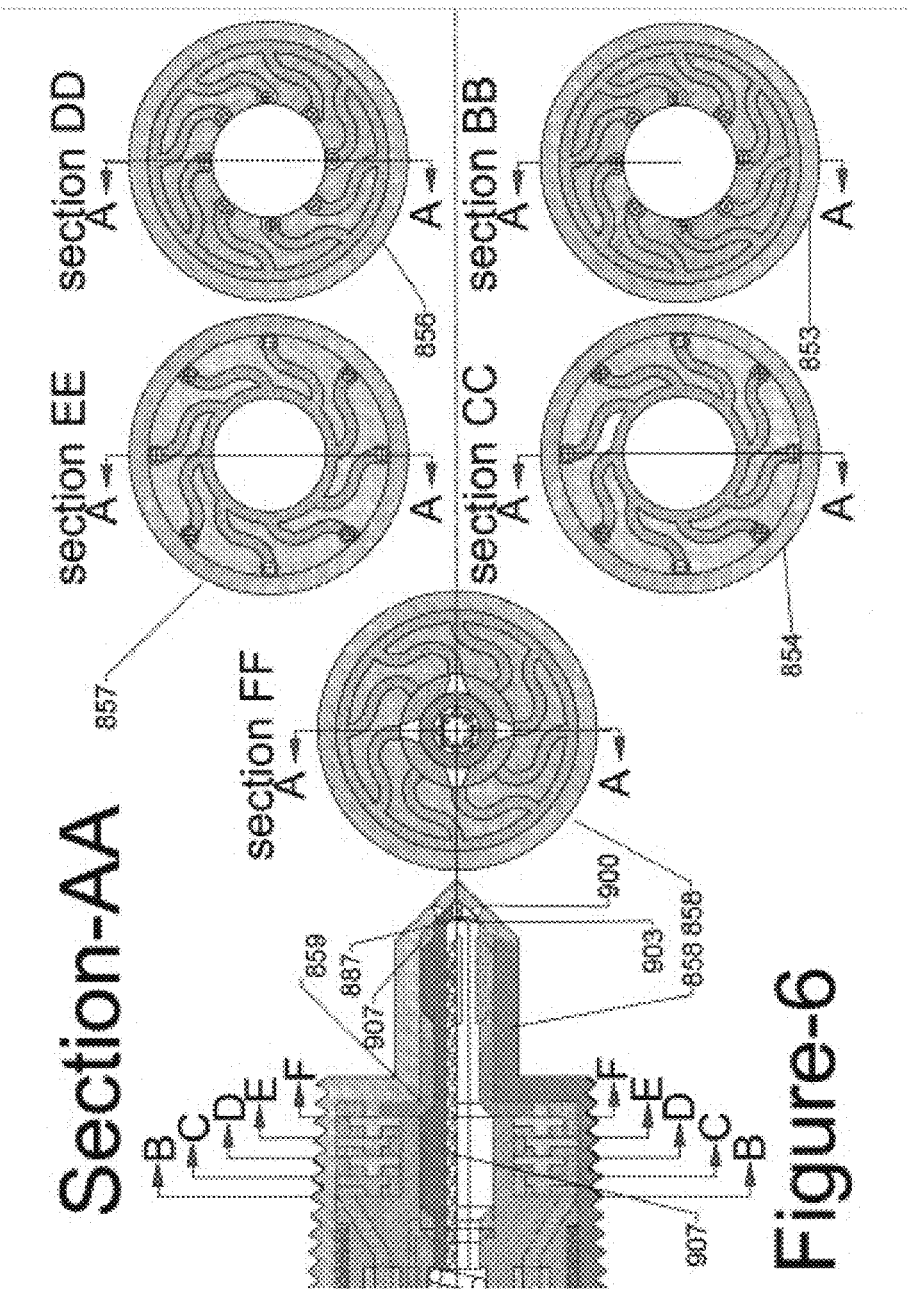
FIG. 6 illustrates a tip view of "off" state Heat Exchange details and cross sections.

See FIG. 6 unless otherwise indicated: At the first disk (853) (shown in cross section B-B) the fuel is fed from the radial (circumference) toward the center of disk, where it passes through holes near the center and is directed to the $2^{nd}$ disk (854) (cross section C-C). At the $2^{nd}$ disk the fuel is redirected in the radial direction (toward the circumference), and passes through holes near its circumference. The fuel is then transferred to the $3^{rd}$ disk (856)(cross section D-D), and so on through $4^{th}$ disk (cross section E-E) and the NET assembly 858 (cross section F-F) toward the tip of the NET.

This arrangement provides continuous longer contact between the fuel and the engraved tunnels of the disks which absorb the Extreme Parasitic Heat (EPH) of the cylinder head, and transfer that heat to the fuel.

HED Detailed Description:

The fuel is fed first into the first disk (852) from the GCN tubing. In the first stage (FIG. 6 852 cross section B-B) the fuel is redirected within the tunnels inward toward the center of the disk where through holes the fuel is redirected into the second stage disk (FIG. 6 854 cross-section C-C).

The second stage redirects the fuel outward away from the disk center to its outer holes to be transferred to the next stage (FIG. 6 856 cross-section D-D, and so on through 857 until reaching the NAT housing (FIG. 6 858 cross-section F-F) which transfers the fuel via the pressure valve to the Nozzles.

Nozzle Assembly Tip (nut) NAT (item 858 cross-section F-F).

May be constructed of steel alloy, and is screwed to the injector body in a fashion which prevents any fuel from leaking out. It contains the entire subassemblies of the Heat exchanger as follows:

The NAT (item 858 cross section F-F) contains also the Pressure control valve (PCV) assembly (902, 907), the directional valves assembly, (920), the Heat Transfer Block HTB assembly (880) and the Glowing Coils Nozzles tunnels (GCN) assembly (preheated GCN) (870).

Since the tip of the NAT device faces directly into the cylinder (See FIG. 10 injector (1190) and combustion chamber (1210) it absorbs Extreme Parasitic Heat (EPH) developed/generated by the cylinder head combustion chamber) and transfers it to the fuel which has been contained in the tunnels array, to steam the fuel within and convert it to fuel-gas (Steamed Fuel).

The preheated Glowing Coil Nozzle-Tunnels (preheated GCN) FIG. 1,2,3) (a,b) (870) are equipped with tungsten glowing coils (glowing red-white to about 800° C.) (860) as per the following example:

The tungsten heating coil elements may be located within the injector's Heat Transfer Block (HTB) (880) or within the NAT (858), near to the fuel flowing passages referred to as the preheated Glowing Coils Nozzle-Tunnels (preheated GCN) FIG. 1,2,3) (a,b) FIG. 6 (870).

The purpose/function of the preheated GCN (870) is to supply and maintain heat energy to the incoming high pressure fuel, so as to preheat/increase its temperature and assist along with the Heat exchange in evaporating the fuel within the heated tunnels.

The glowing coils as mentioned may be used in conjunction with Heat Exchange Disks (or Heat Transfer Unit HTU) which employs Extreme Parasitic Heat (EPH) developed/generated by the cylinder head (FIG. 10 item 1200).

Note: See FIG. 10 for high pressure detonation occurring within the space defined by the "UP closing" piston (item 1210) into the Cylinder Head (item 1200).

Note: in order to picture the exact location of the cylinder in reference to the provided injector's drawings, one can point to the fuel spray fan coming from the spray nozzles (900) as being positioned within the cylinder Head, with the closing piston reaching its UDP. (see FIG. 10 Injector 1190, cylinder 1220. detonation area 1210).

The fuel flows from the preheated GCN into the HED (FIGS. (1,2,3) (a,b) (852,854,856,857) and then afterwards flows via the NAT (858) system, The NAT may comprised of steel alloy housing which is located on the cylinder top. The NAT with the HED within is constructed to absorb and accumulate the Extreme Parasitic Heat EPH developed/generated by the cylinder head, to further evaporate the fuel within the heat exchanger into fuel gas.

The Extreme Parasitic Heat energy EPH is transferred into the NAT, HED. Heat Transfer Block HTB (880) and the Heat Exchange Disks) must demonstrate high heat mass capability along with good heat transfer rate factor. For example, they may be composed of a high heat mass metal alloy such as iron, Aluminum, or copper The high heat mass material may employed to accumulate the Extreme Parasitic Heat (EPH), and must have an excellent heat transfer factor to be able to efficiently absorb such parasitic heat and to transfer it as a heat source to evaporate the fuel.

Note: The entire assembled heat exchange system which includes the preheat GCN (860, 870), Heat Exchange Disks HED (852, 854, 856 and 857), the Heat Transfer Block HTB (880) and the Nozzles Assembly Tip (nut) NAT (item 858 section F-F see FIG. 1,2,3)(a,b) and FIG. 6) will be together referred to as the injector Pre-Misting Evaporating Head (Injector's PME Head).

The term PME Head will describe/define the entire assembly which has the function of pre-misting the fuel.

Definition 16

The injector's PME head is constructed/serves to absorb, accumulate, store and transfer the Extreme Parasitic Heat Energy (EPH) generated by the cylinder head (FIG. 10 1200). Due to the High Pressure Detonation FIG. 10 (1210), such energy is transferred into the Fuel Tubing (tunnels) Array or Tubing Array System TAS residing in the PME head.

The Cylinder head 1200 is used as source of heat to preheat the fuel/increase its temperature and to convert/evaporate it to gas in the short period window during which the fuel resides/flows through within the PME head.

The Pressure Control Valve PCV (907) is spring loaded (905) and is constructed to mask the Fuel Spray Nozzles FSN (900) to prevent fuel leakage into the cylinder head while the injector is in its "OFF" state when and where no pressure applied into the GCN (870) and remaining fuel (gas) is still contained/caught in the PME's tunnels array.

The Pressure Control Valve PCV FIG. 1,2, 3)(a,b), (903, 907) is activated to open by the high pressure fuel pulse applied on the PUP (902) (which is defined in the note below) against the spring load (905) when the injector fuel switch transitions from its "Off" state into its "Linear"/"On" state.

Note: initially when the Pressure Control valve PCV is in its "OFF" state the incoming pressure pulse will act on the PCV Unmask Piston PUP face FIG. 1,2,3) (a,b) (852, 872) and force it to open so fuel can reach the nozzles (900).

Definition #17

The injector Pre-Misting Evaporating Head (Injector's PME Head) defines and is designated to store/accumulate the Parasitic Heat developed in the cylinder head. The PME head therefore has two main functions: first, to accumulate the parasitic heat, and second, to transfer the heat to the fuel residing/flow through in the tunnels in the PME head. This heat transfer dramatically increases the diffusion factor, so as to evaporate the fuel within in a short time window designated.

Note: The Electrical conduit/tubing line (950) is designated to electrically connect the Inlet Electrical Connector 1020 to the main actuator and to the Tungsten Glowing Coils to supply their working energy and signals (if and when required).

Sealing tubes 925 are an optional solution to prevent high pressure fuel from leaking out of the head assembly, and to ensure proper assembly of the injector.

The main purpose for increasing of the diffusion Factor as described in par. E.15.34 is to attempt to overcome the very short time (during the introduction of specific EAP and the fuel droplets/pre-mist fuel within each injection period) for such diffusion to occur between the "specific EAP" and the "Fuel Droplets"/"Pre-Mist" fuel, to avoid/prevent the creation of non-uniform mixture packets which will cause reduction of efficiency.

The Glowing Coils elements are provided in conjunction with preheat/increasing of the temperature of the fuel droplets within the Glowing Coils Nozzle-Tunnels (GCN) when the EL Engine is still in a cold state (or in the case where the parasitic heat in the cylinder is not sufficient to cause such conversion/evaporating of fuel to gas, a situation which may reduce the engine efficiency.

The ultimate temperature (energy) range which could be achieved by using such evaporating glowing coils with the PME Head for the SLV injector enables the enforcement of the evaporation of the entire Specific Fuel intended to be used, to turn the fuel droplets into gas (Pre-Mist fuel).

Note: The Glowing Coils Nozzle-Tunnels (GCN) FIG. 7, 8 (840, 860) could represent a simplified version of the SLV injector for applications where leaking of a small amount of fuel may spilled into the cylinder during normal operation can be tolerated. This simplified version shown in FIGS. 7 and 8 does not include the heat exchanger or PCV.

Directional valves FIGS. (1,2,3) (*a,b*) and FIG. 6 (920, 840) are mounted on the nozzle Glowing coils Tunnels GCT (870 925) to avoid possible return gases backing up into the injector's fuel system. (883, 910) is a high pressure thread on the injector body assembly to fasten the injector to the engine. See also FIG. 10 (1190, 1200)

Definition #18

The required electrical voltage signal which energizes and activates the Injector actuator is referred to as: Electrical Control Signal (ECS). The ECS is applied via electrical connector (1020). The unit which generates the ECS is referred to as the ECS generator along with the ECS Processing Control Unit (PCU) FIG. 10 (1170, 1180).

The ECS generator (Processing Control Unit) may be located remotely from the injector. Although FIG. 10 provides a system level schematic diagram of the ECS Signal Generator along with the Processing Control Unit, besides the general description of the main function of the ECS generator ECS Processing Control Unit), the ECS generator is not considered to be within the scope of this disclosure.

Note: This article introduces a general characterization and description of the ECS Processing Control Unit/ECS Generator, as well as some of the required signals which play a part in controlling/monitoring the Leaschauer Engine and process.

This description is to serve as s general reference regarding the interaction between the ECS Processing Unit/ECS generator and the electrical connector (1020) where the ECS is first applied. Although the system level ECS principles outlined here are part of the claimed invention, the details of the realization of the ECS are not a part of this article, and are outside the scope of this disclosure.

The ECS is pre-designed to sufficiently supply the energy required to activate the Electromechanical Actuator: (e.g., Magnetic Solenoid/Piezoelectric Stack). Properly implemented ECS signals apply/provide all the proper timing for each cylinder for proper operation/monitoring while maintaining the Leaschauer Engine requirements The actuator enforces the shifting of the Spntle against the spring load, to activate the injector and to deliver the required fuel mass into the spray nozzles FIG. 1, 2, 3 (*a,b*)(900).

This process timely enables synchronized fuel injection, accurate in duration and phase, while maintaining efficient and stable injection according to the Leaschauer Engine requirements.

Definition 19

Specific fuel/air (Mixture) Detonation Pressure (SMD) pressure define and refer as:

The unique pressure (and heat) required for Specific fuel/air Mixture in its optimal ratio to detonate as a result of compressing and heat developed in the cylinder.

Selector Linear Valve-Pressure Control Valve Injector (SLV-PCV) Injector Structure and Way of Operation See FIG. 3(*a,b*) "Off" State). High pressure fuel up to 100,000 PSI enters into the High Pressure Inlet (HPI) connector (730) via the inlet openings (INOs) (780, 930), but is blocked by the Spntle (995) in its "Off" state, where the circular grooves (780, 915) are not aligned with the inlet/outlet openings (INOs/OUOs or IOPs).

In that state the circular grooves (780,915) are not aligned with the inlet/outlet openings (INOs/OUOs or IOPs), the actuator is not energized, it is not activated and therefore the spring load maintains the Spntle in its "Off" state.

In addition to the spring loading which ensures the normally closed state of the PCV (907), high fuel pressure is applied on the Pressure Controlled Valve PCV (902) and onto Pressure Mask Piston PMP (850), which ensures hydraulic masking of Fuel Spray Nozzles FSN (900). The high fuel pressure is transmitted via Mask Inlet Pressure (MIP) inlet (932), via Fuel Masking Grooves (FMG) (824), via outlet Masking Control Line (MCL) (822).

The purpose of adding hydraulic enforcement to spring loading (905), onto the PCV into its masking state, is to apply a mighty hydraulic force in the PCV closed direction, in order to improve the shutoff/masking time response.

In the transition back into spraying mode the Spntle moves in its "UP" direction. This causes the Masking Controlled line MCL (822) to be exposed to the Hollow Center Core HCC (992), thereby eliminating (draining) the fuel from the return line, to prevent hydraulic lock.

On the other hand, during the transition into spraying mode, the pressure in the Fuel Controlled Tunnels FCT (940, 820) ensures the unmasking of the PCV by applying force on its PCV Unmasking Piston PUP (859).

Additionally, when the Spntle moves in its "UP" direction, it shifts the Fuel Masking Grooves FMG (824) away from the fuel inlet (932) line and the fuel outlet MCL (822) line. This cuts off any incoming fuel pressure from inlet (932), and exposes the MCL (822) via drain line (832) via the Hollow Center Core (HCC) (970) to the Main Drain System (MDS) (720, 1030) to prevent hydraulic lock of the PCV.

Note: Since the Spntle moves free of any fuel pressure force component in the axial direction, it is therefore sufficient to use a fairly small spring load to urge the Spntle in the DOWN direction. But, in order to maintain a sufficient time response, the return spring can optionally be supported by pneumatic actuator shown in FIG. 9*b* and comprising: Air Return Piston (995), piston face (1035), cylinder (1005), lubricate opening (990), Air Pressure inlet (1037). This could improve the time response of the Spntle (see Sec.'s e.14.32)

Since the spring loading in the DOWN direction acts in opposition to the actuator force (which acts in the UP direction), the fuel mass going through the injector is decreased when and where the ECS signal decreases in accordance with the spring loading direction.

The spring loading providing a normally closed state also ensures that failure to establish the Electrical Control Signal (ECS), which may be caused for example by electrical malfunction, will automatically engender a safety shut-off. As an example, if the Spntle gets "stuck" (for lack of ECS signal) in its open position state where no ECS is generated/available, the normally closed state of the Spntle will avoid maintaining/increasing the Leaschauer Engine power (which would be very undesirable).

"On" and Linear State Zones See FIG. 1,2)(*a*,*b*)):

The Electrical Actuator (ELC) (1000) is energized via Inlet Electrical Connector (IEC) (1020) and leads (1010).

The voltage level, duration, pattern of the pulse, the number of pulses per power stroke, and the timing (Activation Angle (ACN)/Phase) of the Electrical Control Signal (ECS) determine:

The timing and disposition of the Spntle, and consequently determine when and where and what amount of fuel mass passes through the SLV switch, its timing and stability (as well as the quality, efficiency and cleanliness of the detonation).

The fuel will flow via the Fuel Controlled Tunnels (FCT) (940, 820), via the Inline Directional Valves (IDV) (840, 920), through the Glowing Coils Nozzle-Tunnels (GCN) FIGS. (1,2,3)(*a*,*b*) (870), via the Pre-Mist Evaporating Head PME Head assembly, through the PCV in its unmasked state, to the Pre-mist Spraying Nozzles (PSN) (900), to timely spray the pre-mist fuel (890) into the pre-compressed air in the cylinder to satisfy the requirements of the Leaschauer Engine.

Note 1: The Leaschauer Engine or LE Engine requirements were selected as reference standard requirements for the SLV injector, since they are specifically suited for the LE Engine and are dramatically more demanding than the existing technology standards requirements. As a result, the SLV injector should dramatically improve the performance of the existing engines or the ones manufactured according to existing technology.

Note: (See FIG. 9*b*) due to mechanical limitations the return spring demonstrates only a few kilograms of return force, which may not be sufficient to achieve the required time response characteristic of $5 \times 10^{-4}$ second. Therefore in order to retain the right frequency response the Spntle Spring Grip SSG (FIG. 9*b* 995) was converted to a Piston, where the spring chamber was turned into a cylinder with capability to maintain measured air pressure fed by external compressor via inlet (1037) Such modifications allow further control over the return force acting against the piston face (1035), to enable any desired Spntle return force.

As described in sections f.1.1-f.1.5 above, when and where the Spntle resides in the "OFF" state, fuel pressure enforces the masking of the spray holes by the PCV.

Note 2: The Spntle (995) could employ a Hollow Center Core (HCC) FIG.'s (1,2,3 (*a*,*b*), 970) which extends through its entire length to reduce some of the parasitic weight of the Spntle and to avoid Spntle hydraulic lock (in its axial directions), in order to improve the injector time response (Frequency).

The Hollow Center Core (HCC) (992) is eventually connected to the Main Drain System (MDS) (720) which releases remaining undesired fuel back to the fuel tank via drain outlet (720, 705).

Note: It is important to maintain a continuous small fuel flow along the Spntle sliding area edges (against the injector's miniature housing) so as to provide sufficient lubrication for the extremely fast Spntle shifting requirements.

The Lubrication Tunnels (LTUs) 990 were added for the purpose described in par. f.10, to assist with delivering some fuel to lubricate the sliding areas between the Spntle and the Miniature Housing.

SLV-CRP Injector

A third injector embodiment, the second of type SLV injector embodiment, is defined and referred to as: type SLV Injector, piezoelectric (Solenoid) Controlled, self Resonance, fuel/Pneumatic actuator (injector), or (SLV-CRP) injector. See FIGS. 11*a*, *b*, *c* and *d*, 12*a*, *b*, *c* and *d* and 13*a* and *b*.

General Description of the SLV-CRP Injector

The SLV-CRP injector provides a new inventive method for actuating very high frequency Spntle movements which control the very high fuel pressure injection nozzles and switch them from "ON" to "LINEAR" to "OFF" states at a very high frequency.

In the SLV-CRP embodiment, the Pressure Control Valve PCV is not used, and its functionality (i.e., to prevent fuel leakage while the injector is in the "OFF" state) is replaced by one-way in-line directional valves (1580, 1380, FIG. 11*b*), along with high fuel Pressure Relief Valve (PRV 1595, 1590 and 1597).

The absence of hydraulic drag from fluids traversing the PCV enables higher frequency response in the SLV-CRP embodiment which may reach frequency figures greater than $10^4 \sec^{-1}$ (equivalent to figures lower than 100 μs in the time domain).

The use of expansion air pressure chambers A and C (introduced in par.'s h.1.a, h.3.g) in the SLV-CRP injector also enables a very high frequency Spntle response when activated in discrete (Pulsed) on/off mode (Pulse Width Modulation PWM), by taking advantage of self-resonance capability of the SLV-CRP embodiment.

The self-resonance occurs when, under control of the ECS signal, the Spntle swings around a mid point (while switching the injection spraying On/Off). Much of the energy contributed to the current cycle by the piezoelectric stack (solenoid) is thus conserved and contributed to the next cycle.

This conserved energy provides major assistance in pulling and pushing the Spntle. The controlling of the fuel mass (Volume) delivered using this function may be achieved by:

Changing the Duty Cycle of the pulses (Pulse Width Modulation or PWM) to achieve the fuel requirement, rather than:

Adjusting the amount of fuel delivered per pulse due to the displacement of the Spntle Analog (Amplitude) Modulation or AM to achieve the fuel requirement, as was described in the SLV-PCV method.

Note: Since the use of the Pulse Width Modulation (PWM) (number of Spntle "On"/"Off" transactions per "W" working cycle) and the Amplitude Modulation (AM) (the linear amount of exposing the Spntle grooves to the Inlets/Outlets O-Penings (IOPs) to adjust the amount of fuel delivered per discrete (Pulsed) Spntle transaction) are not correlated to each other both can be used simultaneously if required/desired as way to control/delivered full mass to the Leaschauer Engine.

For the SLV-CRP embodiment, similarly to the SLV-PCV embodiment, upon applying the ECS control signal the piezoelectric (solenoid) actuator pushes the Spntle into a linear/open position (allowing fuel to be sprayed by the nozzles).

For the SLV-PCV embodiment, the Spntle displacement is limited by the piezoelectric expansion from the applied ECS. In contrast to the SLV-PCV embodiment, in the SLV-CRP embodiment the Spntle displacement is not limited by the piezoelectric expansion and provides a displacement gain, This displacement gain is achieved by using a large area driving piston face (Coupled Piston 1240) to push hydraulic fluid (Fuel) in chamber B (1200), against the small area of the Spntle handle (1170) driven piston face (1630).

Such a decrease in the piston's acting area causes a gain in displacement corresponding to the opposing proportional areas. This will be detailed in Section [h.2-h.3.h]. Spntle displacement gain can reach as high as 10 times the piezoelectric expansion (Displacement).

One should keep in mind that the benefit of gaining displacement is accompanied by a decrease the forward pushing force by the same ratio, which slows the Spntle's frequency response. Some applications therefore may call for the use of solenoid instead (to enable the use of gain equals 1. G (gain)=1 (the driving piston area equals the driven one)

In the SLV-PVC embodiment, the Spntle is pushed back into a closed position by a return spring which may be assisted by a pneumatic pressure cylinder surrounding the return spring (See FIG. 9*b*).

Similarly In the SLV-CRP embodiment, the return force is provided by a small air-filled cavity cylinder (chamber C), and the Spntle handle used as return piston. The small size of cavity C as well as the high degree of compression caused by the larger Spntle displacements yields an enhanced return force compared to the SLV-PVC embodiment, thereby enabling higher frequency response.

A third chamber, Chamber A, surrounds the piezoelectric stack (solenoid) and is configured to apply balanced forces to oppose the return force applied on the Spntle's handle by the pressure applied from Chamber C, thereby conserving work done by the piezoelectric (solenoid).

Figure 12A:
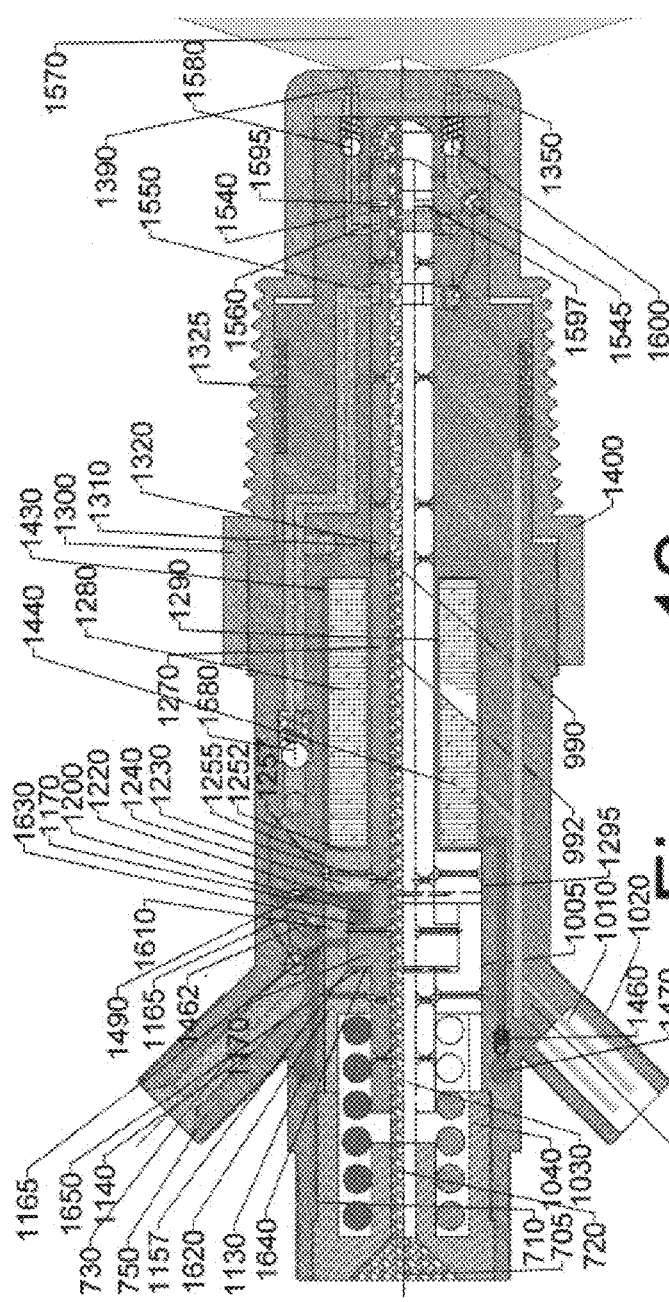
FIG. 12a illustrates a full view "Linear" state SLV-CRP Hydro-Air self resonance actuator

It is important to mention that the pressure in chamber A must be slightly lower than the pressure in chamber C, to avoid possible separation between the coupled piston and the piezoelectric stack (said piezoelectric applying force on the coupled piston via acting on the Pushing Ball, see FIGS. 11*d*, 12*a* 1252).

Maintaining such a reduced pressure in chamber A compared to chamber C ensures and verifies virtual anchoring of the coupled piston to the pushing ball (1252) of the Piezoelectric stack (solenoid).

Figure 12D:
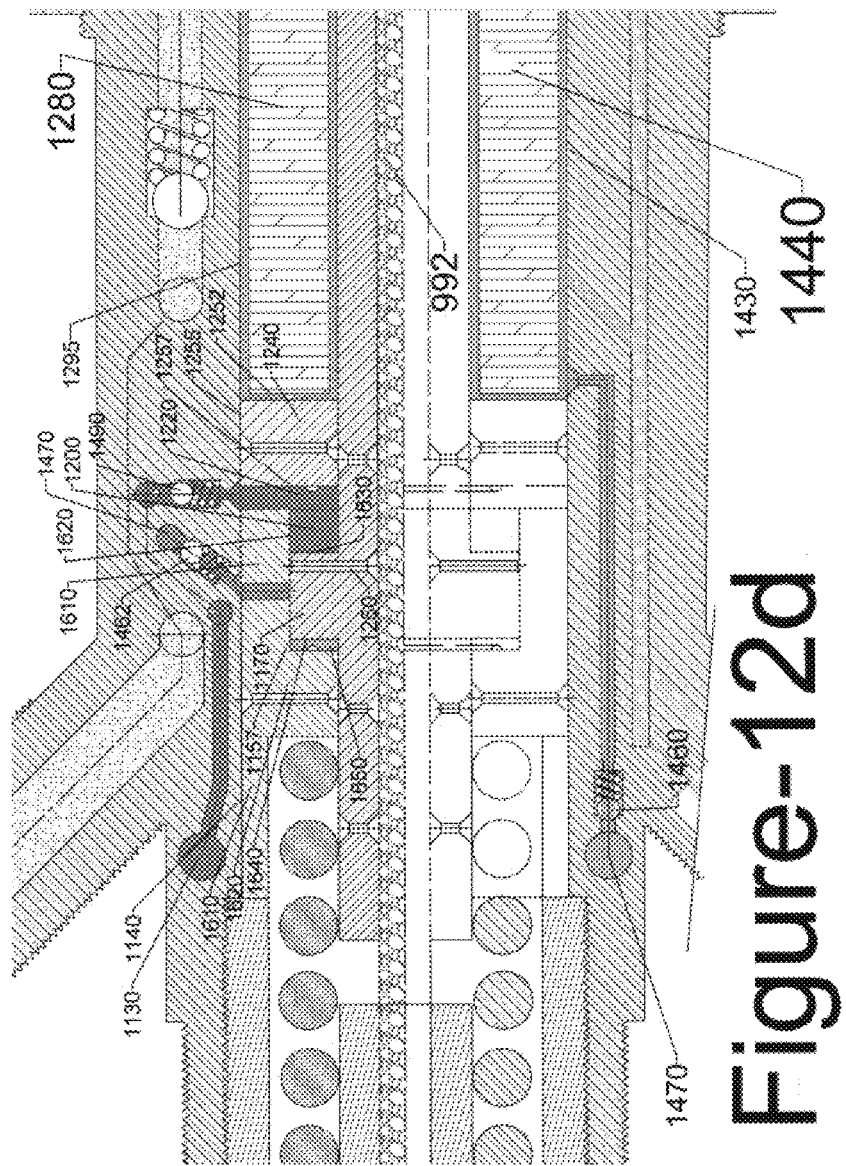
FIG. 12d illustrates a detail view "Linear" state SLV-CRP Hydro-Air self resonance actuator

Details of Structure of the SLV-CRP Injector See FIGS. 11, 12) *a,b,c,d* and 13*a,b*

The CRP (SLV) actuator components, comprising:

Piezoelectric Coupled Piston (PCP 1240), residing in:

The designated area of the Miniature Housing Cylinder (MHC 1255, 1295), which contains:

the Piezoelectric Activating Device (or solenoid) (PAD 1440, 1280) to form:

Piezoelectric Air Chamber (PAC 1430) (for simplicity also defined as "Air pressure chamber A").

The other driving face of the Piezoelectric Coupled Piston is defined and referred to as (PCP 1257):

Formed with both of the Miniature Housing Cylinders (MHC 1255) along with;

the Spntle's Miniature Bushing Cylinder (MBC 1610, 1620) and the Spntle's Piston with an upward-driving face (SDP 1630), a Fuel Pressure Chamber (FPC 1200, 1220) (for simplicity also defined as "fuel chamber B").

Fuel Chamber B, as mentioned in 23*b*, constructed (in its linear state, see FIG. 12*c*, 12*d*) of two chambers ($B_{PCP}$ 1220) (associated with piston PCP) and ($B_{MBC}$ 1200) (associated with piston MBC). Chamber B as mentioned contains two operating pistons (cylinders):

Piezoelectric Coupled Piston driving face (PCP 1257) residing in the designated area of the Miniature Housing Cylinder (MHC 1255) and the other:

The Spntle's handle Piston with an upward-driving face (SDP 1630) residing in the Spntle's Miniature Bushing Cylinder (MBC 1610, 1620).

as it was predefined, the ratio between: Area of Piston (PCP 1257)/area of Piston (SDP 1630)=$1/n_a \sim n_d$. the corresponding displacement ratio between the pistons defined as "$n_d$" corresponds approximately to the proportional opposite of the piston areas $n_a$; where $n_d \geq 1$.

In other words, the relative shifting of Piston (SDP 1630) demonstrates gain displacement in reference to Piston (PCP 1257). Such displacement corresponds to factor "$n_d$".

The displacement gain of Piston (PCP 1257) may be necessary if there is insufficient displacement of the Piezoelectric Activation Device (PAD 1440, 1280).

Note: (The piezoelectric stack as per today's technology demonstrates a very small displacement in response to an electrical field.)

The Spntle air-Return Piston (SRP 1640, 1650) residing in the Spntle's Miniature Bushing Cylinder (MBC 1610, 1620) forms a Spntle's air Return Chamber (SRC 1650) defined as "air chamber C."

Upon applying ECS signal, the Piezoelectric Activating Device (PAD) (solenoid) expands and pushes the Piezoelectric Coupled Piston (PCP 1240, 1257) upward.

The displacement of the (PCP 1240, 1257) causes the fuel within chamber B to push the Spntle's Driving face Piston (SDP 1630) upward and shifts the Spntle out of its "Off" Steady-State Equilibrium (OSE)$_{d=0}$ state upward against the Spntle's Return driving face Piston (SRP 1640, 1650), which applies downward force/to oppose) on the Spntle Piston Handle (SPH 1170) upward movement.

Since the SDP, SRP piston driving faces are an integral part of the Spntle Piston Handle (SPH 1170), the displacement of such piston driving faces shifts the entire Spntle upward/downward by a factor of "$n_d$" referenced to (PCP 1240, 1257).

Said apparatus comprising said pistons and chambers upon activating the PAD 1440, 1280, enables a new Linear Steady-State Equilibrium (LSE)$_d$, defined as the collection of all the possible displacement points that may be targeted by the shifted Spntle when switching from its "Off" state into its "Linear" or "On" one, in order to enable the required (desired) fuel mass to flow into the cylinder (also defines as Amplitude modulation AM).

To enable, upon minimizing/shut-off of the ECS signal, the PAD to retreat and the accumulated air pressure in the Spntle's Air-Return Chamber (SRC) to push the Spntle back to its "Off" Steady-State Equilibrium (OSE)$_{d=0}$ State, ready to perform its next cycle (next fuel spray delivery at the next work cycle).

To enable the Spntle to switch out of its "Off" (OSE)$_{d=0}$ state into any desired point in the "On" or "Linear" zone (as dictated, for example, by the amplitude of the voltage level of the ECS signal), which corresponds to:

Unique fuel mass injection per time unit, which consists of the proportional linear alignment of the grooves 1330 and 1340 in the SLV valve with the inlet 1260, outlet 1380 pressure (delivery) lines 1540 to enable fuel injection from the nozzles 1350 and 1390 into the cylinder to perform the desired injection (to achieve proper detonation).

To enable those three chambers to be correlated to each other in the $(OSE)_{d=0}$ state just by pressure alone (the PAD 1440, 1280 is passive when it is not energized). Upon the upward activation displacement of the PAD, a momentarily "Linear" Steady-State Equilibrium $(LSE)_d$ point will settle down, comprising the following:

Initially as mentioned, the "Off" Steady-State equilibrium $(OSE)_{d=0}$ state demonstrates $P_{A,OSE}=P_{B,OSE}=P_{C,OSE}$. which means equal pressure is shared among the three chambers in the Off state. At that state as predefined, the PAD is retracted and does not affect such equilibrium. ($P_{A,OSE}=P_{B,OSE}=P_{C,OSE}$ are defined as the pressure corresponding to chambers A, B, C under $(OSE)_{d=0}$ state.)

Upon the PAD's (1440, 1280) activation, a new $(LSE)_d$ equilibrium point will share equal pressures between chambers B and C under "Linear Steady-State equilibrium $(LSE)_d$ state," and the pressure will have a dramatically higher value. $P_{B,OSE}=P_{C,OSE}<<P_{B,LSE}=P_{C,LSE}$ Chamber A, due to the upward movement of Piezoelectric Coupled Piston (PCP 1240, 1257), faces a reduction of pressure as Chamber A is expanding (energy from chamber A (and the PAD) contributes to the upward shift of the Spntle). $P_{A,OSE}>>P_{A,LSE}$ In other words, $(LSE)_d$ in chambers B and C demonstrate a dramatically higher pressure value compared to the "Off" Steady-State Equilibrium $(OSE)_{d=0}$ state yield: $P_{B,OSE}<<P_{B,LSE}$; $PC,OSE<<P_{C,LSE}$ where $PB,LSE=P_{C,LSE}$ (refers to when the pressure in the corresponding chambers B, C at the linear state share the same value which demonstrate extremely higher pressure than at Steady-State Equilibrium $(OSE)_{d=0}$ state one).

To enable the up shift of the Spntle to increase its potential return force to act on the Spntle's air Return Chamber (SRC 1650). Such return force is used when the PAD is inactivated. This return potential energy acts to shift the Spntle back to its "Off" Steady-state equilibrium $(OSE)_{d=0}$ state or:

$E_{p,c,LSE}>>E_{p,c,OSE}$; ($E_{p,c,LSE}$ defined as the Potential Energy stored in chamber C at $(LSE)_d$ equilibrium state demonstrates a dramatically higher potential energy value than at the $(OSE)_{d=0}$ state.

Upon minimization/shut-off of the ECS signal, the PAD retreats downward, and such potential return force of the Spntle's air Return Chamber (SRC 1650) pushes the Spntle Back into its "Off" Steady-state Equilibrium $(OSE)_{d=0}$ point to make it ready for the next spraying cycle at its next working state (cycle).

This "Up"/"Down" shifting of the Spntle as controlled by the ECS causes the Spntle's SLV valve located near the nozzles to momentarily open and permit the high-pressure fuel to flow into nozzles (1350, 1390) as a function of the ECS timing and displacement signal.

The ECS signal may be configured to control the window, phase, and displacement (defined as Spntle Upward Swing (SUS)) of the injector. Such signal will also time the Leaschauer Engine, ensure its optimizations, maintain the required fuel mass, automatically adjust itself to the fuel (fuel mix) in use, and verify its environmentally friendly requirements.

The Control Processing Unit (CPU) also needs to control and to verify the air volume introduced into the cylinder in order to maintain the Air to fuel ratio at its optimal point.

All those qualities (h,1.4q-h.1.5) are defined and referred to as: "Leaschauer Engine Optimal Configuration" (LOC) and are integral part/contained in the inventive LCP process.

To allow the use of Air/Fuel pressure Compensation system (AFC system), comprising:

A, B, C chambers air/fuel inlets, their corresponding inline directional valves, and Fuel/Air Equalizer (FAE) device, as follows:

The FAE being used to maintain the desired pre-compressed air and fuel pressures in chambers A, B and C. To build up the required air/fuel service pressures and to maintain them while the Leaschauer Engine is running.

To provide an external Fuel/Air Equalizer (FAE) device (FIG. 13-*a* 13-*b*) to maintain desired fuel pressure in chamber B in proximity to the air pressure and supply it to the injector's chamber B via inlet 1130.

To provide the apparatus of the Fuel/Air Equalizer (FAE) device (FIG. 13*a*; 13*b*), consisting of the following components: Equalizer Fuel Inlet (EFI 1520), Equalized Fuel pressure Outlet (FEP 1530), measured Pressure Air Inlet (PAI 1510), Equalizer Selector Piston (ESP 1540) and Equalizer Return Spring (ERS 1550).

To provide the Equalizer's Feedback Passage (EFP 1560) (FIG. 13*a*; 13*b*) to apply feedback pressure on the Equalizer Selector Piston (ESP 1540) (on its spring driving-face side) to shift the Equalizer Selector Piston (ESP 1540) into its "fuel flow-disabled position state" when fuel pressure becomes sufficient (equal to the inlet Measured Air Pressure (MAP)).

To allow external air pressure being supplied to chamber A of the injector via Chamber A Inlet (CAI 1470) and Chamber C Inlet (CCI 1165). Supplies equalized fuel pressure to chamber B of the injector via inlet 1130 and is constructed such that all of the air/fuel inlets employ the corresponding inline directional valves (A) 1460, (B) 1490 and (C) 1462, to maintain stable service air and fuel supplies to the corresponding chambers SLV-PULSAR Injector The third predefined inventive injector, comprising: face-to-face (mirrored) piezoelectric (solenoid) actuators, rail-to-rail SLV valve constructed to oscillate around midpoint ("Off" Steady-State Equilibrium $(OSE)_{d=0}$ state Injector); claimed, defined and referred to as: SLV-PULSAR, inventive-implementation injector.

The SLV-PULSAR Injector is ultimately based on the structure of the second SLV-CRP injector implementation. The main inventive improvements are as follows:

An upward Piezoelectric Actuator Device (PAD) was added, to time and control the Spntle's return forces along with:

Its predefined Spntle Return Chambers ($C_{SRcu}$ "up" and its corresponding $C_{SRCd}$ "down" chambers) to assist in creating: nearly free running space and an environment clear of hydraulic liquids, to enable the fast-moving Spntle to freely oscillate;

Along with rail-to-rail SLV valves (see h.3.1c), which were also added to the upper rail, to enable steady-state equilibrium midpoint ("Off" Steady-State Equilibrium $(OSE)_{d=0}$ state), see FIG. 15*b*.

Those improvements were made to gain an upper-rail injection to double the partial injection speed and total fuel mass injected per cycle unit (one up and down full swing).

As mentioned, two face-to-face (mirrored) SRC pistons were added (one at each rail) to separate between the fuel hydraulic gain chamber $B_u$ and $B_d$ and their corresponding air chambers $C_u$ and $C_d$ (on both sides of the Spntle handle) to improve and enable nearly liquid-free running space for the Spntle to swing.

And as mentioned, the structure of the SLV valve was modified to create the "OFF" midpoint equilibrium state to enable alternating injection and fuel mass increase per unit cycle Structural Details of the SLV-Pulsar Injector The inventive Polarized pUlsed Linear Symmetrical self Acting Resonance-SLV injector ("PULSAR-SLV" injector) is claimed, defined and referred to as:

Rail-to-rail, linear-axis, twin-acting actuators, where the linearly moving Spntle is designed to swing around a midpoint ("Off" Steady-State Equilibrium $(OSE)_{d=0}$ state, see FIG. 15b 2277, Zero Crossing Central line) to enable:

Spntle to oscillate at approximately its self-resonance frequency, while its fine-tuning control frequency is maintained by the ECS generator, subject to actual engine performance (e.g. RPM, optimal firing point, firing pattern fuel mix, power demand/requirement and ECS optimal configuration).

The SLV valve (which is an integral part of the Spntle tip and the miniature housing) was split so as to spray part of the required fuel injections from each end rail to double the alternating injection speed and fuel mass.

At the defined midpoint $(OSE)_{d=0}$ (see FIG. 15b, illustrated by zero crossing vertical line 2277), the Spntle is structured to block the high-pressure fuel inlets B (2235, 2340) while releasing residual fuel outlet pressure into the drain system via Outlet Pressure Release (OPR 2060, 2065) valves into the Hollow Center Core HCC (see FIG. 15c 2360).

Outlet Pressure Release (OPR 2260, 2265) valves, together with the One-Way Valves/directional valves (OWV 2295, 2330), inhibit possible fuel leaks into the nozzles in the off state.

Pulsar-(SLV) Injector Components, Comprising:

Dual Piezoelectric Coupled Pistons ($PCP_u$ (up) 2180 and $PCP_d$ (down) 2110), residing in:

The designated area of the Miniature Housing Cylinder (MHC 2210), which contains:

Two Piezoelectric Activating Devices (or solenoids) ($PAD_u$ 2250 (UP), $PAD_d$ 2020 (Down)). The PADs act in opposite directions to each other. Both PADs apply force on the corresponding backside of the PCP piston by means of the pushing balls/ring (FIG. 15c, e.g. 2370 and 2380)

Figure 14B:
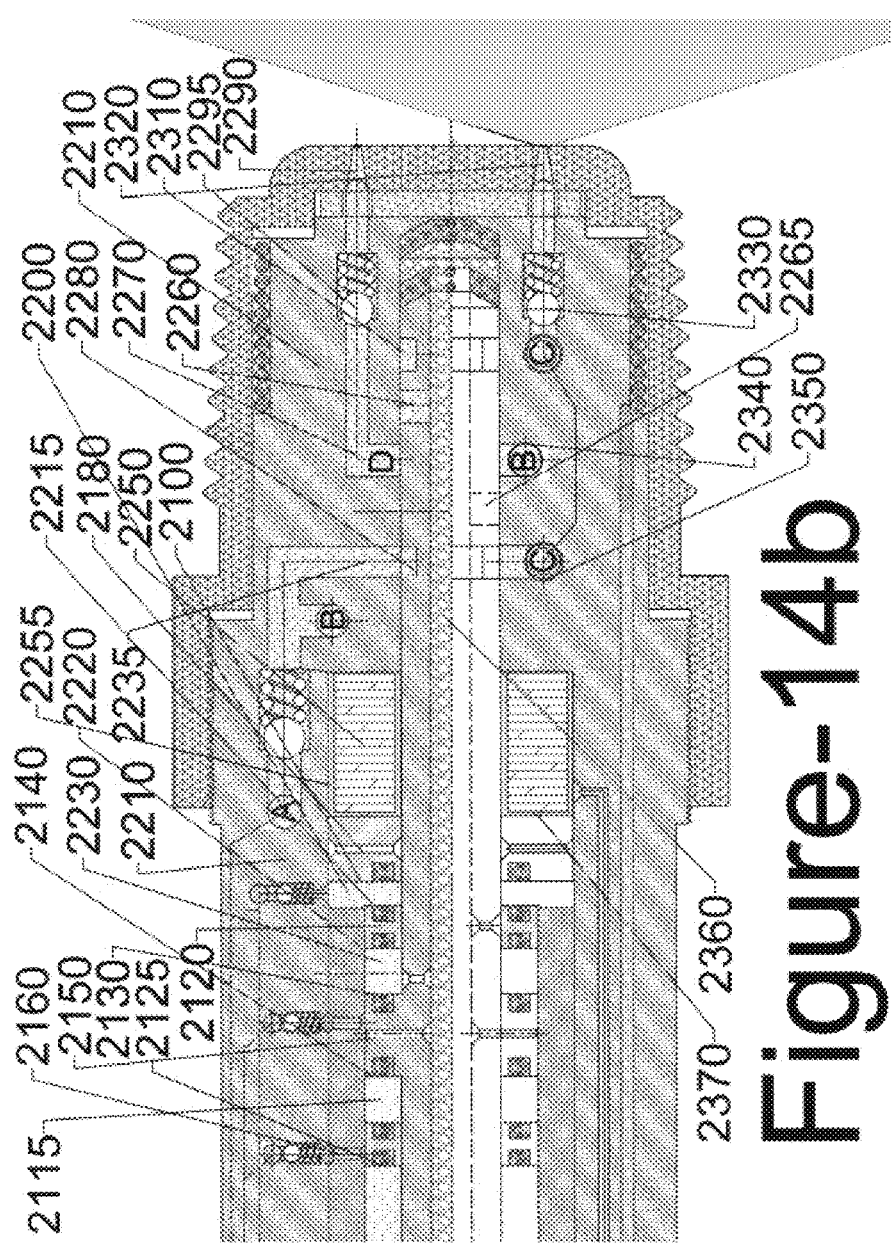
FIG. 14b illustrates a tip view "Linear shift up" state SLV-PULSAR dual Hydro-Air self resonance actuator.

FIG. 14c item 2000 illustrates drain Spntle expansion space.

FIG. 14c item 2040 illustrates Main High-pressure fuel inlet connector to further distribute high-pressure fuel to inlet/distribute point 2050 (A 2050)

Define Air Chambers $PAC_u$ ($A_u$) and Air Chamber $PAC_d$ ($A_d$)

Two mirrored Piezoelectric Air Chambers $PAC_u$ 2255 and $PAC_d$ 2075 (for simplicity also defined as "Air pressure chambers $A_u$ 2255 (up) and $A_d$ 2075 (down)"). Structured to balance and maintain the air pressure forces around the Piezoelectric Coupled Pistons (PCPs).

In this entire disclosure, "Up" direction is defined on the Spntle's center line as: the direction pointing away from the nozzles.

Define Fuel Pressure Chambers FPCs ($B_u$ and $B_d$):

The upper Piezoelectric Coupled Pistons (return face) are defined and referred to (see FIG. 14) as: $PCP_u$ 2240, and its downward mirrored driving face as $PCP_d$ 2100 (see FIG. 16):

Formed with both of the Miniature Housing Cylinders (MHC 2210) along with;

The Spntle's Miniature Bushing Cylinder (MBC 2220):

And along with the: Spntle's Return Piston $SRP_d$ 2120 with its upward-driving face (see FIG. 16b) ($SRP_d$ 2090) defined and referred to as:

Upper Fuel Pressure Chamber $FPC_u$ 2085/2055 (or for short $B_u$ 2085/2055; see FIG. 14c) and its mirrored downward one ($FPC_d$ 2200/2190, or for short $B_d$ 2200/2190; see FIG. 16c)

Chambers "B" Structure and Functional Definition to Enable Hydraulic Gain Displacement.

Fuel sub-chambers $B_{PCP}$ and $B_{SRP}$

Fuel Chamber $B_u$, as mentioned in h.3.4e, constructed in its linear state of two combined chambers, $B_{PCPu}$ 2085 (associated with piston $PCP_u$ 2085) and $B_{srpu}$ 2055 (associated with piston $SRP_u$ 2090; see FIG. 14).

Therefore, in other words, Chamber $B_u$ contains two operating pistons (cylinders), the $B_{PCPu}$ 2085 and $B_{SRPu}$ 2055, and the corresponding mirrored one:

Fuel Chamber $B_d$, constructed (in its linear state; see FIG. 16c) of two combined chambers, $B_{PCPd}$ 2200 (associated with piston $PCP_d$ 2200); and $B_{srpd}$ 2190 (associated with piston $SRP_d$ 2215; FIG. 16).

Define "Displacement Factor" "$n_d$"

Piezoelectric Coupled Piston ($PCP_u$ 2240 return face) and ($PCP_d$ 2100 driving face) residing in the designated area of the Miniature Housing Cylinder (MHC 2210) and the other:

The Spntle's Return Piston FIG. 16b ($SRR_d$ 2215 driving face) residing in the Spntle's Miniature Bushing Cylinder (MBC 2220).

The reduction in the size of the diameter of those pistons/cylinders enables fuel chamber B (as it was predefined in h.3.41-h.3.4m), a gain in shifting displacement ratio between: Area of pistons ($PCP_u$ 2240, $PCP_d$ 2100)/area of pistons (SRP 2125, 2215)=$1/n_d \sim n_d$, the corresponding displacement ratio between the pistons is defined as "$n_d$" which corresponds approximately to the proportional opposite of the piston areas "$n_a$"; where $n_d \geq 1$.

In other words, the relative shifting of pistons SRP 2125, 2215 demonstrates gain displacement in reference to pistons PCP 2240, 2100. Such displacement corresponds to predefined factor "$n_d$".

The displacement gain of pistons SRP 2125, 2215 in reference to PCP 2240, 2100 may be necessary if there is insufficient displacement of the Piezoelectric Activation Devices (PAD 2250, 2020).

Note: The piezoelectric stack as per today's technology demonstrates a very small displacement in response to an electrical field.

Define: Spntle's Air Return Chambers Upstream $C_{SRCu}$ 2115 ($C_u$ 2115) and Downstream $C_{SRCd}$ 2230 ($C_d$ 2230)

The Spntle's air-Return Pistons (SRP 2090, 2120) residing in the Spntle's Miniature Bushing Cylinder (MBC 2220) form Spntle's air Return Chambers (SRC 2230, 2115) defined as "air chambers $C_{srcu}$ 2115 ($C_u$ 2115) and $C_{srcd}$ 2230 ($C_d$ 2230)."

"PULSAR-SLV" Injector Method of Operation

Spntle's Upward Driving Force Description

Upon applying an ECS signal (see FIG. 10 1180), the Piezoelectric Device $PAD_u$ 2250 (solenoid) expands and pushes via pushing ball/ring 2370 the Piezoelectric Coupled Piston PCP 2180 upward, where $PAD_d$ 2020 remains inactivated, maintaining the linear location of PCP 2110 unchanged.

The displacement of the forward Piezoelectric Coupled Piston ($PCP_u$ 2180) causes the fuel within chamber $B_u$ to push the Spntle air-Return Piston ($SRP_u$) upward to demonstrate displacement gain "$n_d$" in the up direction.

The gained displacement of $SRP_u$ causes a chain reaction as follows:

The Spntle Driving Piston (SDP 2130) is forced to swing upward and shifts the entire Spntle out of its "Off" Steady-State Equilibrium $(OSE)_{d=0}$ state upward (see FIG. 15*b* 2277, Zero Crossing vertical Center Line). The corresponding pressure in both $C_{SRC}$ chambers increases as the volume decreases, and potential energy is accumulated in both C chambers.

Due to forces applied to the Spntle Driving Piston (SDP 2130), the Spntle Piston Handle (SPH 2150) is forced upward:

Since the SDP driving piston faces (SDP 2130, 2140) are an integral part of the Spntle Piston Handle (SPH 2150), the displacement of such piston driving faces shifts the entire Spntle symmetrically upward/downward by a factor of "$n_d$" referenced to PCP 2110, 2180.

Define Linear Zone

Said apparatus comprising said pistons and chambers, upon activating the PAD 2250, enables a new Linear Steady-State Equilibrium $(LSE)_d$, defined as the collection of all the possible displacement points that may be targeted by the up-shifted Spntle when and where:

Switching from its "Off" (midpoint, Off Steady-State Equilibrium $(OSE)_{d=0}$) state (FIG. 15*b*, Zero Crossing vertical Central Line 2277) into its "Linear" zone or "On" state (new Linear Steady-State Equilibrium) $(LSE)_d$, enables the required (desired) fuel mass to flow into the cylinder simulating Amplitude Modulation $(AM)_d$.

FIG. 16*b* illustrates, e.g., (by pointer 2260) the linear/"ON" state, where fuel passes from point B to point D refer to as "ON" state where (LSE)d=>"ON" (where the Spntle groove fully aligns with the inlet/outlet openings)

Chambers $C_u$ and $C_d$ (despite the initially different tensions caused by the momentarily expended PAD 2250) will settle down in very short time to demonstrate equal volume for $C_u$ and $C_d$, as they must share the same pressure. (See FIGS. 14*c* and 16*c* 2230, 2115.)

Reverse/Redirect the Axial Spntle's Orientation Movement/Swing, by Alternating/Activating the Opposing "PAD"

At that point (if there is still fuel demand), the ECS will switch between PAD 2250 (which will retreat) and PAD 2020, which accordingly will expand.

The Spntle will rush (accelerate) to its down rail using both: the downstream PAD 2020's activation energy combined with the conserved energy pre-stored in chambers $C_u$ and $C_d$ during the previous up activation (or vice versa) to cause a "ping pong rally."

This "ping pong rally" (containing one or more unit cycle(s)) will continue as long as there is demand for fuel, limited by the time restriction defined by the situational location of the Main Power piston in reference to UDP and the allowed window defined in the LCP process, as configured/stored in the system PCU.

In order to maximize the efficiency of the PULSAR-SLV injector, by design, such a "ping pong rally" should be as close as practical to the self-resonance frequency of the system as determined by:

The Spntle weight, the forces applied by the PADs, and differential pressure applied on the Spntle handle by the mirrored $C_u$ and $C_d$, along with the damping forces applied by the permanent magnet and fraction, which is nearly neglected.

Note: It is critically important to monitor the Spntle location/displacement in its journey from rail to rail in real time to enable sufficient ECS control, by placing appropriate sensors along its moving pass. The detail of such an inventive monitoring system is outside the scope of this disclosure.

PULSAR-SLV Permanent Magnets System

The PULSAR-SLV Permanent magnets system was constructed to enforce/ensure initial pre-displacement state of all components/moving parts of the injector.

Note: This PULSAR-SLV implementation uses a permanent magnet instead of mechanical springs (see FIG. 16*c*). The magnet item number, name, and coded index define each magnet location and designated function (e.g., Piezoelectric Coupled Piston PCP) with index code R rear, F front, M magnet, S stator, D dynamic U up and d down to identify the specific magnet, as follows:

2430 $PCP_{RM}$, 2452 $MAIN_{RSM}$, 2454 $MAIN_{RDM}$, 2456 $SRP_{RuM}$, 2432 $SRP_{RdM}$, 2434 $SDP_{FM}$, 2436 $SDP_{RM}$, 2438 $SRP_{FUM}$, 2352 $SRP_{FdM}$, 2354 $PCP_{FUM}$, 2332 $MAIN_{FDM}$, 2334 $MAIN_{FSM}$

The PULSAR-SLV injector could have been implemented using an appropriate mechanical spring instead, if there had been room for it.

The Air/Fuel Service Pressure Compensation System (AFC System) and the Fuel/Air Equalizer (FAE) Device See FIG. 13*a*,*b*):

The Air/Fuel service pressure Compensation system (AFC system) and the Fuel/Air Equalizer (FAE) device comprising:

Chambers A, B, and C air/fuel inlets, their corresponding inline directional valves, and Fuel/Air Equalizer (FAE) device (see also h.1.5b-h.1.6a):

The fuel/air service system comprises the following components:

The 2420 inlet service line referred to as: low-pressure air service inlet, including a Inline Directional Valve (IDV 2410) to maintain constant air pressure at the Piezoelectric Air Chambers $PAC_u$ 2255 and $PAC_d$ 2075 to assist in balancing the residual forces around the PCP pistons.

FIG. 16*c*, 2030, 2122, 2128 indicate constant low-pressure fuel service inlet/directional valves to chambers $B_u$ and $B_d$ FIG. 16*c*, 2070, 2124 and 2126 indicate constant low-pressure air service to inlet/directional valves for chambers $C_u$ and $C_d$.

Shut-Off/Terminating Fuel Spray/Injection Cycle.

Upon minimizing/shutting off the ECS signals to both PADs (2250, 2020), the piezoelectric stacks (solenoids) retreat, and the accumulated air pressure in both of the Spntle's Air-Return Chambers ($SRC_u$ and $SRC_D$) pushes the Spntle back to its "Off" Steady-State Equilibrium $(OSE)_{D=0}$ state, ready to perform its next cycle (next fuel spray delivery at the next work cycle).

To achieve a rapid termination of the injection, the ECS may use reverse activation of the PADs to brake/oppose the high-energy movement of the Spntle.

The permanent magnet has to verify/ensure that the Spntle will be forced back to the "Off" Steady-State Equilibrium $(OSE)_{D=0}$ state whenever no ECS signal is applied on the PADs or in emergency fail-safe state/condition: engine shut-off or malfunction of the ECS signals Define Linear Zone Simulated Amplitude Modulation (AM) in the PULSAR-SLV Injector To enable the Spntle to switch out of its "Off" $(OSE)_{d=0}$ state into any desired point in the "On" or "Linear" zone (as dictated, for example, by the amplitude of the voltage level of the ECS signal), which corresponds to:

Unique fuel mass injection per time unit, which consists of the proportional linear alignment (see FIG. 16*b*) of the corresponding grooves 2310 in the SLV valve with the inlet 2340 (inlet B) to outlet 2270 (outlet D), which are fed by high-pressure (delivery) lines (pressure line A) to enable partial fuel injection from the 2270 nozzle set ("set" is defined as all the nozzles that may be fed with high-pressure fuel by outlet D, where only one is shown in the drawings).

Or vice versa (see FIG. 14*b*), alternate grooves 2280 will deliver from inlet 2235 (inlet B) to outlet 2350 (Outlet C) to enable alternating injection via the 2330 nozzles "set" (all the nozzles fed by outlet C; only one is shown in the drawings) into the cylinder to perform the desired injection (to achieve proper detonation).

Forces Acting on the Spntle Due to PAD's Retreat:

Using Stored Potential Energy accumulated in Chambers $C_u$ and $C_d$ as return forces:

To enable the up/down shift of the Spntle after the PADs have retreated (ECS signal's deactivated state), the injector uses accumulated potential energy, which was stored in the $C_{SRC}$ chambers by the Spntle as it moved up (down).

Such potential energy was accumulated to push the Spntle (and rail-to-rail SLV valve) back using the Air Return Chambers. See FIG. 14*b*,*c* $C_{SRCu}$ 2230 (FIG. 16*b*,*c* for $C_{SRCd}$ 2115).

As mentioned, such return force is used to assist in Spntle swing and when the PADs are not activated. This return potential energy acts to shift the Spntle back to its "Off" Steady-state equilibrium $(OSE)_{d=0}$ state (see FIG. 15*b*,*c*) or:

$E_{p.c.LSE} \gg E_{p.c.OSE}$; ($E_{p.c.LSE}$ is defined as the potential energy stored in the corresponding chamber $C_u/C_d$) at $(LSE)_d$ equilibrium state demonstrates a dramatically higher potential energy value than at the $(OSE)_{d=0}$ state.

Since the orientation of such accumulated energy is directed to oppose the force that created it, the SRC chambers act similarly to a very strong mechanical spring.

Terminating a Cycle

Upon minimization/shut-off of the ECS signal (no more call for fuel/end of spraying/injection window period), both PADs retreat. The potential return force of the Spntle's air Return Chamber ($B_{SRC}$ 2230, 2115) pushes the Spntle back into its "Off" Steady-state Equilibrium $(OSE)_{d=0}$ point to make it ready for the next spray/injection cycle at its next working state (cycle).

The PULSAR-SLV can rapidly cut off/terminate the injection period within ¼ of a cycle unit by momentarily reversing the activation of the PADs, which forces the Spntle's fast self-resonance state into the off state.

Note: Full injection cycle unit is defined as a full "up" with "down" rail-to-rail swing. Therefore ¼ of cycle unit is defined and referred to as the partial swing of the Spntle in one direction/orientation to complete a shift from upper or lower rail into its "Off" Steady-state Equilibrium $(OSE)_{d=0}$ point, e.g., from upper rail to $(OCE)_{d=0}$.

The SLV Valve Nozzles Alternating Injection Pattern

This up/down shifting of the Spntle as controlled by the ECS causes/enables the Spntle's SLV valve, located near the nozzles, to momentarily and alternately open and permit the high-pressure fuel to flow into nozzles 2290, 2320 as a function of the ECS timing and displacement signal.

SLV-PCV Injector General Description (and Some Components that May be Used at all Those Three Inventive Implementations)

The second predefined, claimed, SLV-PCV, inventive-implementation injector valve may employ an additional Pressure Control Valve (PCV) constructed of a piston with two driving faces designated for each of the axial moving directions.

As a result of shifting the Spntle upward (by activating the piezoelectric stack, or solenoid), fuel pressure is applied to the Fuel Controlled Tunnels (FCT 820, 940) at the "Linear"/"On" states of the valve, and it shifts the PCV out of its Pressure Unmask Piston (PUP 902) to open the way for the Pre-Mist Fuel to reach the nozzles of the injector.

When the valve is in an "Off" state, the pressure of designated Circumferential Circular Grooves (CCG) is enabled, applying inlet high-pressure fuel to push the PCVs (using the Pressure Mask Piston (PMP driving face 852) to block any Pre-Mist Fuel from reaching the injector nozzles).

In order to avoid hydraulic lock (and to reduce parasitic Spntle weight), the SLV Spntle employs a Hollow Center Core (HCC 992) which enables the return of unused fuel from the entire injector to be drained back to the fuel tank (defined and referred to as "Drainage Fuel Vent" (DFV 705)).

The Drainage Fuel Vent (DFV) is also used to lubricate via small holes refer to as Lubrication Tunnels (LTUs) 990 (1230, 1420, 1260, 1250) in the Spntle, the movement of the Spntle within the Miniature Housing.

The SLV-PCV/SLV-PRC inventive implementations also employ a Return-to-Off state spring to ensure a Normally Closed state.

The tip of the SLV-type injector may also employ a Pre-Mist Heat exchange see for example FIG. 6*a* to increase the diffusion factor state of the fuel to transform it from its liquid fuel state into a high-temperature, steamed fuel state (Pre-Mist Fuel (PMF)).

The heat exchange employs the extreme parasitic heat generated by the continuous detonation stream occurring in proximity to the UDP in the Cylinder Head (see FIG. 10, 1210).

The SLV Valve Spntle Return Spring is designated to return the Spntle to its "Off" state to maintain a "Normally Closed" state as a safety measure.

The provided Mechanical Spring is employed as a return force acting on the Spntle to shift it downward when the actuator-driven signal is weakened, turned "Off," or in an emergency where the ECS signal is lost or malfunctions.

Figure 9:
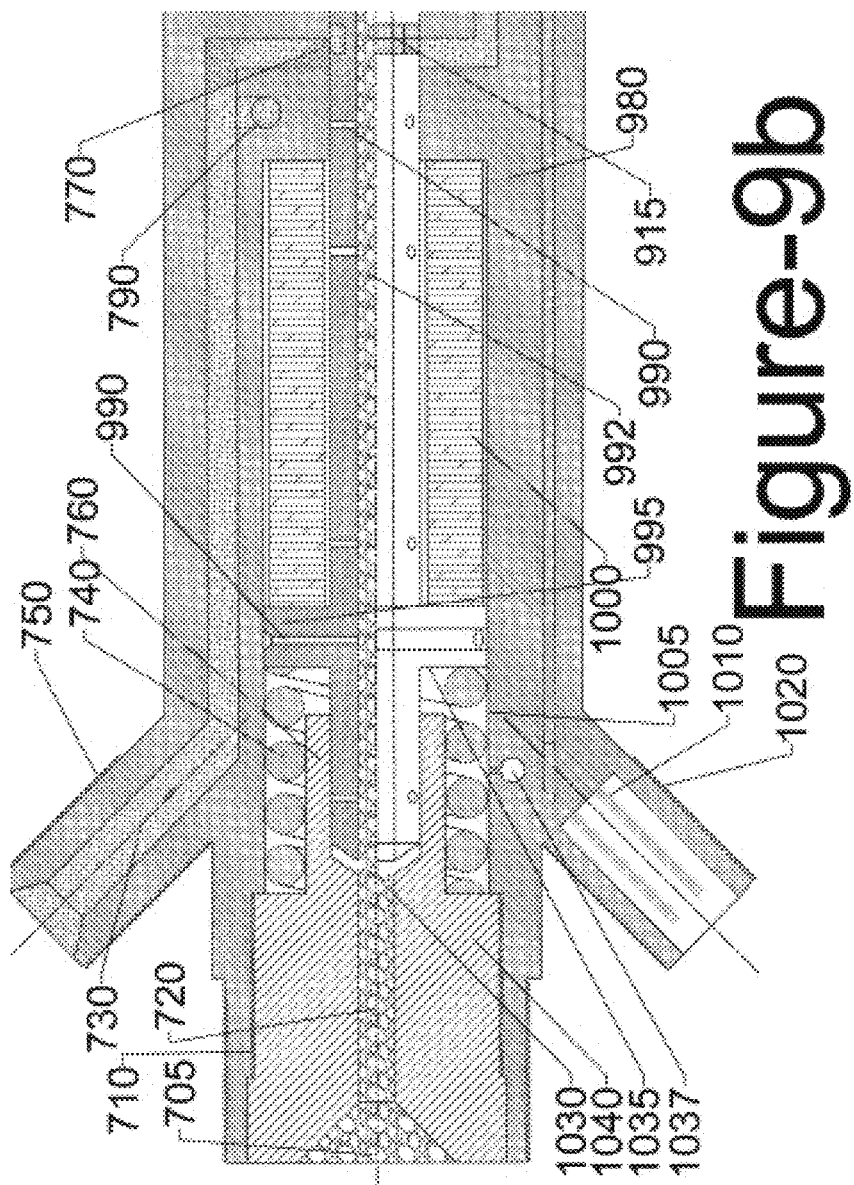
FIG. 9b illustrates a tail view SLV-PCV injector Spntle Power Pneumatic return.

In addition, as illustrated in FIG. 9*b*, the injector SLV-PCV may be employed in addition to the return mechanical spring:

A modified (handle) Spntle Spring Grip (SSG) (995) was converted into a pneumatic return piston see FIG. 9 and the spring chamber was converted into a miniature cylinder to form an air cushion (air spring), whose desired optimal pressure may be provided by a designated external compressor.

Such an air-return spring increases the return force range of the Spntle in its axial down direction to force any desired optimal return force to increase/improve the Spntle's return time response.

The shifting of the Spntle from its "Off" state to its "Linear"/"On" states may be mechanically derived by the electromechanical actuator (solenoid/piezoelectric stack). The actuator is activated, controlled, and powered by the ECS Signal, which is generated by means of an Electronic Control Signal or ECS generator-appropriate signal.

An Electronic Control Signal (ECS) (relevant to SLV-PCV, SLV-CRP and SLV-PULSAR type injectors) (see FIG. 10 for reference) is constructed, configured, and functions as follows:

To activate each of the actuators residing within the SLV injectors at a preset sequence "firing pattern" for the most efficient "phase" and "window," is configured in order to maintain:

The fuel mass required to be delivered to the Leaschauer Engine in the optimal fuel-to-air ratio (to generate the optimal torque for the most economical fuel consumption without compromising environmentally friendly requirements).

Note: The ECS must closely monitor the S2 Air vacuuming/Air enforcing state (FIG. 10 1235) to ensure/control the optimization of the Air-Fuel ratio in the cylinder by:

Adjusting/controlling the Turbo Rpm Level (TRL) (FIG. 10 1236) and or by:

Adjusting/controlling the Air Butterfly Valve (ABV) 1237 to:

Maintain Air flow volume required to maintain Air to fuel ratio.

The system-level design described in FIG. 10 is an integral part of this disclosure; further details of such a system are outside the scope of this disclosure.

In addition, the ECS is designed to sequence the "firing pattern" of the cylinders for remarkably smooth and efficient operation (to achieve equal share of the load).

The Leaschauer Engine employs a synchronized valve system to inlet/force fresh air into the cylinders at the S2 vacuuming stage/inlet forced air (if a turbocharger is used) and to exhaust burned gases out of the cylinder in the S1 exhaust stage The schematic diagram in FIG. 10 describes the main functions of the ECS generator at the system level and the main signals necessary to fire and control each of the cylinders residing in the Leaschauer engine.

The ECS employs monitoring and indication signals in real time, required to adjust, correct, and optimize the operation of the Leaschauer Engine or to point out any malfunctions, which in certain cases may require a shut-off. The claimed flow diagram in FIG. 10, its designated method, and illustrated figures are an integral part of this invention.

Characterization and Requirements Driving the New Featured SLV Injector Technology in Conjunction with the Leaschauer Engine The SLV injector is designed to inject the high energy, steamed/evaporated fuel droplets (Pre-Mist/Pre-Moss Fuel 'PMF' effect) within a tightly constrained window of preferably 3 degrees or better of the working cycle main shaft revolution. (see note d.8)

Additionally, the SLV injector is designed to deliver the specified high energy, steamed, atomized fuel droplets at an accurate phase characterized by the piston reaching its optimal heat and pressure at approximately the Upper Dead Point (UDP).

The above specifications are required to achieve the most efficient extreme pressure detonation while permitting sufficient time for all by-products to be fully consumed, in accordance with the predefined LCP process utilizing the Post (compression) Sequenced Fuel Injection (Post SFI) process.

Such an injector may be structured, but is not limited to, the device described above and referred to as "SLV injector". See general description below and supporting drawings (FIGS. 1, 2, 3) (a,b and c)) characterized in this article. (included all the drawings illustrate the corresponded Different SLV types.)

Background to Development of the SLV Injector

The SLV injector invention is designed to improve and overcome the weaknesses and low efficiencies of the old technologies derived from two types of injectors:

Vacuum-Loading Injector Technology:

Referred to as Vacuum-loading Injector, such technology was developed in the 1970's, to replace the carburetor device which had been used since the development of the ICE Engine.

The Vacuum-Loading Injector is located on the mixture inlet manifold (common rail system) and is activated when the piston is forced down from the Top Dead Point (TDP/UDP) (after the exhaust cycle) to inlet fresh fuel mixture into the cylinder.

This type of injector does not require a lot of energy to operate, due to the low pressure in the inlet manifold. The time available for loading the fuel mixture in this type of system is ½ of the work cycle, corresponding to a time response of 0.02 of a second, assuming 3000 RPM and ½ of the working cycle.

The vacuum loading injector was the first injection technology to be introduced, most likely because of the simplicity of the assembly. Since in this process the fuel droplet mixture is introduced into the piston in the pre-compression stage, the process is limited to operating below detonation pressure (pre SFI) and thus is limited to and sensitive to the pre-designed octane, and resulting in low efficiency.

Direct Injecting (into Cylinder) Technology:

Referred to as Direct Injection (into cylinder) type. In this technology, the injection is still activated at the vacuuming stage or at the start/middle of the compressing stage. This method was introduced and has been developed since the end of the $20^{th}$ century.

This technology provides some increase in efficiency compared to the vacuum-loading injector technology, but since the fuel is still injected at a pre-SFI point the detonation maintains its sensitivity to the octane in use, and the process is still limited to low-to-mid compression pressures in the cylinder and again dependent on the octane in use.

Both of these types of injectors currently in use are typically limited to 0.005 of a second injector time response.

The problem with those old technologies is that the fuel is introduced before or at the start of the compressing cycle (Pre SFI) process and as a result the detonation is fuel octane dependent, highly sensitive to the octane in use, requiring an expensive fuel octane improvement to attain higher efficiency.

There is a limit to the feasibility of improving the octane number, particularly since the cost of further octane improvement rises dramatically at a certain point. As a result, the development of existing injector technology to achieve higher efficiency has virtually reached a dead end.

In other words since the old technologies are limited to low/mid detonation pressures, this limitation prevents the dramatic improvement of engine efficiency which could be achieved by increasing the detonation pressure beyond the fuel Specific Detonation Point (SDP).

It appears that one of the main reasons that higher efficiency injection processes have not been pursued is the lack of an injector which could switch on and off to introduce the steamed fuel droplets to the cylinder in the restricted critical window smaller than 3 degrees main axle rotation during the working cycle in the preferred embodiment;

i.e., with switching times smaller than 0.5 Millisecond (0.0005 second in an embodiment, calculated assuming 1000 working cycle revolutions per minute, derived from a shaft frequency of 2000 RPM) and with repeatability better than 10 μs, which is a preferred condition to support such a breakthrough in the injector technology. This is the purpose of the inventive injector technology disclosed herein.

Featured Requirement, Description and Way of Operation

The introduction of the EL-Engine requires a new type of injector having a very short on/off switching time requirement, 0.5 of a millisecond (0.0005 of a second) in an embodiment. The injector further requires extreme repeatability in the range of less than 10 μs in an embodiment, to gain stability.

The injector must provide the ability to switch on/off a fuel line operating at greater than 10K PSI (50K) in an embodiment to overcome the extreme pressure buildup in the cylinder. The injector is also required to control the delivery of the fuel mass in the short time window available.

The featured new EL Engine technology introduces the Selector Linear Fuel Injector (SLV injector) which is designed to carry out the requirement of accurately injecting the high pressure Pre-Mist (steamed fuel droplets) right at the desired moment to maintain efficient detonation.

This injector is further designed to be employed during a very short time window, to perform an injection cycle where and when the piston is close to reaching its Upper Dead Point (UDP) when the pressure and heat in the cylinder are at peak value, to enable the achievement of its most efficient performance.

The injector is designed to have high on-off switching frequency, required in an embodiment to be faster than 3 degrees main axle rotation during the working cycle, and achieved by the fast, high frequency response of the SLV injector to the applied Electronic Control Signal (ECS).

The injector is also required to be able to manipulate the predefined Injection Activation Phase (IAP) and window, so the injection would occur at the exact desired time and space (displacement of the main piston) (i.e., a desired number of degrees main axle rotation before the UDP, with repeatability better than 10 μs in an embodiment.

The timing control of the SLV is not dependent on direct gearing or mechanical means to maintain synchronization between the engine main shaft and fuel injection. The SLV injector is fully electronically controlled and the timing function has been shifted to the ECS system.

These functions are achieved by employing the Electronic Control Signal (ECS) See FIG. 10 (1170, 1180) which manipulates, governs and times in real time the injector valve state and level (to control the desired fuel mass), while monitoring the main shaft real time position.

The ECS generator ensures the synchronization of the ECS to the main shaft rotation time delay and sequencing in firing the cylinders and in the appropriate working cycle. It also requires the ability to initiate and end the injection interval at the required window/phase driven by the ECS. In addition the ECS calculates the required delay between the cylinders in the order they have to be fired.

Note: The literal term "Firing the cylinders" refers to: applying the proper ECS signal for each cylinder in the engine. The appropriate signal for a particular cylinder is applied to that cylinder's actuator, coupled to its injector. The signals applied to each of the cylinders cause the electromechanical actuators associated with each cylinder to timely inject Pre-Mist fuel into the compressed air within the Cylinder, to cause timely Detonation in sequence to achieve Leaschauer Engine efficient smooth operation.

Note: referenced to item k.7 above, the four cycles of the ICE machine are comprised of 1. exhaust cycle, 2. air loading/enforcing cycle, 3. compression cycle 4. PMF introduces to EAP/work cycle. Only two cycles 1. compression and 2. PMF introduces to EAP/work cycle/work out of the four are defined as working cycles. The other two Exhaust and air loading/enforcing cycles considered service cycles.

For example, in a preferred embodiment start injecting at (activated by the ECS) −6° [main axle rotation] before Upper Dead Point (Before UDP) and quit at −1° [main axle rotation] before UDP.

Note: in reference to the use of 6° degree in example K.12: there is a difference between the time of applying the ECS Signal to the injector's actuator and the actual time where pre-mist fuel is sprayed into the cylinder, due to the time delay imposed internally by the injector. The solution is to advance the ECS firing signal to compensate for such delay, while quitting earlier, in order to correctly time the actual firing.

In reference to note k.13 it is also important to mention that such delay time might increase as the RPM grows higher, due bigger delay of the mechanical components (Spntle) as the RPM increases. Again the electronic processing control unit (1180) needs to account for all those changes and to modify the signals accordingly. The details of the ECS are not within the scope of this disclosure.

It is anticipated that the Leaschauer Engine will work by ECS activation signal with a phase whereby injection starts up to 15 degrees main axle rotation before UDP, and stops up to 15 degrees main axle rotation after UDP.

The Selector Valve Injector (SLV injector) was designed specifically to satisfy the special requirements dictated by the EL-Engine specific needs, to enable the increasing the pressure in the cylinder prior to introducing the misted fuel foam, to achieve extreme detonation pressure in the cylinder.

Invention Implementation Disclosure, General Characteristics and Requirements

The general apparatus comprises:

an internal combustion engine designed to provide a Leaschauer Combustion Process (LCP), including:

At least one main piston(s) housed in a main cylinder(s); see application 13219384

A predefined main axle (rotor) shaft refer to as: "Main Axle (rotor) Shaft": containing the following main components:

A crankshaft, structured to convert the circular rotating movement of the shaft to a linear (push-pull) one. By applying such movement to the connecting rods the movement is transfers further to the piston(s), enabling it (them) to shift up/down within the cylinder(s).

The Leaschauer Engine mechanical structure Refer to as "LE Mechanical Structure" (LMS) must be able to withstand the extreme post-detonation gases (Extreme Pressure Detonation (EPD)) developed in the cylinder(s), as well as withstand the tremendous stress applied on connecting rods piston(s), valves and other moving parts.

Each of the cylinder(s) is equipped with at least one synchronized Air-Inlet Valves FIG. 10 (AIV 1197) and at least one Exhaust-Outlet Valves (EOV 1192) refer to as Inlet/Exhaust valves to enable a four-cycle process in the Leaschauer Engine.

Such inventive mechanical structured described in item 1.2.1-1.2.3 above define and refer to as: Leaschauer engine Mechanical Structure (LMS). The predefine four Leaschauer Engine Cycle Process which is an integral part of the LCP Process refer to as: "LE Four Cycle Process" enabled by the LMS structure includes:

Service cycle (revolution) "S" contains:
S1 state; exhaust,
S2 state; air-vacuuming loading into the cylinder/forcing (inlet) air into the cylinder and:
Work cycle (revolution) "W" contains:
W3 state; which includes: extreme air-compressing process to achieve specific Extreme Air Pressure (EAP) and:
W4 state; which includes:
W4a. introduction of the Pre-Mist Fuel (PMF) to the Extreme Air Pressure (EAP) to create Pre-Mist Mixture (PMM) (Refer to as PRE Mist Mixture PMM) by means of:
Activating the claimed, inventive, implemented Leaschauer Engine Injector (LEI) define and refer as Leaschauer Engine Injector (LEI) to inject Pre-Mist Fuel (PMF) into a specific Extreme Air Pressure (EAP) to create extremely unstable Pre-Mist Mixture (PMM) which cause Extreme Pressure Detonation (EPD) and, as a result:
W4b Work state occurred:
(work in a Leaschauer Engine is defined and referred to as:
The work (energy) gained by the Leaschauer Engine (Main Shaft) as a result of the Leaschauer Combustion Process (LCP) (The inventive LCP Process contains of the 4 cycle process which define and refer as described on items 1.3.1-1.3.6 above
In other words, the energy contained (released) by the gases during Extreme Pressure Detonation (EPD) produces extreme pressure to force the move of the corresponding piston(s)/connecting rods linearly against the crankshaft's circular load (main Leaschauer Engine rotor shaft).
The Leaschauer Engine may use two stages: low pressure and high pressure. Typically the Engine employs multiple (one-staged) piston(s) (cylinders) to achieve the high pressure stage.
The engine may also employ a turbocharger FIG. 10 1236 (assembly) at the low pressure stage (the turbocharger may be driven by the exhaust gases or by the residual heat to conserve energy).
the PCU/ECS 1235 controls the Turbocharger (Turbo) RPM Level TRL (1236) and/or the its Air Butterfly Valve (ABV 1237) to optimize the air/fuel ratio.
The tip of the Upper Cylinder Head (UCH) (FIG. 10, 1210) of each cylinder in the Leaschauer Engine is defined and referred to as:
The upper tip of the cylinder (1210), which is confined by the engine-head (1200), the cylinder well (1202), and the upward-moving piston (1220) as it approaches the Upper Dead Point (UDP), when and where the Extreme Pressure Detonation (EPD) is desired/occurs.
The Upper Cylinder Head (UCH) is equipped as mentioned with a Leaschauer Engine Injector (LEI) (FIG. 10, 1190), the source supplier of the Pre-mist fuel (PMF) in the LCP Process, which may implemented as follows:
The inventive SFD-type injector (see application 14172628) or:
The inventive Selector Linear Valve (SLV), which comprises three inventive, implemented versions described and claimed in this article as:
SLV Pressure Controlled Valve (SLV-PCV) (FIG. 1, 2, 3; a, b, c) implementation and:
SLV piezoelectric (solenoid) controlled, self-resonance, fuel/pneumatic actuator (injector) or SLV-CRP (FIGS. 11, 12; *a, b, c, d,* 13*a,b*) implementation
The inventive Polarized pUlsed Linear Symmetrical self Acting Resonance-SLV injector ("PULSAR-SLV" injector)
The apparatus is configured to enable/force air to fill said main cylinder(s) prior to compression of the main cylinder(s); (in the S2 air-vacuum cycle/forced air loading) prior to W3 extreme air-compression cycle within said main cylinder(s); which includes:
providing specific Extreme Air Pressure (specific EAP) compressed air in said cylinder(s) housing said main piston; The applied (EAP) (extreme compressed air in the cylinder) is designed to dramatically exceed the specific pressure detonation (fuel Specific Detonation Point SDP) or Specific fuel/air (Mixture) Detonation Pressure (SMD) pressure, of the fuel intended to be used;
providing processed Pre-Mist Fuel (PMF); (at a pre-defined point close to the Upper Dead Point (UDP) near the beginning of the W4 Work cycle associated with each cylinder) in a pre-defined window, phase and timing appropriate to Leaschauer Engine working conditions and to the "specific fuel" in use;
providing such Processed Pre-Mist Fuel (PMF) while:
Maintaining preset sequence of the firing (detonation) "firing pattern."
Maintaining uniform Pre-Mist Mixture (PMM).
Maintaining optimal air-to-fuel ratio in the cylinders by controlling the air volume introduced into the cylinders).
The above 1.11.1 to 1.11.3 requirements are defined and referred to as: Optimal Firing Requirements (OFR) and is integral part of the LCP process;
Injecting the processed Pre-Mist Fuel into the specific Extreme Air Pressure (EAP) compressed air in said main cylinder(s) during a restricted defined window close to the Upper Dead Point (UDP) of the main cylinder(s), where pressure and heat are at peak values, with a strictly defined phase and window suitable to "specific fuel" in use at Optimal Firing Requirements (OFR).
Such fuel injection moment is accurately controlled and timed to enable extreme high-compression combustion (Extreme Pressure Detonation (EPD)) without risk of pre-detonation; and to achieve "Leaschauer Engine Optimal Configuration" (LOC)
The predefined Extreme Pressure Detonation (EPD) achieved in the Leaschauer Engine LCP process, demonstrates extremely higher Pressure than the one uses in conventional engines where and when the fuel's Specific Detonation Pressure (DSP) or Specific fuel/air (Mixture) Detonation Pressure (SMD) pressure marks the highest limit pressure which may been practice for the specific fuel intended to be use.
It means that holding back (avoiding) the fuel of being mixed with air in the cylinder before the compressing stage was completed (as it exercised in the Leaschauer Engine LCP process) enabled such process, without risking a pre-detonation to occur. When and where:
In the conventional one, fuel was already had been mixed with air and detonation will occurs during compressing stage to limit such desired Extreme Pressure Detonation (EPD) of being achieved.
The engine is able to use any Pre-Mist Fuel (PMF) or "specific fuel" without risking pre-detonation due to introducing the Processed Pre-Mist Fuel (PMF) to the Extreme Pressure Detonation (EPD) at a defined moment when controlled Extreme Pressure Detonation (EPD) is desired.
The specific Extreme Air Pressure (specific EAP) product may dramatically exceed the specific detonation air pressure (whereas with old, conventional technology, such pressure would cause the "specific fuel" intended to be used to prematurely detonate).
The processed Pre-Mist Fuel (PMF) is injected into the compressed air (specific Extreme Air Pressure (EAP)) during a restricted defined window close to the Upper Dead Point (UDP) of the main cylinder, with a strictly defined phase, This may applied by means of Leaschauer Engine Injector(s) (LEI);

The SLV-type injector may be adapted to operate as a linear fuel switch for extremely high-pressure fuel, wherein the pressure of said high-pressure fuel is sufficiently high to overcome said extreme air pressure in said cylinder during injection, and wherein said fuel switch operates at extremely high linear switching speed.

In an embodiment, the extremely high-pressure fuel has a pressure in the range between 2K-400K PSI.

In another embodiment, the extremely high-pressure fuel has a pressure in the range between 2K-50K PSI.

In an embodiment, the linear switching speed is in the time range between $1/1000$ sec-$1/100,000$ sec, (1000 µs-10 µs (microseconds)), corresponding to frequencies in the range between 1000 and 100,000 sec$^{-1}$ (Hz)

In another embodiment, the linear switching speed is in the time range of $1/10,000$ sec, (100 µs) corresponding to frequencies of 10,000 (Hz).

In an embodiment, the linear fuel switch operated by said SLV injector comprises a Spntle plunger (FIG. 11-12 1320; FIG. 1, 2, 3*a*, *b*, *c* 995 14, 15, 16*b*,*c* 2150, 2280, 2310) disposed in an axial orientation, said Spntle adapted to utilize displacements in an axial direction to enable said linear fuel switch to switch between "On," "Linear," and "Off" states;

Said displacements in an axial direction of said Spntle are provided by a high-frequency electromechanical actuator activated by said ECS signal;

wherein said SLV injector is configured such that, during an injection window, said Spntle urges said SLV into a "Linear," "On" state yielding fuel flow into said injector nozzles.

In an embodiment, the apparatus further includes a return spring loading (Permanent Magnet System) of said Spntle, which provides a normally "Off" state of said fuel switch in the absence of an ECS signal (or lack of/low service air/fuel pressure as required by the air/fuel compensation system (AFC system) (see item h.5.5-h.5.9).

In an embodiment, the Spntle is configured to be free of axial forces due to said high-pressure fuel, thereby enabling said high-frequency response times of said Spntle.

The apparatus may, further include circumferential grooves in said Spntle, configured such that said Spntle displacements in said axial direction enable said fuel switch to switch between "On," "Linear," and "Off" states by allowing or preventing transverse fuel flow by "exposing," "partly exposing," or "not exposing" said circumferential grooves in said Spntle (to high pressure fuel "Inlets Outlets OPenings" IOPs 1330, 1340, . . . 1380). (And the appropriate IOP B, C, D as illustrate for The SLV-PULSAR Injector In an embodiment, a portion of said "On" state is a linear state having a linear relation between said displacement of said Spntle (Amplitude Modulation AM) and said fuel flow, thereby allowing "linear control" of said fuel flow by said ECS signal.

In an embodiment, the SLV-PCV injector may include the inventive Pressure Control Valve (PCV) comprising a return spring and an optional pneumatic assist, with said pressure control valve preventing fuel from reaching said injector nozzles when said fuel switch is in an "Off" state.

In an embodiment, the SLV injector may include a heat exchanger (FIG. 6*a*) to enable fast and effective steaming of said fuel (Pre-Mist Fuel (PMF)).

The implemented SLV type injector is characterized by:

Selector Linear Valve (SLV) injector, said SLV injector driven by an Electronic Control Signal (ECS) Generator, electronically synchronized and referenced to said main axle shaft constructed to distinguish between (W3, W4) Work cycle (revolution) and (S1, S2) Service cycles (revolution).

To allow for identification of four precise cycles (ICE) in the engine with designated "Work" revolution (W3 compress, W4 (PMF introduced into EAP), work "occurred") cycle and "Service" (S1 Exhaust/S2 air-loading/air-enforcing) cycle to result in a working cycle every other revolution (or 1:2 firing event/revolution ratio).

To allow the implementation of a Real-time Detonation Sensing (RDS 1150, 1204) device system to feedback streaming data to the ECS unit in real time reporting that the event defined as: "(Extreme Pressure Detonation (EPD))," had occurred for the current W4 cycle, so the ECS/Process Control Unit can accurately compare/improve the Leaschauer Engine timing/performance and optimize in real time.

To allow the implementation of a Real-time Torque Sensing (RTS 1160) device system to feedback streaming data to the ECS unit in real time to report actual torque data. Such reporting enables the comparison/improvement of the Leaschauer Engine performance efficiency and optimization of the engine. (adjusting for maximum EL Engine torque in minimum fuel consumption).

To allow the implementation of the controlling sensing and firing system described as system level in the body of this disclosure and FIG. 10 hereby.

In an embodiment, the restricted defined "window" close to the Upper Dead Point (UDP) of the main cylinders, is in "window range" of 30 out of 360 degrees around UDP rotation in reference to said main rotor shaft in its working cycle.

Even though the "window range" is expected to be able to operate within 30 out of 360 degrees, wherein said restricted defined window close to the UDP of the main cylinders, it is anticipated that in order to reach high efficiency, it would be desirable to reach "window" ranges of 3 out of 360 degrees rotation of said main rotor shaft at its working cycle.

In an embodiment, within said strictly defined phase, injecting the PMF into the EAP occurs in the window range between 15 degrees rotation of said main rotor shaft before UDP to 15 degrees rotation of said main rotor shaft after UDP (relevant only to the working cycle).

In an embodiment, the strictly defined phase indicates the starting point where injecting PMF into the EAP is desired to begin and the fuel spraying is begun in the range between 1 and 15 degrees rotation angle of said main rotor shaft before UDP (at the working cycle), depending on the specific fuel in use (in order to best configure Extreme Pressure Detonation (EPD) prior to and as near as possible to UDP).

In other words, the activating signal for the ECS generator firing has to be configured, taking into account the time delay between when the activating signal is generated to when the actual spray begins, and even more important, when and where the detonation event takes place (as reported by the Real-time Detonation Sensing (RDS 1150, 1204) device).

In reference to m.21.a: the actual delay in degrees between the generation of the ECS signal (in reference to the UDP) and the RDS feedback signal indicating "detonation has occurred" in reference to the UDP (using Specific Fuel Mix (SFM)) is critical information that must be monitored and stored in the engine Processing Control Unit (PCU) for control, adjustment, and optimization purposes.

The PCU may use a Real-time Detonation Sensing (RDS 1150, 1204) device as real-time feedback to the processing unit (1150) to define the time delay between "generating the activating signal" to "detonation has occurred" as ultimate configuring data to determine the momentary "equivalent Specific Fuel Mix" ("equivalent SFM") contained in the fuel tank, and the equivalent Window and Phase correction required to time and place the detonation occurring moment as desired.

In an embodiment, the SLV injector includes (but is not limited) to;

"Spntle" comprising:

The "Circumferential Circular Grooves" (CCG). The displacement of such grooves in reference to the high-pressure "Inlet/Outlet" fuel opening defines its "On"/"Linear"/"Off" states.

A second embodiment of the injector termed "SLV-PCV implementation" may be employed/constructed to apply fuel pressure on the PCV return face that covers the nozzles in the off state, Wherein the "Spntle Linear Control (SLC) signal enables the "Off," "Linear," or "On" states of the injector valve by applying the proper signal on the Piezoelectric activating device (PAD) (solenoid).

In an embodiment, extreme high compression combustion occurs at a high compression ratio for diesel fuel greater than 22:1 and for gas fuel greater than 12:1.

In the SLV-PRC injector (and the SLV-PULSAR) the line directional valves 1580, 1600 installed on the Fuel Control Tunnels (FCT) 1540, 1545 just before the Fuel Spraying Nozzles (FSN) 1390, 1350 are to ensure that return gases do not get back into the injector.

The Drainage Passage Vents (DPV) 1590, 1605 are to drain any residual fuel pressure (and fuel) residing in the Fuel Controlled Tunnels (FCT 1540, 1545) when entering the "Off" state. The fuel is returned to the fuel tank via the Hollow Center Core (HCC) (970) to avoid any fuel spilling into the cylinder while at the "Off" state.

It is not expected that this invention be limited to the exact embodiments described herein. Those skilled in the art will recognize that modifications may be made without departing from the inventive concept. The scope of the invention should be construed in view of the claims.

With this in mind, I claim:

1. An apparatus comprising:
   an internal combustion engine designed to provide a Post (compression) Sequenced Fuel Injection (Post SFI) Leaschauer Combustion Process (LCP), said internal combustion engine including:
   at least one main piston housed in a main cylinder;
   a main axle (rotor) shaft;
   said apparatus configured to enable an LE four cycle process;
   said apparatus configured to enable air to fill said main cylinder prior to compression of said main cylinder;
   means for providing Specific Extreme Air Pressure (EAP) compressed air in said cylinder housing said main piston to dramatically exceed Specific fuel/air (Mixture) Detonation Pressure (SMD);
   said apparatus built to withstand extreme stress applied by the Extreme Air Pressure on its main structure and moving parts;
   means for providing Processed Pre-Mist Fuel (PMF);
   means for injecting the processed pre-mist fuel into the specific Extreme Air Pressure (EAP) compressed air in said main cylinder to create a uniform unstable PRE Mist Mixture PMM), during a restricted defined window close to UDP of the main cylinder, where pressure and heat are at peak values, with a strictly defined phase;
   whereby said fuel injection moment is accurately controlled and timed to provide Post SFI and to thereby enable extreme high compression combustion (Extreme Pressure Detonation EPD) without risk of pre-detonation;
   wherein said engine is enabled to utilize low-octane fuel without pre-detonation;
   wherein said means for injecting the processed pre-mist fuel into the specific Extreme Air Pressure (EAP) compressed air in said main cylinder during a restricted defined window close to UDP of the main cylinder, where pressure and heat are at peak values, with a strictly defined phase, comprises a Leaschauer Engine Injector (LEI); and
   wherein said Leaschauer Engine Injector is an SLV (Selector Linear Valve) injector having injector nozzles, said injector driven by at least one electronic control signal (ECS) electronically synchronized to said main axle shaft with a 2:1 revolution/working cycle timing ratio.

2. The apparatus of claim 1, wherein said SLV injector is an SLV Pressure Controlled Valve (SLV-PCV) implementation.

3. The apparatus of claim 1, wherein said SLV injector is an SLV piezoelectric (solenoid) controlled, self-resonance, fuel/pneumatic actuator (injector) (SLV-CRP) implementation.

4. The apparatus of claim 1, wherein said SLV injector is a Polarized pUlsed Linear Symmetrical self Acting Resonance-SLV injector ("PULSAR-SLV" injector) implementation.

5. The apparatus of claim 1, wherein said SLV injector is adapted to operate a fuel switch for extremely high pressure fuel, wherein pressure of said high pressure fuel is sufficiently high to overcome said extreme air pressure in said cylinder during injection, and wherein said fuel switch operates at extremely high switching speed.

6. The apparatus of claim 5, wherein said extremely high pressure fuel has a pressure in the range between 2K-400K PSI.

7. The apparatus of claim 5, wherein said switching speed is in the range between $1/1000$ second-$1/100,000$ second, corresponding to frequencies in the range between 1000 and 100,000 sec$^{-1}$.

8. The apparatus of claim 5 wherein:
   said fuel switch operated by said SLV injector comprises a Spntle plunger disposed in an axial orientation, said Spntle adapted to utilize displacements in an axial direction to enable said fuel switch to switch between on and off states;
   said displacements in an axial direction of said Spntle are provided by at least one high frequency electromechanical actuator activated by at least one said ECS signal;
   wherein said at least one electromechanical actuator is comprised of at least one piezoelectric stack or solenoid which yields piezoelectric expansion or solenoid force according to said ECS signal when activated by said ECS signal;
   wherein said SLV injector is configured such that, during an injection window, said Spntle urges said SLV into an on state yielding fuel flow into said injector nozzles;
   wherein a portion of said on state is a linear state having a linear relation between said displacement of said Spntle and said fuel flow, thereby allowing linear control of said fuel flow by said ECS signal;

said apparatus further including a return spring loading of said Spntle which provides a normally off state of said fuel switch in the absence of an ECS signal;

wherein said Spntle is configured to be free of axial forces due to said high pressure fuel, thereby enabling said high frequency response times of said Spntle.

9. The apparatus of claim 8, further including circumferential grooves in said Spntle, configured such that said Spntle displacements in said axial direction enable said fuel switch to switch between on and off states by allowing or preventing transverse fuel flow by exposing or un-exposing said circumferential grooves in said Spntle.

10. The apparatus of claim 8, wherein:

said SLV injector includes means for preventing fuel from reaching said injector nozzles when said fuel switch is in an off state;

wherein said means for preventing fuel from reaching said injector nozzles when said fuel switch is in an off state comprises at least one of: fuel high pressure relief valves, one-way in-line directional valves, and a pressure control valve comprising a return spring and an optional pneumatic assist.

11. The apparatus of claim 8, wherein said SLV injector includes a heat exchanger to enable fast and effective steaming of said fuel.

12. The apparatus of claim 8, wherein said displacements in an axial direction of said Spntle provided by said at least one high frequency electromechanical actuator activated by said at least one ECS signal yield a displacement gain relative to said piezoelectric expansion or solenoid force, said displacement gain achieved by using a large area driving piston face to push hydraulic fluid against a small area Spntle handle driven piston face.

13. The apparatus of claim 8 wherein said Spntle swings around a midpoint (Off Steady-state Equilibrium (OSE)d=0 point) while switching injection spraying between on and off states, such that much energy contributed to a current cycle by said at least one piezoelectric stack is conserved and contributed to subsequent cycle, thereby yielding self-resonance.

14. The apparatus of claim 8 configured to enable operation in discrete pulsed on/off mode to yield simulated pulse width modulation.

15. The apparatus of claim 1 further including:

main components associated with said main axle rotor shaft;

said apparatus enabled and built to withstand extreme stress applied by the Extreme Air Pressure on its main structure, components and moving parts referred to as "LE Mechanical Structure (LMS)";

said apparatus configured to enable an LE four cycle process; referred to as "Leaschauer Engine-Four Cycle Process" (LE-FCP);

said apparatus configured to enable specification and requirements of Leaschauer Engine referred to as "Leaschauer Engine Optimal Firing Requirements" (OFR), and further configured to enable specification and requirements of the Leaschauer Engine referred to as "Leaschauer Engine Optimal Configuration" (LOC);

said apparatus further including a return force loading referred to as "return spring loading", "return magnets loading" or "return pneumatic loading" of said Spntle, which provides a normally off state of said fuel switch in the absence of an ECS signal, and to ensure enabled and pre-positioning of pistons/Spntle within the LEI injector.

* * * * *